(12) United States Patent
Silverbrook et al.

(10) Patent No.: US 7,333,235 B2
(45) Date of Patent: *Feb. 19, 2008

(54) PRINTER CONTROLLER FOR CONTROLLING OPERATION OF A PAGEWIDTH PRINTHEAD

(75) Inventors: Kia Silverbrook, Balmain (AU); Paul Lapstun, Balmain (AU); Simon Robert Walmsley, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 31 days.

This patent is subject to a terminal disclaimer.

(21) Appl. No.: 11/478,592

(22) Filed: Jul. 3, 2006

(65) Prior Publication Data

US 2006/0250428 A1 Nov. 9, 2006

Related U.S. Application Data

(60) Continuation of application No. 11/212,756, filed on Aug. 29, 2005, now Pat. No. 7,108,346, which is a continuation of application No. 11/003,365, filed on Dec. 6, 2004, now Pat. No. 7,025,434, which is a continuation of application No. 10/636,267, filed on Aug. 8, 2003, now Pat. No. 6,843,545, which is a division of application No. 09/436,747, filed on Nov. 9, 1999, now Pat. No. 6,687,022.

(30) Foreign Application Priority Data

Nov. 9, 1998 (AU) .................. PP7024

(51) Int. Cl.
G06K 15/00 (2006.01)
B41J 2/01 (2006.01)
B41J 2/14 (2006.01)

(52) U.S. Cl. .............. 358/1.3; 358/520; 347/1; 347/47

(58) Field of Classification Search ............ 347/1, 347/20; 358/1.3, 520, 404, 468, 437
See application file for complete search history.

(56) References Cited

U.S. PATENT DOCUMENTS

| 5,511,206 | A | | 4/1996 | Yasuda | |
|---|---|---|---|---|---|
| 5,583,779 | A | * | 12/1996 | Naclerio et al. | 705/408 |
| 5,630,063 | A | | 5/1997 | McConnell | |
| 5,684,602 | A | * | 11/1997 | Tsuchiya et al. | 358/404 |
| 5,751,920 | A | | 5/1998 | Dalton | |
| 5,754,193 | A | | 5/1998 | Elhatem | |
| 5,774,634 | A | | 6/1998 | Honma et al. | |

(Continued)

FOREIGN PATENT DOCUMENTS

EP 0262801 A2 4/1988

(Continued)

Primary Examiner—Jerome Grant, II

(57) ABSTRACT

A printer controller for controlling operation of a pagewidth printhead is provided. The printer controller comprises: a bus; a data input interface connected to the bus so that the bus can receive compressed and encoded page data from a computer-based machine connected to the data input interface; page data expansion and decoding circuitry connected to the bus and configured to expand and decode the compressed and encoded page data; a printhead interface for communicating print page data to the printhead; and processing circuitry for controlling operation of components of the printer controller.

8 Claims, 34 Drawing Sheets

U.S. PATENT DOCUMENTS

| | | |
|---|---|---|
| 5,801,739 A | 9/1998 | Silverbrook |
| 5,812,744 A | 9/1998 | Allebach |
| 5,867,183 A | 2/1999 | Cornell et al. |
| 5,982,395 A | 11/1999 | Olson |
| 6,145,065 A | 11/2000 | Takahashi |
| 6,473,203 B1 * | 10/2002 | Hisatomi et al. ........... 358/403 |
| 6,493,112 B1 | 12/2002 | Arce |
| 6,600,573 B2 | 7/2003 | Shaked |
| 6,652,052 B2 | 11/2003 | Silverbrook |

FOREIGN PATENT DOCUMENTS

| | | |
|---|---|---|
| EP | 0390202 | 10/1990 |
| EP | 0842777 A | 5/1998 |
| FR | 2716593 A1 | 8/1995 |
| WO | WO 95/35623 A | 12/1995 |
| WO | WO 99/04368 A1 | 1/1999 |

* cited by examiner

C = Cyan
M = magenta
Y = Yellow
K = Black

C = Cyan
M = Magenta
Y = Yellow
K = Black

PRINTER CONTROLLER FOR CONTROLLING OPERATION OF A PAGEWIDTH PRINTHEAD

CROSS REFERENCE TO RELATED APPLICATIONS

This is a Continuation of Ser. No. 11/217,756 filed on Aug. 29, 2005, which is a Continuation of Ser. No. 11/003,365 filed on Dec. 6, 2004, now issued U.S. Pat. No. 7,025,434, which is a Continuation of Ser. No. 10/636,267 filed on Aug. 8, 2003, now issued U.S. Pat. No. 6,843,545, which is a Divisional of Ser. No. 09/436,747 filed Nov. 9, 1999, now issued U.S. Pat. No. 6,687,022, all of which are herein incorporated by reference.

TECHNICAL FIELD

This invention concerns a resource held in computer memory and multiple parallel processors which require simultaneous access to the resource. The resource may be a dither matrix or dither volume used for digitally halftoning a contone color image, in the form of an array of contone color pixel values, to bi-level dots, and this may be required to be accessed by different thresholding units in parallel. In another aspect the invention is a method of accessing such a resource.

BACKGROUND OF THE INVENTION

Where multiple parallel processors require simultaneous access to a resource held in computer memory, several strategies are possible. First, the processors could take turns to access the resource, however this reduces the performance of the processors. Second, multi-ported memory could be employed, and third, the entire resource could be replicated in different memory banks; both the last options are expensive.

A particular example of a resource held in computer memory is a dither matrix or dither volume used for digitally halftoning a contone color image. When dither cell registration is not desired between different color planes of the image, a set thresholding units handling the dithering of individual color components may require simultaneous access to a different dither cell locations.

SUMMARY OF THE INVENTION

In one broad form the invention comprises a In a printer having a printhead having a plurality of print nozzles, which use a sonic pulse to discharge drops of ink from said nozzles to form an image during the print cycle, an ink cartridge to supply ink to said nozzles, a method of printing comprising the steps of:

determining the initial volume of ink remaining in the ink cartridge prior to printing;

recording said initial volume in a memory unit;

determining the volume of ink required to print the next page;

printing the next page if there is sufficient ink in the cartridge to print the page;

counting the number of dots of ink discharged in the printing of the page;

obtaining data on the size of a dot under present conditions;

feeding the data on the size of a dot and the number of dots printed to a processor where the number of dots is multiplied by the volume of each dot to determine the volume of ink used in the printing of the page;

feeding data on the volume of ink printed to the memory unit where the volume of ink, printed, is subtracted from the volume of ink in the cartridge prior to printing that page to obtain the volume of ink in the cartridge after printing that page, and repeating the above steps for each page printed.

In a further form the invention comprises a printer comprising:

a printerhead having print nozzles through which dots of ink a discharged to print an image;

an ink cartridge containing ink to supply to said print nozzles;

a processor and memory unit associate with the ink cartridge and containing data on the characteristics of the ink and the volume of ink in the cartridge;

a sensor associated with said printhead to count the number of dots of ink discharged from said nozzles during printing of a page;

a processor unit for extracting data from the processor and memory unit to determine the volume of the an ink dot discharged from the nozzles and in communication with said sensor to receive data on the number of dots printed for the last page, multiplying the dot volume by the number of dots to determine the amount of ink used in printing the page, and inputing this data to the processor and memory unit, to update the volume of ink remaining in the cartridge; said processor unit instructing said printhead to print an image.

BRIEF DESCRIPTION OF THE DRAWINGS

An example of a printer embodying the invention will now be described with reference to the accompanying drawings, in which.

DESCRIPTION OF PREFERRED AND OTHER EMBODIMENTS

1 Introduction

Figure 1:
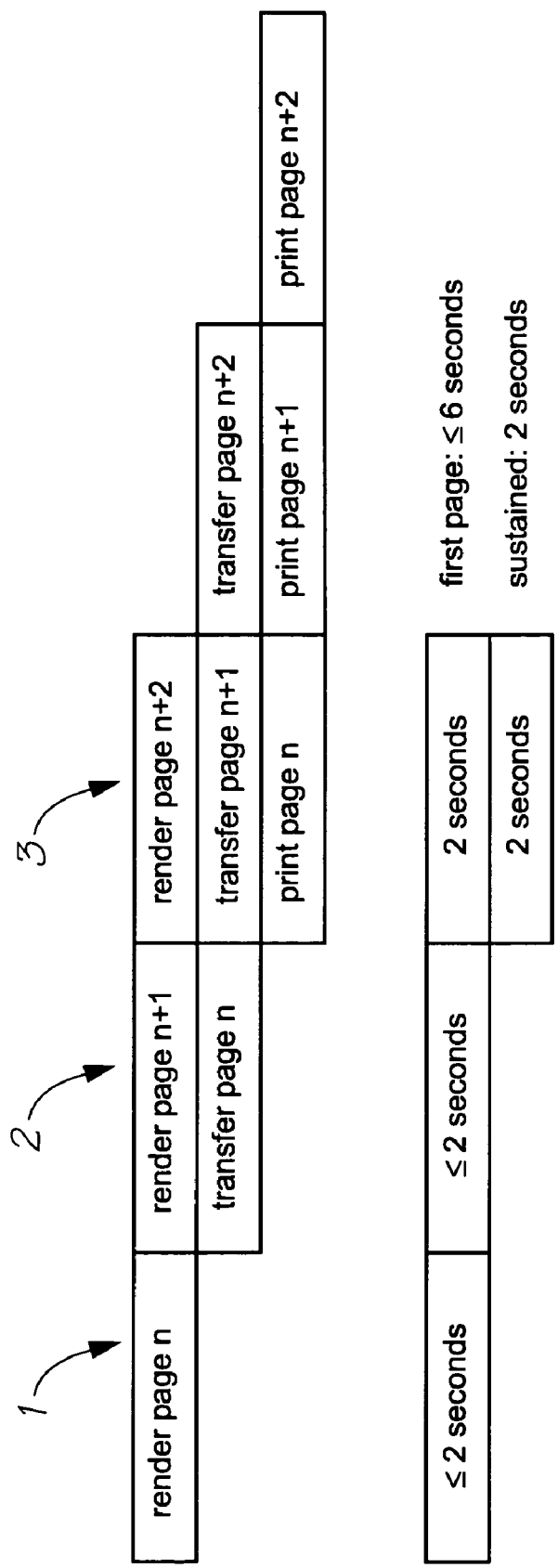
FIG. 1 is a table which illustrates the sustained printing rate achievable with double-buffering in the printer.

The invention will be described with reference to a high-performance color printer which combines photographic-quality image reproduction with magazine-quality text reproduction. The printer utilizes an 8" page-width drop-on-demand microelectromechanical inkjet ("MEMJET") printhead which produces 1600 dots per inch (dpi) bi-level CMYK (Cyan, Magenta, Yellow, blacK). It prints 30 full-color A4 or Letter pages per minute, and is intended as an entry-level desktop printer. The printer has been designated as iPrint and will be referred to by that name in the following description.

1.1 Operational Overview iPrint reproduces black text and graphics directly using bi-level black, and continuous-tone (contone) images and graphics using dithered bi-level CMYK. For practical purposes, iPrint supports a black resolution of 800 dpi, and a contone resolution of 267 pixels per inch (ppi).

iPrint is, in use, attached to a workstation or personal computer (PC) via a relatively low-speed (1.5 MBytes/s) universal serial bus (USB) connection [15]. iPrint relies on the PC to render each page to the level of contone pixels and black dots. The PC compresses each rendered page to less than 3 MB for sub-two-second delivery to the printer. iPrint decompresses and prints the page line by line at the speed of the MEMJET printhead. iPrint contains sufficient buffer memory for two compressed pages (6 MB), allowing it to print one page while receiving the next, but does not contain sufficient buffer memory for even a single uncompressed page (119 MB).

1.2 Page Width

The standard MEMJET nozzle layout has a half-inch unit cell, and so can be trivially adapted to page widths which are multiples of half an inch. Arbitrary page widths can be achieved with custom nozzle layouts, in markets which justify such specialisation. The initial MEMJET building block is a widely useful four-inch printhead which makes efficient use of a six-inch silicon wafer. The iPrint design therefore assumes an eight-inch MEMJET printhead, made up of two four-inch printheads joined together. The use of a wider printhead to achieve full bleed on A4/Letter pages only affects a few aspects of the iPrint design—specifically the exact mechanical design, and the logic of the printhead interface.

2 MEMJET-Based Printing

A MEMJET printhead produces 1600 dpi bi-level CMYK. On low-diffusion paper, each ejected drop forms an almost perfectly circular 22.5 micron diameter dot. Dots are easily produced in isolation, allowing dispersed-dot dithering to be exploited to its fullest. Since the MEMJET printhead is page-width and operates with a constant paper velocity, the four color planes are printed in perfect registration, allowing ideal dot-on-dot printing. Since there is consequently no spatial interaction between color planes, the same dither matrix is used for each color plane.

A page layout may contain a mixture of images, graphics and text. Continuous-tone (contone) images and graphics are reproduced using a stochastic dispersed-dot dither. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth. A stochastic dither matrix is carefully designed to be free of objectionable low-frequency patterns when tiled across the image. As such its size typically exceeds the minimum size required to support a number of intensity levels (i.e. 16×16×8 bits for 257 intensity levels). iPrint uses a dither volume of size 64×64×3×8 bits. The dither volume provides an extra degree of freedom during the design of the dither by allowing a dot to change states multiple times through the intensity range [12], rather than just once as in a conventional dither matrix.

Human contrast sensitivity peaks at a spatial frequency of about 3 cycles per degree of visual field and then falls off logarithmically, decreasing by a factor of 100 and becoming difficult to measure beyond about 40 cycles per degree [2]. At a normal viewing distance of between 400 mm and 250 mm, this translates roughly to 150-250 cycles per inch (cpi) on the printed page, or 300-500 samples per inch according to Nyquist's theorem. Taking into account the fact that color sensitivity is less acute than grayscale sensitivity, contone resolution beyond about 400 pixels per inch (ppi) is therefore of limited utility, and in fact contributes slightly to color error through the dither.

Black text and graphics are reproduced directly using bi-level black dots, and are therefore not antialiased (i.e. low-pass filtered) before being printed. Text is therefore supersampled beyond the perceptual limits discussed above, to produce smooth edges when spatially integrated. Text resolution up to about 1200 dpi continues to contribute to perceived text sharpness (assuming low-diffusion paper, of course).

3.1 Constraints

USB (Universal Serial Bus) is the standard low-speed peripheral connection on new PCs [4]. The standard high-speed peripheral connection, IEEE 1394, is recommended but unfortunately still optional in the PC 99 specification [5], and so may not be in widespread use when iPrint is first launched. iPrint therefore connects to a personal computer (PC) or workstation via USB, and the speed of the USB connection therefore imposes the most significant constraint on the architecture of the iPrint system. At a sustained printing rate of 30 pages/minute, USB at 1.5 MByte/s imposes an average limit of 3 MB/page. Since the act of interrupting a MEMJET-based printer during the printing of a page produces a visible discontinuity, it is advantageous for the printer to receive the entire page before commencing printing, to eliminate the possibility of buffer underrun. Since the printer can contain only limited buffer memory, i.e. two pages' worth or 6 MB, then the 3 MB/page limit must be considered absolute.

FIG. 1 illustrates the sustained printing rate achievable with double-buffering in the printer. The first stage 1 requires the first page to be rendered in the PC, and this takes up to two seconds. During the second stage 2 the next page is rendered and the first page is transferred to the printer, again this takes up to two seconds. In the third stage 3 the first page is printed, the second page is transferred and a third page is rendered, this takes two seconds. As a result it takes up to six seconds for the first page to be printed and thereafter a page can be printed every two seconds.

Other desktop connection options provide similar bandwidth to USB, and so impose similar constraints on the architecture. These include the parallel port at 2 MB/s, and 10Base-T Ethernet at around 1 MB/s 3.2 Page Rendering and Compression Page rendering (or rasterization) can be split between the PC and printer in various ways. Some printers support a full page description language (PDL) such as Postscript, and contain correspondingly sophisticated renderers. Other printers provide special support only for rendering text, to achieve high text resolution. This usually includes support for built-in or downloadable fonts. In each case the use of an embedded renderer reduces the rendering burden on the PC and reduces the amount of data transmitted from the PC to the printer. However, this comes at a price. These printers are more complex than they might be, and are often unable to provide full support for the graphics system of the PC, through which application programs construct, render and print pages. They often fail to exploit the high performance of current PCs, and are unable to leverage projected exponential growth in PC performance.

iPrint relies on the PC 4 to render pages, i.e. contone images and graphics to the pixel level, and black text and graphics to the dot level. iPrint 5 contains only a simple rendering engine which dithers the contone data and combines the results with any foreground bi-level black text and graphics. This strategy keeps the printer simple, and independent of any page description language or graphics system. It fully exploits the high performance of current PCs. The downside of this strategy is the potentially large amount of data which must be transmitted from the PC to the printer. We consequently use compression to reduce this data to the 3 MB/page required to allow a sustained printing rate of 30 pages/minute.

Figure 2:
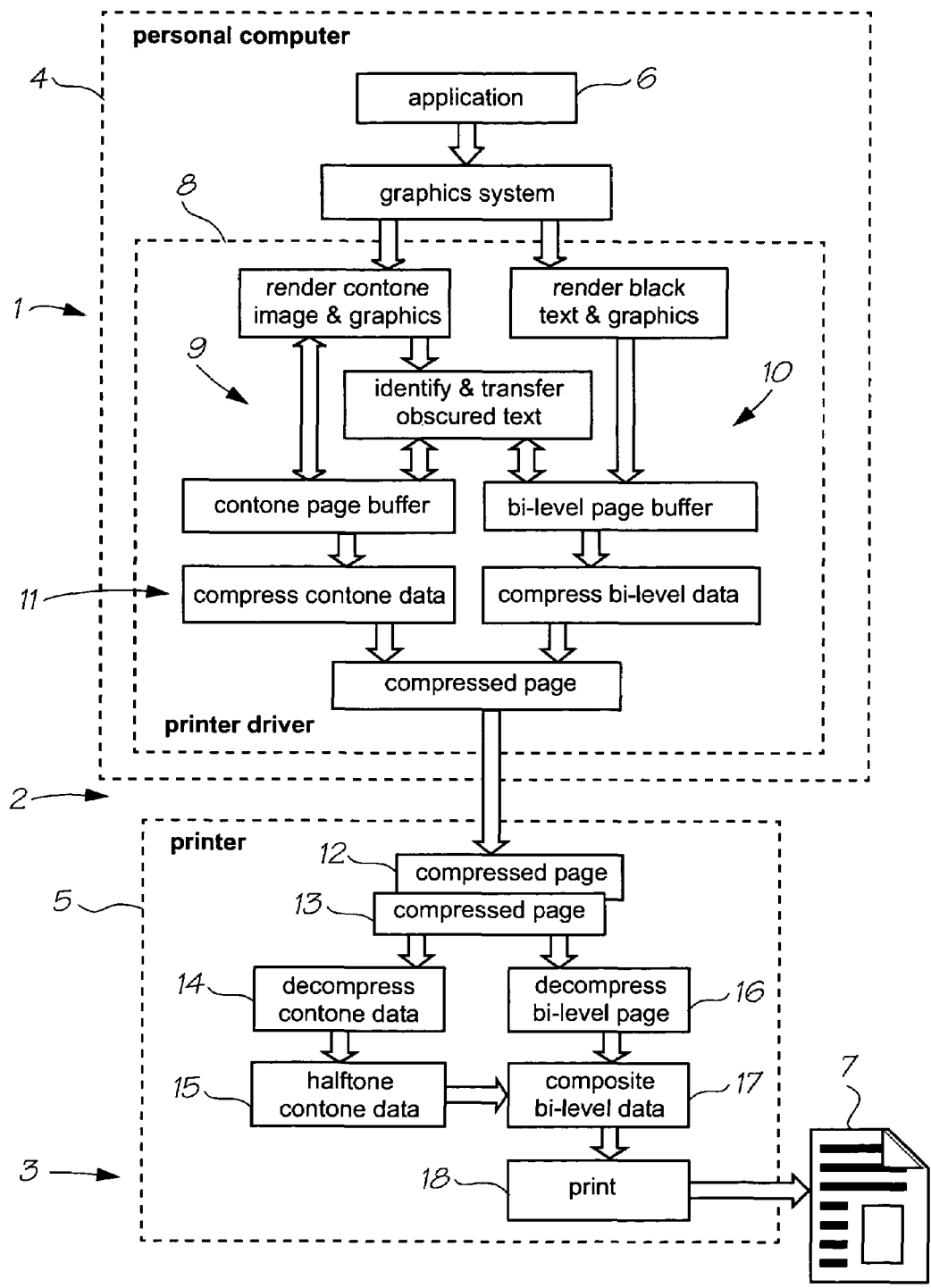
FIG. 2 is a flowchart showing the conceptual data flow from application to printed page.

FIG. 2 is a flowchart illustrating the conceptual data flow from an application 6 to a printed page 7.

An 8" by 11.7" A4 page has a bi-level CMYK pagesize of 114.3 MBytes at 1600 dpi, and a contone CMYK pagesize of 32.1 MB at 300 ppi.

In the printer driver 8, we use JPEG compression 9 to compress the contone data. Although JPEG is inherently lossy, for compression ratios of 10:1 or less the loss is usually negligible [17]. To obtain an integral contone to bi-level ratio, and to provide some compression leeway, we choose a contone resolution of 267 ppi. This yields a contone CMYK pagesize of 25.5 MB, a corresponding compression ratio of 8.5:1 to fit within the 3 MB/page limit, and a contone to bi-level ratio of 1:6 in each dimension.

A full page of black text (and/or graphics) rasterized at printer resolution (1600 dpi) yields a bi-level image of 28.6 MB. Since rasterizing text at 1600 dpi places a heavy burden on the PC for a small gain, we choose to rasterize text at a fully acceptable 800 dpi. This yields a bi-level image of 7.1 MB, requiring a lossless compression ratio of less than 2.5:1 to fit within the 3 MB/page limit. We achieve this with a two-dimensional compression scheme adapted from Group 4 Facsimile, all indicated generally at 10.

As long as the image and text regions of a page are non-overlapping, any combination of the two fits within the 3 MB limit. If text lies on top of a background image, then the worst case is a compressed pagesize approaching 6 MB (depending on the actual text compression ratio). This fits within the printer's page buffer memory, but prevents double-buffering of pages in the printer, thereby reducing the printer's page rate by two-thirds, i.e. to 10 pages/minute.

3.3 Page Expansion and Printing

As described above, the PC renders contone images and graphics to the pixel level, and black text and graphics to the dot level. These are compressed 11 by different means and transmitted together to the printer.

The printer contains two 3 MB page buffers—one 12 for the page being received from the PC, and one 13 for the page being printed. The printer expands the compressed page as it is being printed. This expansion consists of decompressing the 267 ppi contone CMYK image data 14, halftoning the resulting contone pixels to 1600 dpi bi-level CMYK dots 15, decompressing the 800 dpi bi-level black text data 16, and compositing the resulting bi-level black text dots over the corresponding bi-level CMYK image dots 17.

The conceptual data flow from the application to the printed page is illustrated in FIG. 2.

4 Printer Hardware

Figure 3:
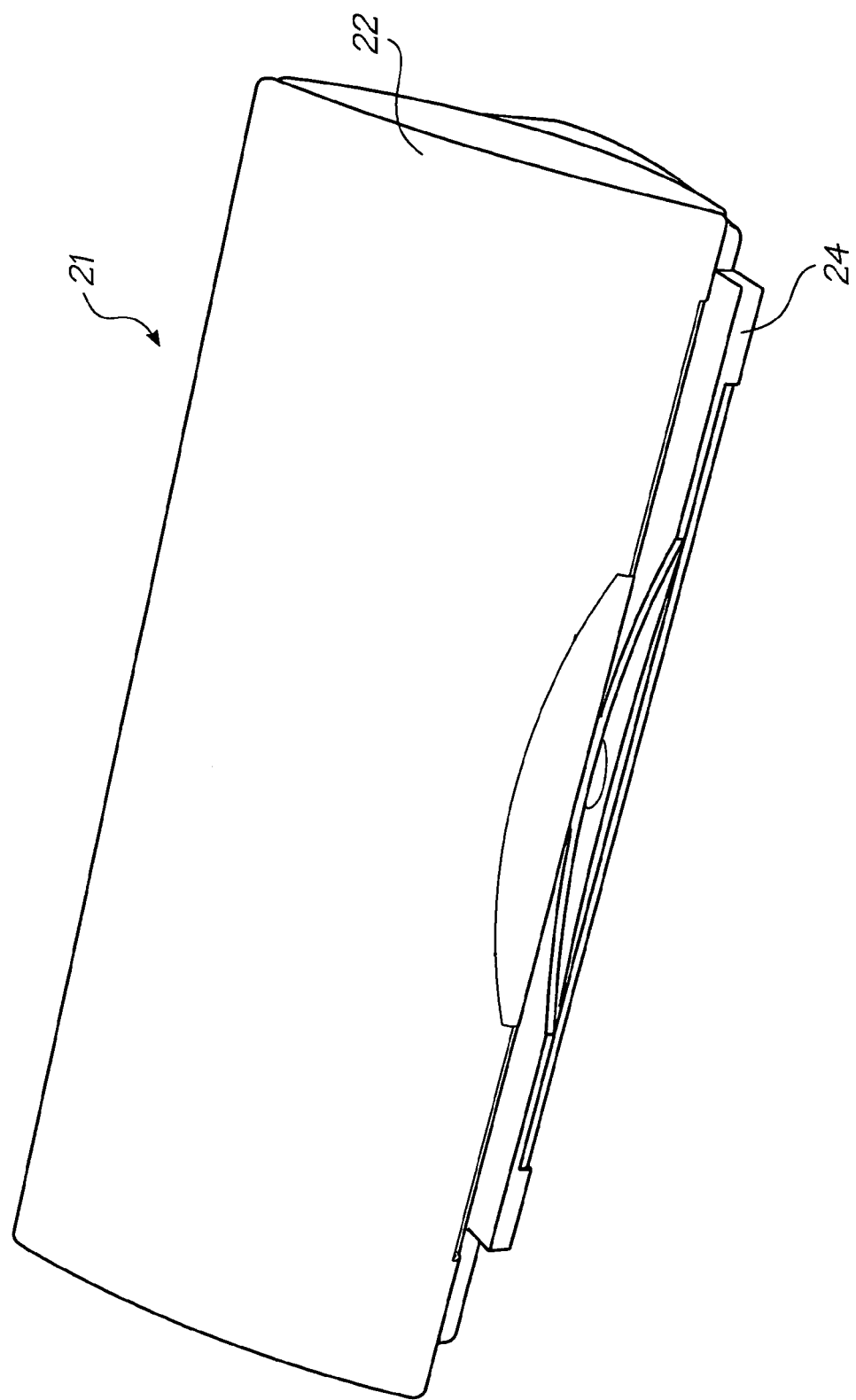
FIG. 3 is a pictorial view of the iPrint printer in its closed configuration.

Because of the simplicity of the page width MEMJET printhead, iPrint is very compact. It measures just 270 mm wide×85 mm deep×77 mm high when closed. FIG. 3 is a pictorial view of the iPrint 21 when closed.

Figure 4:
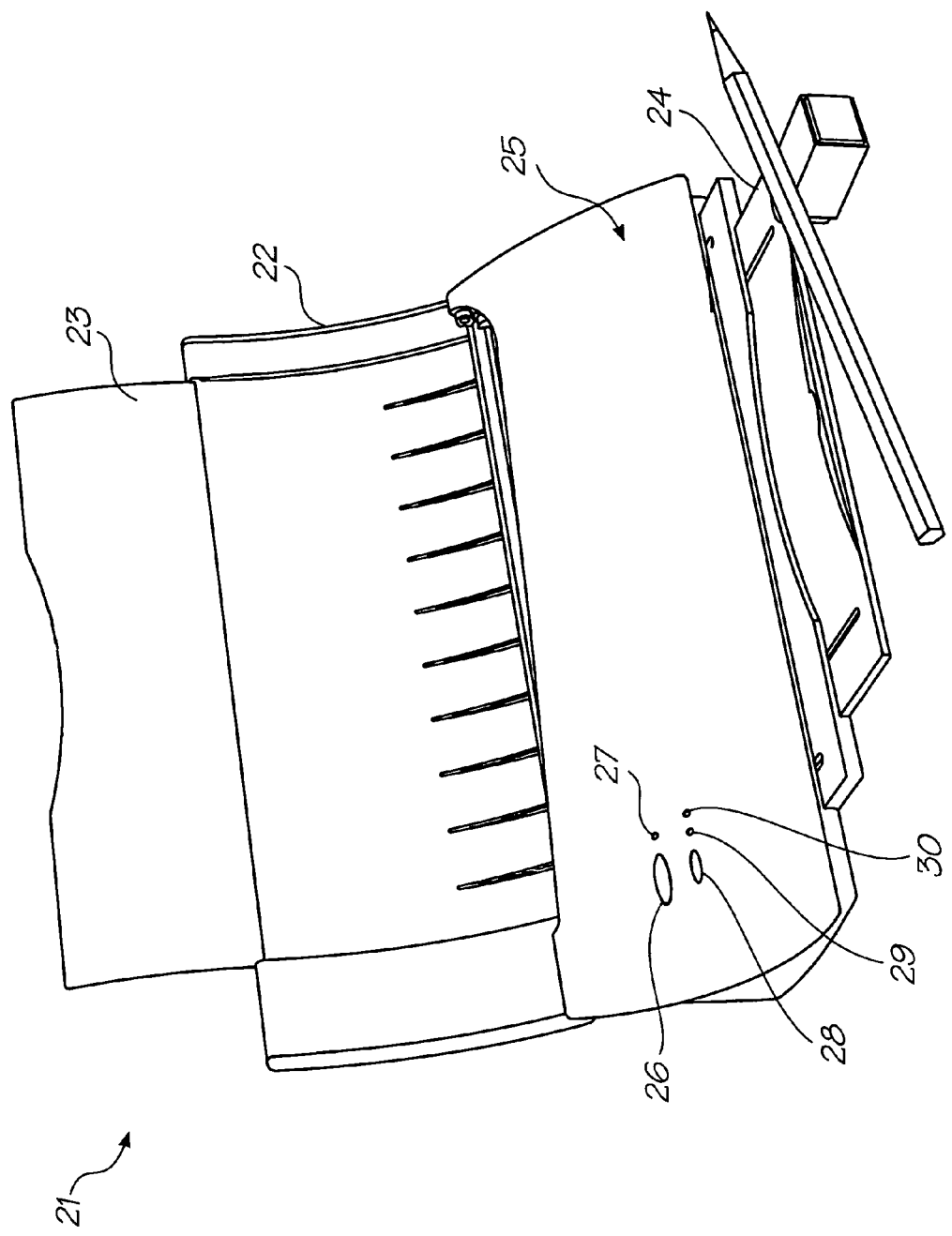
FIG. 4 is a pictorial view of the iPrint printer in its open configuration.

The cover 22 opens to form part of the paper tray, as shown in FIG. 4. A second part 23 is hinged within cover 22 and opens to extend the paper tray. A paper exit tray 24 is slideably extendable from the front of the printer.

The front panel 25, revealed when cover 22 is opened, contains the user interface—the power button 26 and power indicator LED 27, the paper feed button 28, and the out-of-paper 29 and ink low 30 LEDs.

Figure 5:
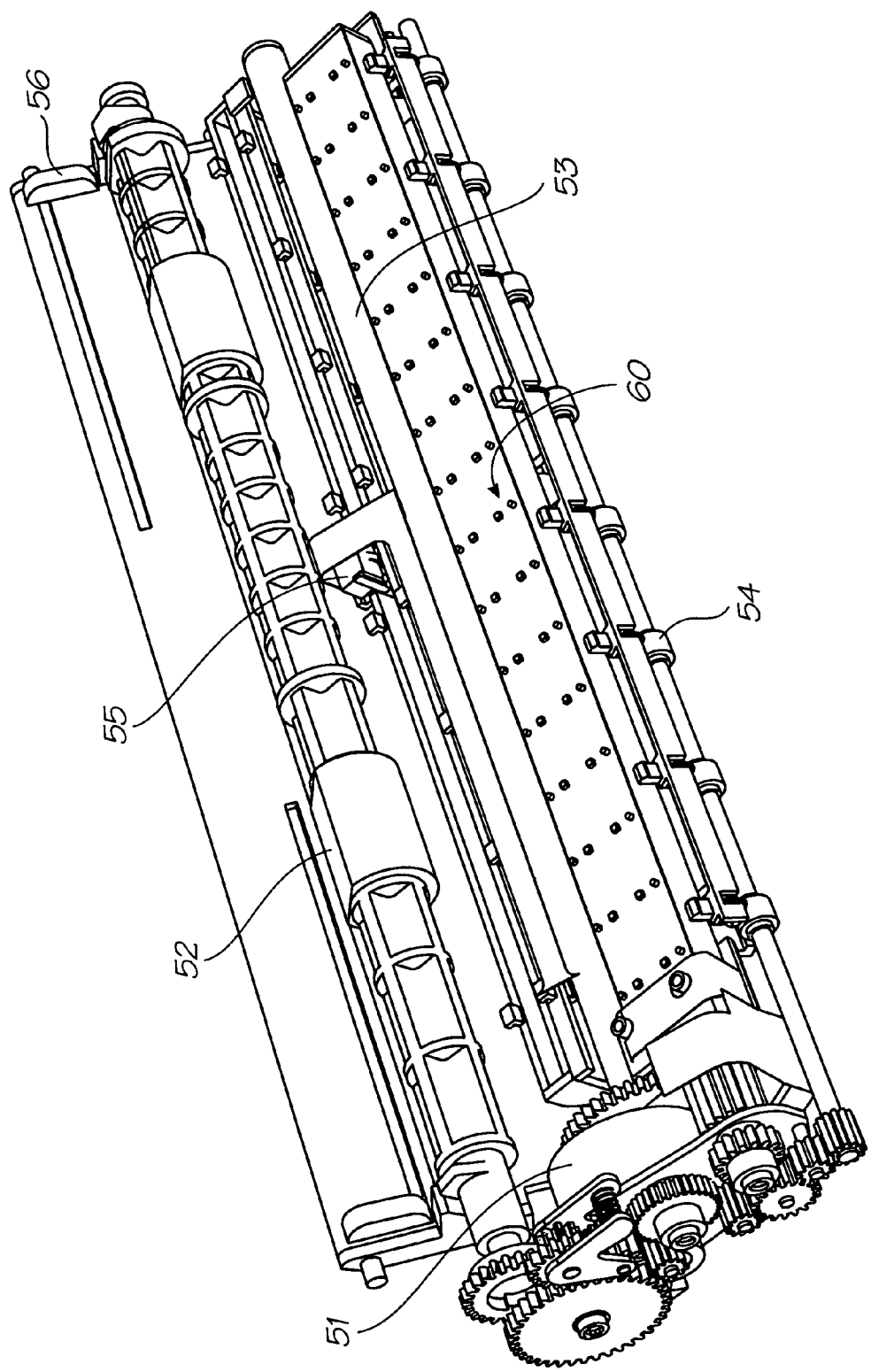
FIG. 5 is a cutaway diagram showing the paper path through the printer.

4.1 Paper Path iPrint uses a standard paper transport mechanism. The paper path 50 is illustrated in FIG. 5, in which a single stepper motor 51 drives both the sheet feed roller 52 and the paper transport. When running in the forward direction the stepper motor drives the paper drive roller 53 and the pinch wheels 54 at the start and end of the active paper path, respectively. When reversed, the stepper motor drives the sheet feed roller 52 which grabs the topmost sheet from the sheet feeder and transports it the short distance to the paper drive roller 53 where it is detected by the mechanical media sensor 55.

The paper centering sliders 56 ensure that the paper is centered. This ensures that a single centered media sensor detects the sheet, and also ensures that sheets wider than the printhead are printed with balanced margins.

4.1.1 MEMJET Printhead

Figure 6:
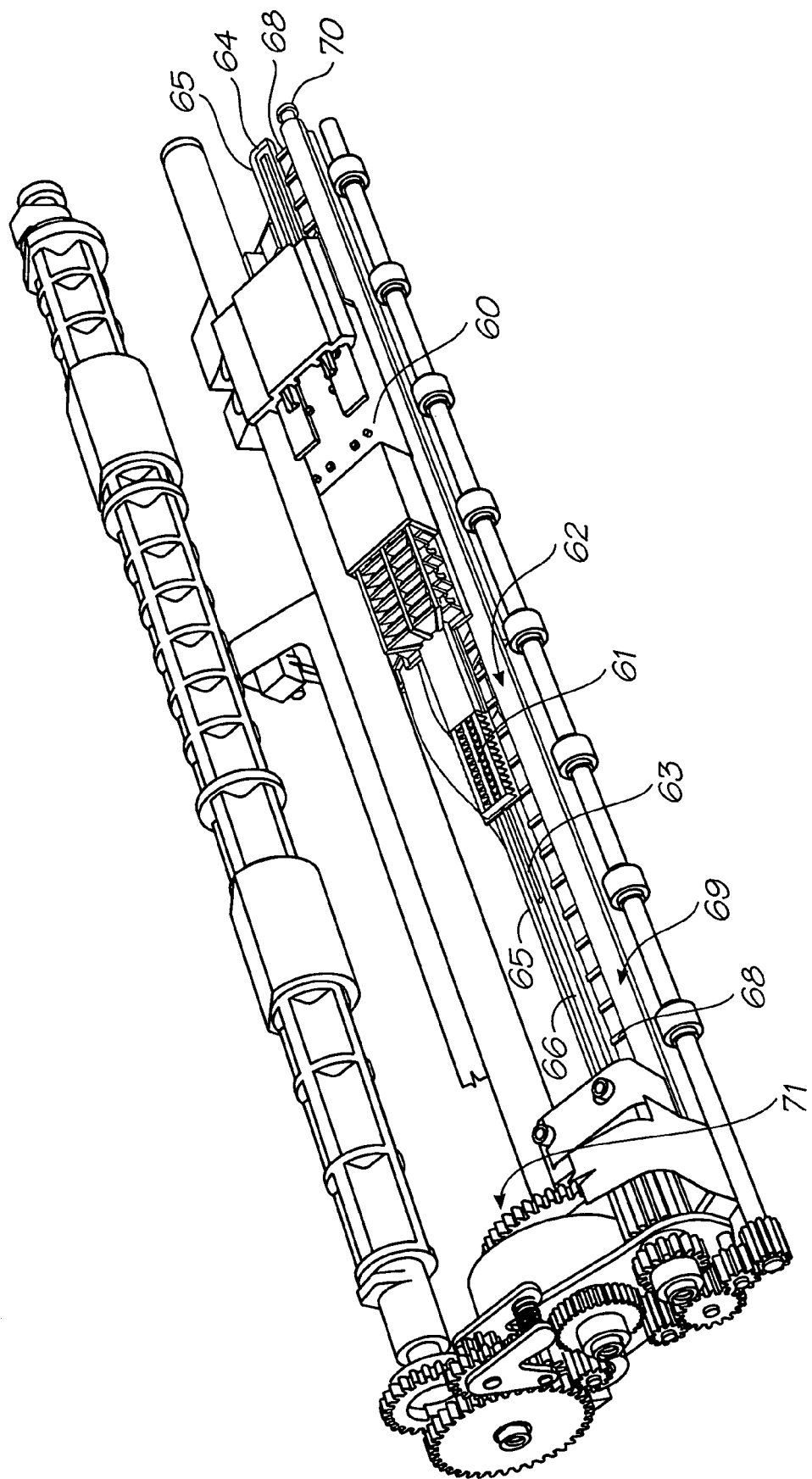
FIG. 6 is a pictorial cutaway view of a MEMJET printhead cartridge and printhead capping mechanism.
Figure 7:
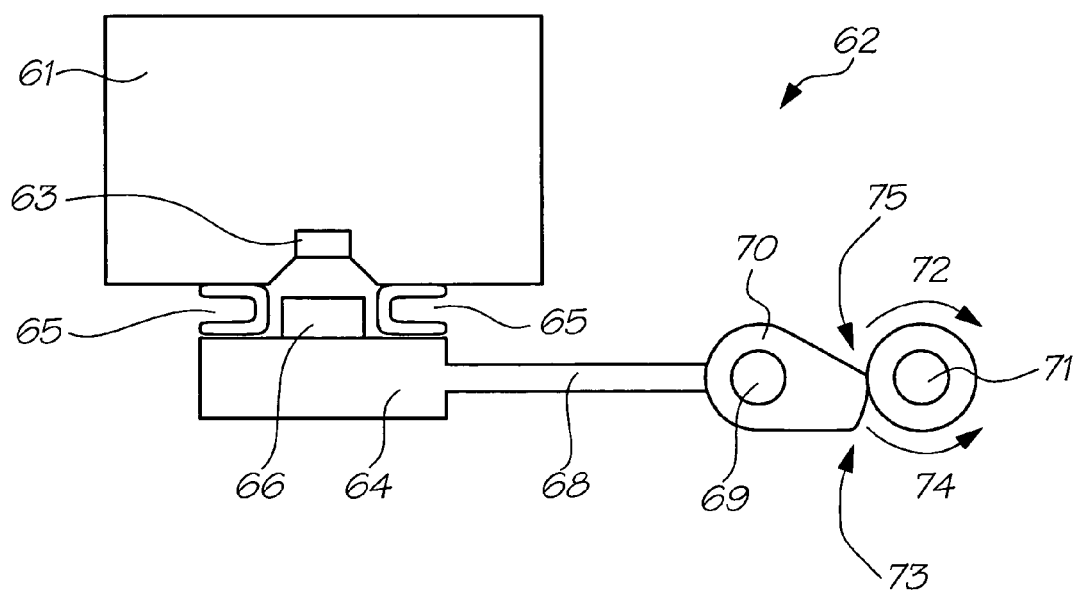
FIG. 7 is a sectional view of the MEMJET printhead cartridge and printhead capping mechanism of FIG. 6.

The replaceable MEMJET printhead cartridge 60 is also shown in FIG. 5. This represents one of the four possible ways to deploy the printhead in conjunction with the ink cartridge in a product such as iPrint:

permanent printhead, replaceable ink cartridge (as shown here)

separate replaceable printhead and ink cartridges refillable combined printhead and ink cartridge disposable combined printhead and ink cartridge Under the printhead cartridge 60 is a printhead assembly 61 and a printhead capping mechanism 62, illustrated in pictorial cut away view in FIG. 6 and in section in FIG. 7. When not in use, the MEMJET printhead 63 remains filled with ink, and so must be capped to prevent evaporation of ink through the nozzles. Ink evaporation can lead to gradual deposition of ink components which can impair nozzle operation.

iPrint includes a mechanical page width capping mechanism 62 which consists of a pivoting capping molding 64 with an elastomeric seal 65 and sponge 66. When the printhead is not in use, the capping molding 64 is held by a spring against the face of the printhead assembly 61, and the elastomeric seal 65 conforms to the face of the printhead assembly and creates an airtight seal around the printhead 63. The sponge 66 is used to catch drops ejected during the printhead cleaning cycle. When the printhead is in use, the capping molding 64 is held away from the printhead assembly 61 and out of the paper path.

The capping molding 64 is offset by a set of flexible arms 68 from a rod 69. The capping molding 64 and arms 68 pivot with the rod 69 about its axis. A slip wheel 70 is mounted at the end of rod 69. The slip wheel 70 makes contact with a drive wheel 71. When printing is occurring, the drive wheel 71 is coupled to the paper transport motor and is driven in the uncapping direction 72. This causes the slip wheel 70 and rod 69 to rotate about its axis and swings the capping molding 64 away from the printhead. Once the slip wheel rotates to the uncapping slip point 73, the slip wheel and the capping molding stop rotating. When printing is complete, the drive wheel is reversed and driven in the capping direction 74. Once the slip wheel rotates to the capping slip point 75, the slip wheel and the capping molding stop rotating, and the capping spring holds the capping plate in place against the face of the printhead assembly. The flexible arms 68 help the capping plate 67 conform to the face of the printhead assembly 61.

4.2 Printer Controller

Figure 8:
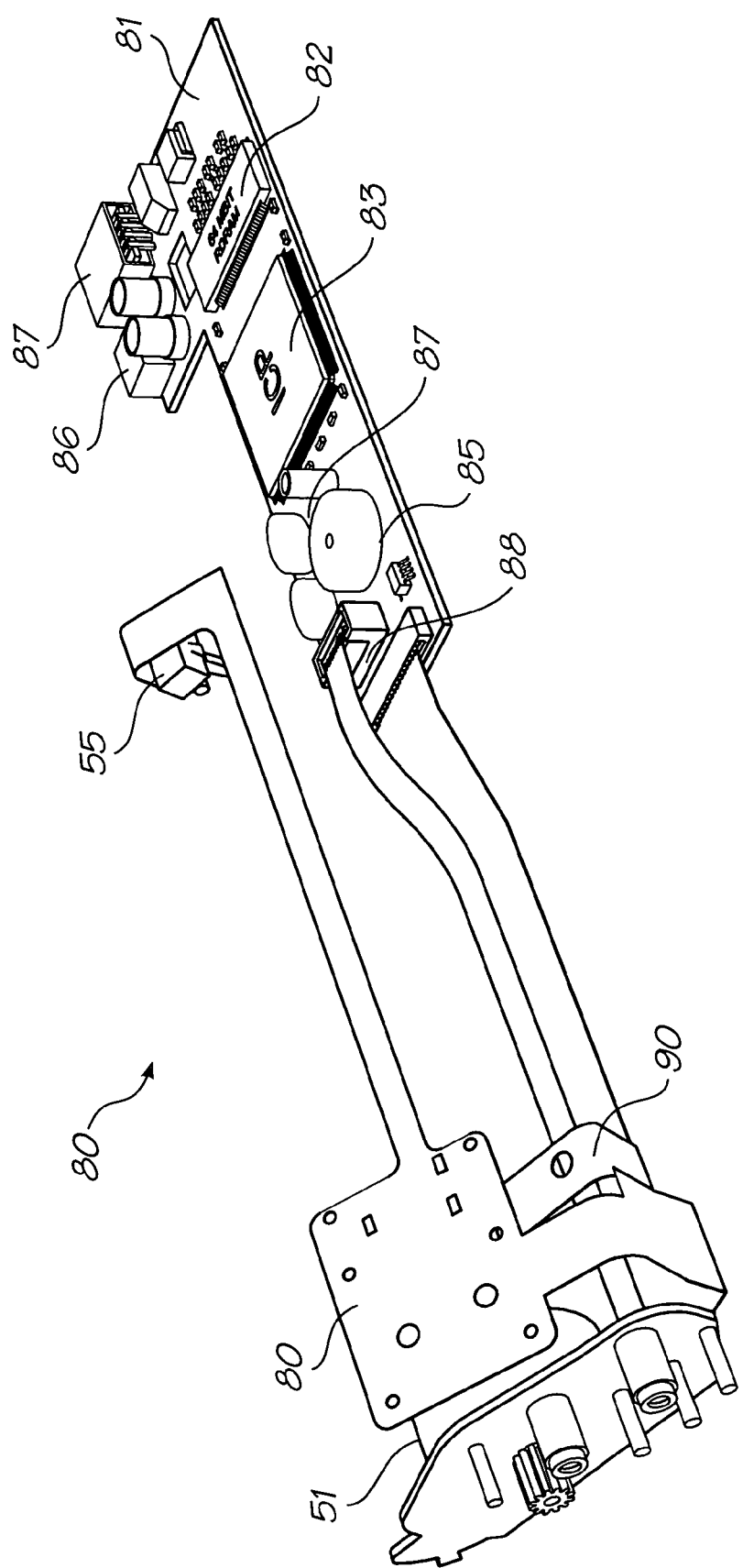
FIG. 8 is a pictorial view of the printer controller.

The printer controller 80 is illustrated in FIG. 8, and consists of a small PCB 81 with only a few components—a 64 Mbit RDRAM 82, the iPrint Central Processor (ICP) chip 83, a speaker 84 for notifying the user of error conditions, a QA chip 85, an external 3V DC power connection 86, an external USB connection 87, a connection 88 to the paper transport stepper motor 51, and the flex PCB 89 which connects to the media sensor 55, LEDs 27, 29 and 30, buttons 26 and 28, and a link 90 the printhead 63.

4.3 Ink Cartridge and Ink Path

There are two versions of the ink cartridge—one large, one small. Both fit in the same ink cartridge slot at the back of the iPrint unit.

5 Printer Control Protocol

This section describes the printer control protocol used between a host and iPrint. It includes control and status handling as well as the actual page description.

5.1 Control and Status

The USB device class definition for printers [16] provides for emulation of both unidirectional and bidirectional IEEE 1284 parallel ports [3]. At its most basic level, this allows the host to determine printer capabilities (via GET_DEVICE_ID), obtain printer status (via GET_PORT_STATUS), and reset the printer (via SOFT_RESET). Centronics/IEEE 1284 printer status fields are described in Table 1 below.

TABLE 1

Centronics/IEEE 1284 printer status

| Field | description |
|---|---|
| Select | The printer is selected and available for data transfer. |
| Paper Empty | A paper empty condition exists in the printer. |
| Fault | A fault condition exists in the printer (includes Paper Empty and not Select). |

Personal computer printing subsystems typically provide some level of IEEE 1284 support. Compatibility with IEEE 1284 in a printer therefore simplifies the development of the corresponding printer driver. The USB device class definition for printers seeks to leverage this same compatibility.

iPrint supports no control protocol beyond the USB device class definition for printers. Note that, if a higher-level control protocol were defined, then conditions such as out-of-ink could also be reported to the user (rather than just via the printer's out-of-ink LED).

iPrint receives page descriptions as raw transfers, i.e. not encapsulated in any higher-level control protocol.

5.2 Page Description iPrint reproduces black at full dot resolution (1600 dpi), but reproduces contone color at a somewhat lower resolution using halftoning. The page description is therefore divided into a black layer and a contone layer. The black layer is defined to composite over the contone layer.

The black layer consists of a bitmap containing a 1-bit opacity for each pixel. This black layer matte has a resolution which is an integer factor of the printer's dot resolution. The highest supported resolution is 1600 dpi, i.e. the printer's full dot resolution.

The contone layer consists of a bitmap containing a 32-bit CMYK color for each pixel. This contone image has a resolution which is an integer factor of the printer's dot resolution. The highest supported resolution is 267 ppi, i.e. one-sixth the printer's dot resolution.

The contone resolution is also typically an integer factor of the black resolution, to simplify calculations in the printer driver. This is not a requirement, however.

The black layer and the contone layer are both in compressed form for efficient transmission over the low-speed USB connection to the printer.

5.2.1 Page Structure iPrint has a printable page area which is determined by the width of its printhead, the characteristics of its paper path, and the size of the currently selected print medium.

The printable page area has a maximum width of 8". If the physical page width exceeds 8", then symmetric left and right margins are implicitly created. If the physical page width is less than 8", then the printable page width is reduced accordingly. The printable page area has no maximum length. It is simply the physical page length, less the top and bottom margins imposed by the characteristics of the paper path.

The target page size is constrained by the printable page area, less the explicit (target) left and top margins specified in the page description.

In theory iPrint does not impose a top or bottom margin—i.e. it allows full bleed in the vertical direction. In practice, however, since iPrint is not designed as a full-bleed A4/Letter printer because it uses an 8" printhead, an artificial top and bottom margin is imposed to avoid having to include a sponge large enough to cope with regular off-edge printing.

5.2.2 Page Description Format

Table 2 shows the format of the page description expected by iPrint.

format. If the signature and/or version are missing or incompatible with the printer, then the printer can reject the page.

The page description defines the resolution and size of the target page. The black and contone layers are clipped to the target page if necessary. This happens whenever the black or contone scale factors are not factors of the target page width or height.

The target left and top margins define the positioning of the target page within the printable page area.

The black layer parameters define the pixel size of the black layer, its integer scale factor to the target resolution, and the size of its compressed page data. The variable-size black page data follows the fixed-size parts of the page description.

The contone layer parameters define the pixel size of the contone layer, its integer scale factor to the target resolution, and the size of its compressed page data. The variable-size contone page data follows the variable-size black page data.

All integers in the page description are stored in big-endian byte order.

The variable-size black page data and the variable-size contone page data are aligned to 8-byte boundaries. The size of the required padding is included in the size of the fixed-size part of the page description structure and the variable-size black data.

The entire page description has a target size of less than 3 MB, and a maximum size of 6 MB, in accordance with page buffer memory in the printer.

The following sections describe the format of the compressed black layer and the compressed contone layer.

TABLE 2

Page description format

| field | format | description |
| --- | --- | --- |
| Signature | 16-bit integer | Page description format signature. |
| Version | 16-bit integer | Page description format version number. |
| structure size | 16-bit integer | Size of fixed-size part of page description. |
| target resolution (dpi) | 16-bit integer | Resolution of target page. This is always 1600 for iPrint. |
| target page width | 16-bit integer | Width of target page, in dots. |
| target page height | 16-bit integer | Height of target page, in dots. |
| target left margin | 16-bit integer | Width of target left margin, in dots. |
| target top margin | 16-bit integer | Height of target top margin, in dots. |
| black scale factor | 16-bit integer | Scale factor from black resolution to target resolution (must be 2 or greater). |
| black page width | 16-bit integer | Width of black page, in black pixels. |
| black page height | 16-bit integer | Height of black page, in black pixels. |
| black page data size | 32-bit integer | Size of black page data, in bytes. |
| contone scale factor | 16-bit integer | Scale factor from contone resolution to target resolution (must be 6 or greater). |
| contone page width | 16-bit integer | Width of contone page, in contone pixels. |
| contone page height | 16-bit integer | Height of contone page, in contone pixels. |
| contone page data size | 32-bit integer | Size of contone page data, in bytes. |
| black page data | EDRL bytestream | Compressed bi-level black page data. |
| contone page data | JPEG bytestream | Compressed contone CMYK page data. |

Apart from being implicitly defined in relation to the printable page area, each page description is complete and self-contained. There is no data transmitted to the printer separately from the page description to which the page description refers.

The page description contains a signature and version which allow the printer to identify the page description

5.2.3 Bi-Level Black Layer Compression

5.2.3.1 Group 3 and 4 Facsimile Compression

The Group 3 Facsimile compression algorithm [1] losslessly compresses bi-level data for transmission over slow and noisy telephone lines. The bi-level data represents scanned black text and graphics on a white background, and the algorithm is tuned for this class of images (it is explicitly not tuned, for example, for halftoned bi-level images). The ID Group 3 algorithm runlength-encodes each scanline and then Huffman-encodes the resulting runlengths. Runlengths in the range 0 to 63 are coded with terminating codes. Runlengths in the range 64 to 2623 are coded with make-up codes, each representing a multiple of 64, followed by a terminating code. Runlengths exceeding 2623 are coded with multiple make-up codes followed by a terminating code. The Huffman tables are fixed, but are separately tuned for black and white runs (except for make-up codes above 1728, which are common). When possible, the 2D Group 3 algorithm encodes a scanline as a set of short edge deltas (0, ±1, ±2, ±3) with reference to the previous scanline. The delta symbols are entropy-encoded (so that the zero delta symbol is only one bit long etc.) Edges within a 2D-encoded line which can't be delta-encoded are runlength-encoded, and are identified by a prefix. 1D- and 2D-encoded lines are marked differently. 1D-encoded lines are generated at regular intervals, whether actually required or not, to ensure that the decoder can recover from line noise with minimal image degradation. 2D Group 3 achieves compression ratios of up to 6:1 [14].

The Group 4 Facsimile algorithm [1] losslessly compresses bi-level data for transmission over error-free communications lines (i.e. the lines are truly error-free, or error-correction is done at a lower protocol level). The Group 4 algorithm is based on the 2D Group 3 algorithm, with the essential modification that since transmission is assumed to be error-free, 1D-encoded lines are no longer generated at regular intervals as an aid to error-recovery. Group 4 achieves compression ratios ranging from 20:1 to 60:1 for the CCITT set of test images [14].

The design goals and performance of the Group 4 compression algorithm qualify it as a compression algorithm for the bi-level black layer. However, its Huffman tables are tuned to a lower scanning resolution (100-400 dpi), and it encodes runlengths exceeding 2623 awkwardly. At 800 dpi, our maximum runlength is currently 6400. Although a Group 4 decoder core might be available for use in the printer controller chip (Section 7), it might not handle runlengths exceeding those normally encountered in 400 dpi facsimile applications, and so would require modification.

Since most of the benefit of Group 4 comes from the delta-encoding, a simpler algorithm based on delta-encoding alone is likely to meet our requirements. This approach is described in detail below.

5.2.3.2 Bi-Level Edge Delta and Runlength (EDRL) Compression Format

The edge delta and runlength (EDRL) compression format is based loosely on the Group 4 compression format and its precursors [1][18].

EDRL uses three kinds of symbols, appropriately entropy-coded. These are create edge, kill edge, and edge delta. Each line is coded with reference to its predecessor. The predecessor of the first line is defined to a line of white. Each line is defined to start off white. If a line actually starts of black (the less likely situation), then it must define a black edge at offset zero. Each line must define an edge at its left-hand end, i.e. at offset page width.

An edge can be coded with reference to an edge in the previous line if there is an edge within the maximum delta range with the same sense (white-to-black or black-to-white). This uses one of the edge delta codes. The shorter and likelier deltas have the shorter codes. The maximum delta range (±2) is chosen to match the distribution of deltas for typical glyph edges. This distribution is mostly independent of point size. A typical example is given in Table 3.

TABLE 3

Edge delta distribution for 10 point Times at 800 dpi

| |delta| | probability |
|---|---|
| 0 | 65% |
| 1 | 23% |
| 2 | 7% |
| ≧3 | 5% |

An edge can also be coded using the length of the run from the previous edge in the same line. This uses one of the create edge codes for short (7-bit) and long (13-bit) runlengths. For simplicity, and unlike Group 4, runlengths are not entropy-coded. In order to keep edge deltas implicitly synchronised with edges in the previous line, each unused edge in the previous line is 'killed' when passed in the current line. This uses the kill edge code. The end-of-page code signals the end of the page to the decoder.

Note that 7-bit and 13-bit runlengths are specifically chosen to support 800 dpi A4/Letter pages. Longer runlengths could be supported without significant impact on compression performance. For example, if supporting 1600 dpi compression, the runlengths should be at least 8-bit and 14-bit respectively. A general-purpose choice might be 8-bit and 16-bit, thus supporting up to 40" wide 1600 dpi pages.

The full set of codes is defined in Table 4. Note that there is no end-of-line code. The decoder uses the page width to detect the end of the line. The lengths of the codes are ordered by the relative probabilities of the codes' occurrence.

TABLE 4

EDRL codewords

| code | encoding | suffix | description |
|---|---|---|---|
| Δ0 | 1 | — | don't move corresponding edge |
| Δ+1 | 010 | — | move corresponding edge +1 |
| Δ−1 | 011 | — | move corresponding edge −1 |
| Δ+2 | 00010 | — | move corresponding edge +2 |
| Δ−2 | 00011 | — | move corresponding edge −2 |
| kill edge | 0010 | — | kill corresponding edge |
| create near edge | 0011 | 7-bit RL | create edge from short runlength (RL) |
| create far edge | 00001 | 13-bit RL | create edge from long runlength (RL) |
| end-of-page (EOP) | 000001 | — | end-of-page marker |

Figure 9:
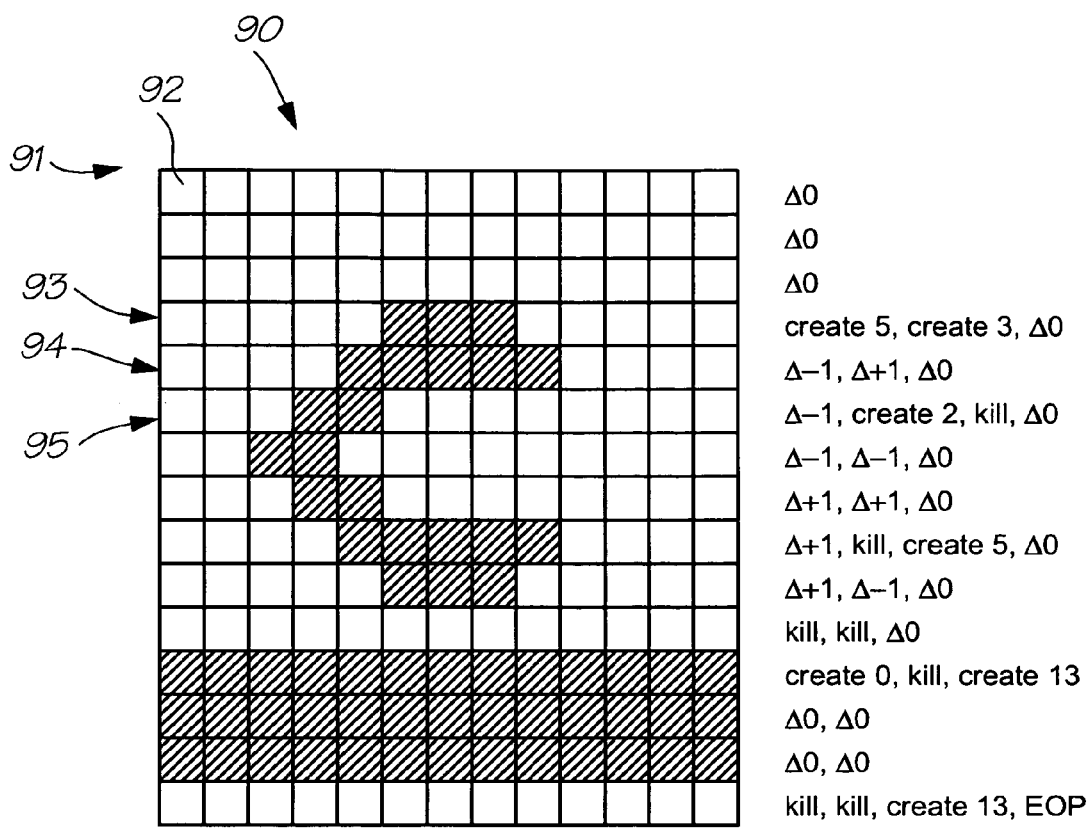
FIG. 9 is an example of coding a simple black and white image.

FIG. 9 shows an example of coding a simple black and white image 90. The image is arranged as lines 91 of pixels 92. The first line 91 is assumed to be white and, since it is, is coded as Δ0. Note that the common situation of an all-white line following another all-white line is coded using a single bit (Δ0), and an all-black line following another all-black line is coded using two bits (Δ0, Δ0). Where an edge occurs in a line, such as the fourth line 93, the create code is used to define the edges. In the next line 94, the Δ−1 and Δ+1 codes are used to move the edges. In the next line 95, it is more convenient to create a new edge and kill the old edge rather than move it.

EDRL Encoding Example

Note that the foregoing describes the compression format, not the compression algorithm per se. A variety of equivalent encodings can be produced for the same image, some more compact than others. For example, a pure runlength encoding conforms to the compression format. The goal of the compression algorithm is to discover a good, if not the best, encoding for a given image.

The following is a simple algorithm for producing the EDRL encoding of a line with reference to its predecessor.

```
#define SHORT_RUN_PRECISION7          //      precision of short run
#define LONG_RUN_PRECISION13          //      precision of long run
EDRL_CompressLine
(
    Byte prevLine[],                  //      previous (reference) bi-level line
    Byte currLine[],                  //      current (coding) bi-level line
    int lineLen,                      //      line length
    BITSTREAM s                       //      output (compressed) bitstream
)
    int prevEdge = 0                  //      current edge offset in previous line
    int currEdge = 0                  //      current edge offset in current line
    int codedEdge = currEdge          //      most recent coded (output) edge
    int prevColor = 0                 //      current color in previous line (0 = white)
    int currColor = 0                 //      current color in current line
    int prevRun                       //      current run in previous line
    int currRun                       //      current run in current line
    bool bUpdatePrevEdge = true       //      force first edge update
    bool bUpdateCurrEdge = true       //      force first edge update
    while (codedEdge < lineLen)
    // possibly update current edge in previous line
    if (bUpdatePrevEdge)
        if (prevEdge < lineLen)
            prevRun = GetRun(prevLine, prevEdge, lineLen, prevColor)
        else
            prevRun = 0
        prevEdge += prevRun
        prevColor = !prevColor
        bUpdatePrevEdge = false
    // possibly update current edge in current line
    if (bUpdateCurrEdge)
        if (currEdge < lineLen)
            currRun = GetRun(currLine, currEdge, lineLen, currColor)
        else
        currRun = 0
        currEdge += currRun
        currColor = !currColor
        bUpdateCurrEdge = false
// output delta whenever possible, i.e. when
// edge senses match, and delta is small enough
if (prevColor == currColor)
    delta = currEdge − prevEdge
    if (abs(delta) <= MAX_DELTA)
        PutCode(s, EDGE_DELTA0 + delta)
        codedEdge = currEdge
        bUpdatePrevEdge = true
        bUpdateCurrEdge = true
        continue
    // kill unmatched edge in previous line
    if (prevEdge <= currEdge)
        PutCode(s, KILL_EDGE)
        bUpdatePrevEdge = true
    // create unmatched edge in current line
    if (currEdge <= prevEdge)
        PutCode(s, CREATE_EDGE)
        if (currRun < 128)
            PutCode(s, CREATE_NEAR_EDGE)
            PutBits(currRun, SHORT_RUN_PRECISION)
        else
            PutCode(s, CREATE_FAR_EDGE)
            PutBits(currRun, LONG_RUN_PRECISION)
    codedEdge = currEdge
    bUpdateCurrEdge = true
```

Note that the algorithm is blind to actual edge continuity between lines, and may in fact match the "wrong" edges between two lines. Happily the compression format has nothing to say about this, since it decodes correctly, and it is difficult for a "wrong" match to have a detrimental effect on the compression ratio.

For completeness the corresponding decompression algorithm is given below. It forms the core of the EDRL Expander unit in the printer controller chip (Section 7).

```
EDRL_DecompressLine
(
    BITSTREAM s,           // input (compressed) bitstream
    Byte prevLine[ ],      // previous (reference) bi-level line
    Byte currLine[ ],      // current (coding) bi-level line
    int lineLen            // line length
)
    int prevEdge = 0       // current edge offset in previous line
    int currEdge = 0       // current edge offset in current line
    int prevColor = 0      // current color in previous line (0 = white)
    int currColor = 0      // current color in current line
    while (currEdge < lineLen)
        code = GetCode(s)
        switch (code)
            case EDGE_DELTA_MINUS2:
            case EDGE_DELTA_MINUS1:
            case EDGE_DELTA_0:
            case EDGE_DELTA_PLUS1:
            case EDGE_DELTA_PLUS2:
                // create edge from delta
                int delta = code - EDGE_DELTA_0
                int run = prevEdge + delta - currEdge
                FillBitRun(currLine, currEdge, currColor, run)
                currEdge += run
                currColor = !currColor
                prevEdge += GetRun(prevLine, prevEdge, lineLen, prevColor)
                prevColor = !prevColor
            case KILL_EDGE:
                // discard unused reference edge
                prevEdge += GetRun(prevLine, prevEdge, lineLen, prevColor)
                prevColor = !prevColor
            case CREATE_NEAR_EDGE:
            case CREATE_FAR_EDGE:
                // create edge explicitly
                int run
                if (code == CREATE_NEAR_EDGE)
                    run = GetBits(s, SHORT_RUN_PRECISION)
                else
                    run = GetBits(s, LONG_RUN_PRECISION)
                FillBitRun(currLine, currEdge, currColor, run)
                currColor = !currColor
                currEdge += run
```

5.2.3.3 EDRL Compression Performance

Table 5 shows the compression performance of Group 4 and EDRL on the CCITT test documents used to select the Group 4 algorithm. Each document represents a single page scanned at 400 dpi. Group 4's superior performance is due to its entropy-coded runlengths, tuned to 400 dpi features.

TABLE 5

Group 4 and EDRL compression performance on standard CCITTT documents at 400 dpi

| CCITT document number | Group 4 compression ratio | EDRL compression ratio |
|---|---|---|
| 1 | 29.1 | 21.6 |
| 2 | 49.9 | 41.3 |
| 3 | 17.9 | 14.1 |
| 4 | 7.3 | 5.5 |
| 5 | 15.8 | 12.4 |
| 6 | 31.0 | 25.5 |
| 7 | 7.4 | 5.3 |
| 8 | 26.7 | 23.4 |

Magazine text is typically typeset in a typeface with serifs (such as Times) at a point size of 10. At this size an A4/Letter page holds up to 14,000 characters, though a typical magazine page holds only about 7,000 characters. Text is seldom typeset at a point size smaller than 5. At 800 dpi, text cannot be meaningfully rendered at a point size lower than 2 using a standard typeface. Table 6 illustrates the legibility of various point sizes.

TABLE 6

Text at different point sizes

| point size | sample text (in Times) |
|---|---|
| 8 | The quick brown fox jumps over the lazy dog. |
| 9 | The quick brown fox jumps over the lazy dog. |
| 10 | The quick brown fox jumps over the lazy dog. |

Table 7 shows Group 4 and EDRL compression performance on pages of text of varying point sizes, rendered at 800 dpi. Note that EDRL achieves the required compression ratio of 2.5 for an entire page of text typeset at a point size of 3. The distribution of characters on the test pages is based on English-language statistics [13].

TABLE 7

Group 4 and EDRL compression performance on text at 800 dpi

| point size | characters/A4 page | Group 4 compression ratio | EDRL compression ratio |
|---|---|---|---|
| 2 | 340,000 | 2.3 | 1.7 |
| 3 | 170,000 | 3.2 | 2.5 |
| 4 | 86,000 | 4.7 | 3.8 |
| 5 | 59,000 | 5.5 | 4.9 |
| 6 | 41,000 | 6.5 | 6.1 |
| 7 | 28,000 | 7.7 | 7.4 |
| 8 | 21,000 | 9.1 | 9.0 |
| 9 | 17,000 | 10.2 | 10.4 |
| 10 | 14,000 | 10.9 | 11.3 |
| 11 | 12,000 | 11.5 | 12.4 |
| 12 | 8,900 | 13.5 | 14.8 |
| 13 | 8,200 | 13.5 | 15.0 |
| 14 | 7,000 | 14.6 | 16.6 |
| 15 | 5,800 | 16.1 | 18.5 |
| 20 | 3,400 | 19.8 | 23.9 |

For a point size of 9 or greater, EDRL slightly outperforms Group 4, simply because Group 4's runlength codes are tuned to 400 dpi.

These compression results bear out the observation that entropy-encoded runlengths contribute much less to compression than 2D encoding, unless the data is poorly correlated vertically, such as in the case of very small characters.

5.2.4 Contone Layer Compression

5.2.4.1 JPEG Compression

The JPEG compression algorithm [6] lossily compresses a contone image at a specified quality level. It introduces imperceptible image degradation at compression ratios below 5:1, and negligible image degradation at compression ratios below 10:1 [17].

JPEG typically first transforms the image into a color space which separates luminance and chrominance into separate color channels. This allows the chrominance channels to be subsampled without appreciable loss because of the human visual system's relatively greater sensitivity to luminance than chrominance. After this first step, each color channel is compressed separately.

The image is divided into 8×8 pixel blocks. Each block is then transformed into the frequency domain via a discrete cosine transform (DCT). This transformation has the effect of concentrating image energy in relatively lower-frequency coefficients, which allows higher-frequency coefficients to be more crudely quantized. This quantization is the principal source of compression in JPEG. Further compression is achieved by ordering coefficients by frequency to maximise the likelihood of adjacent zero coefficients, and then run-length-encoding runs of zeroes. Finally, the runlengths and non-zero frequency coefficients are entropy coded. Decompression is the inverse process of compression.

5.2.4.2 CMYK Contone JPEG Compression Format

The CMYK contone layer is compressed to an interleaved color JPEG bytestream. The interleaving is required for space-efficient decompression in the printer, but may restrict the decoder to two sets of Huffman tables rather than four (i.e. one per color channel) [17]. If luminance and chrominance are separated, then the luminance channels can share one set of tables, and the chrominance channels the other set.

If luminance/chrominance separation is deemed necessary, either for the purposes of table sharing or for chrominance subsampling, then CMY is converted to YCrCb and Cr and Cb are duly subsampled. K is treated as a luminance channel and is not subsampled.

The JPEG bytestream is complete and self-contained. It contains all data required for decompression, including quantization and Huffman tables.

6 MEMJET Printhead

An 8-inch MEMJET printhead consists of two standard 4-inch MEMJET printheads joined together side by side.

The two 4-inch printheads are wired up together in a specific way for use in iPrint. Since the wiring requires knowledge of the 4-inch printhead, an overview of the 4-inch printhead is presented here.

6.1 Composition of a 4-inch Printhead

Each 4-inch printhead consists of 8 segments, each segment ½ an inch in length. Each of the segments prints bi-level cyan, magenta, yellow and black dots over a different part of the page to produce the final image.

Since the printhead prints dots at 1600 dpi, each dot is approximately 22.5 microns in diameter, and spaced 15.875 microns apart. Thus each half-inch segment prints 800 dots, with the 8 segments corresponding to the positions shown in Table 8.

TABLE 8

Final image dots addressed by each segment

| Segment | Printhead 1 | | Printhead 2 | |
|---|---|---|---|---|
| | First dot | Last dot | First dot | Last dot |
| 0 | 0 | 799 | 6,400 | 7,199 |
| 1 | 800 | 1,599 | 7,200 | 7,999 |

TABLE 8-continued

Final image dots addressed by each segment

| Segment | Printhead 1 | | Printhead 2 | |
|---|---|---|---|---|
| | First dot | Last dot | First dot | Last dot |
| 2 | 1,600 | 2,399 | 8,000 | 8,799 |
| 3 | 2,400 | 3,199 | 8,800 | 9,599 |
| 4 | 3,200 | 3,999 | 9,600 | 10,399 |
| 5 | 4,000 | 4,799 | 10,400 | 11,199 |
| 6 | 4,800 | 5,599 | 11,200 | 11,999 |
| 7 | 5,600 | 6,399 | 12,000 | 12,799 |

Although each segment produces 800 dots of the final image, each dot is represented by a combination of bi-level cyan, magenta, yellow and black ink. Because the printing is bi-level, the input image should be dithered or error-diffused for best results.

Each segment then contains 3,200 nozzles: 800 each of cyan, magenta, yellow and black. A four-inch printhead contains 8 such segments for a total of 25,600 nozzles.

6.1.1 Grouping of Nozzles Within a Segment

The nozzles within a single segment are grouped for reasons of physical stability as well as minimization of power consumption during printing. In terms of physical stability, a total of 10 nozzles share the same ink reservoir. In terms of power consumption, groupings are made to enable a low-speed and a high-speed printing mode.

The printhead supports two printing speeds to allow speed/power consumption trade-offs to be made in different product configurations.

In the low-speed printing mode, 128 nozzles are fired simultaneously from each 4-inch printhead. The fired nozzles should be maximally distant, so 16 nozzles are fired from each segment. To fire all 25,600 nozzles, 200 different sets of 128 nozzles must be fired.

In the high-speed printing mode, 256 nozzles are fired simultaneously from each 4-inch printhead. The fired nozzles should be maximally distant, so 32 nozzles are fired from each segment. To fire all 25,600 nozzles, 100 different sets of 256 nozzles must be fired.

The power consumption in the low-speed mode is half that of the high-speed mode. Note, however, that the energy consumed to print a page is the same in both cases.

6.1.1.1 Ten Nozzles Make a Pod

Figure 10:
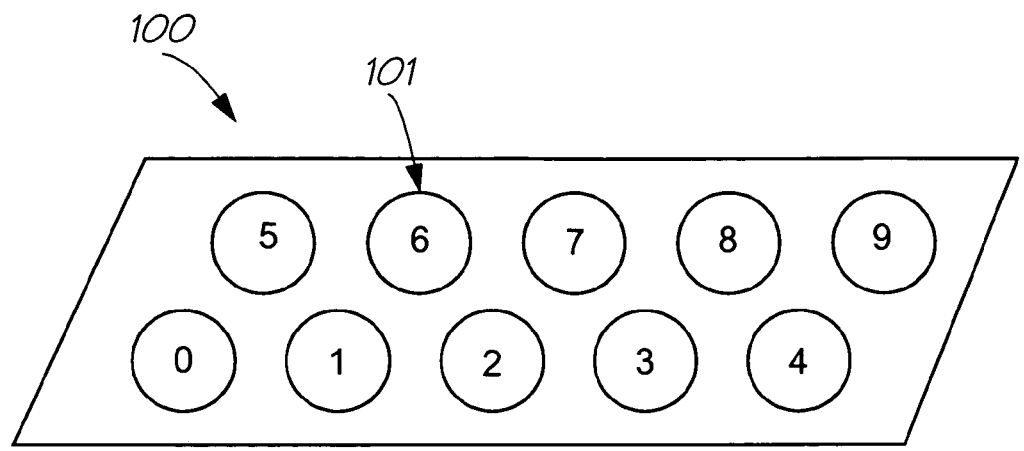
FIG. 10 is a schematic diagram of a pod of ten printing nozzles numbered in firing order.

A single pod 100 consists of 10 nozzles 101 sharing a common ink reservoir. 5 nozzles are in one row, and 5 are in another. Each nozzle produces dots 22.5 microns in diameter spaced on a 15.875 micron grid. FIG. 10 shows the arrangement of a single pod 100, with the nozzles 101 numbered according to the order in which they must be fired.

Figure 11:
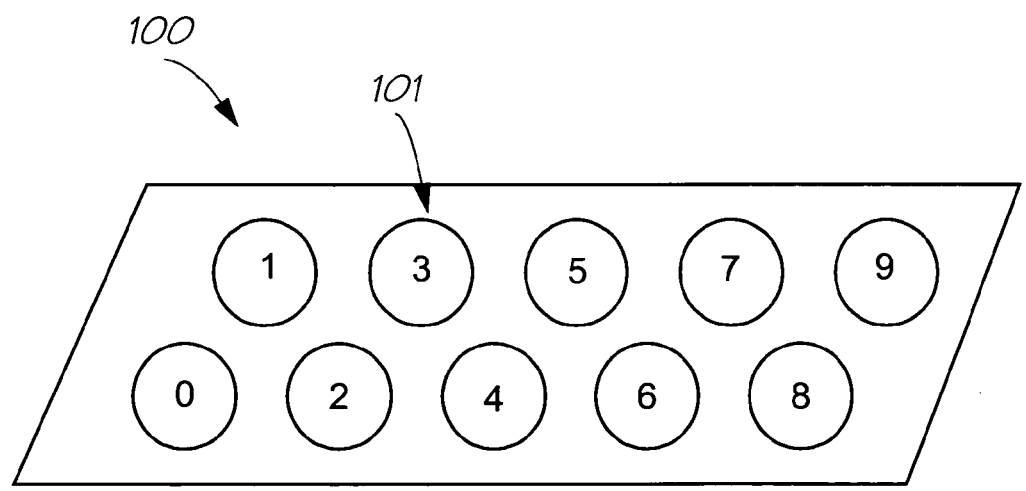
FIG. 11 is a schematic diagram of the same pod of ten printing nozzles numbered in load order.

Although the nozzles are fired in this order, the relationship of nozzles and physical placement of dots on the printed page is different. The nozzles from one row represent the even dots from one line on the page, and the nozzles on the other row represent the odd dots from the adjacent line on the page. FIG. 11 shows the same pod 100 with the nozzles numbered according to the order in which they must be loaded.

The nozzles within a pod are therefore logically separated by the width of 1 dot. The exact distance between the nozzles will depend on the properties of the MEMJET firing mechanism. The printhead is designed with staggered nozzles designed to match the flow of paper.

6.1.1.2 One Pod of Each Color Makes a Chromapod

Figure 12:
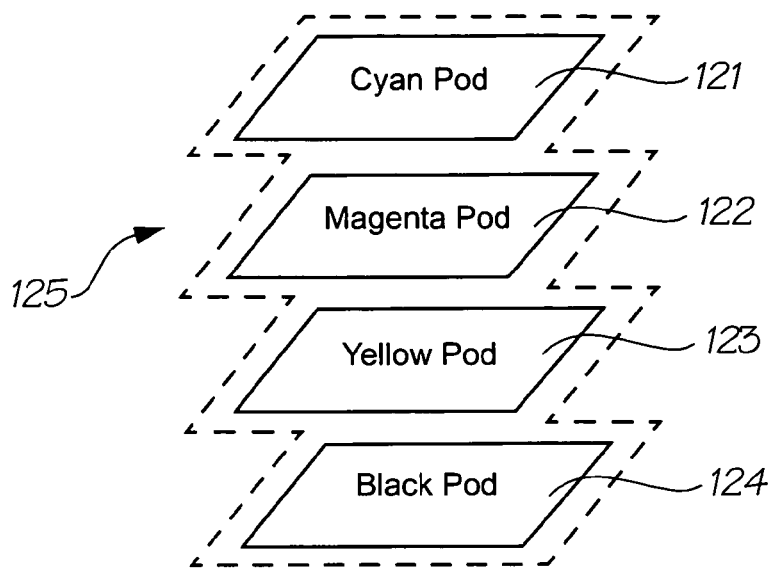
FIG. 12 is a schematic diagram of a chromapod.

One pod of each color, that is cyan 121, magenta 122, yellow 123 and black 124, are grouped into a chromapod 125. A chromapod represents different color components of the same horizontal set of 10 dots on different lines. The exact distance between different color pods depends on the MEMJET operating parameters, and may vary from one MEMJET design to another. The distance is considered to be a constant number of dot-widths, and must therefore be taken into account when printing: the dots printed by the cyan nozzles will be for different lines than those printed by the magenta, yellow or black nozzles. The printing algorithm must allow for a variable distance up to about 8 dot-widths between colors. FIG. 12 illustrates a single chromapod.

Figure 13:
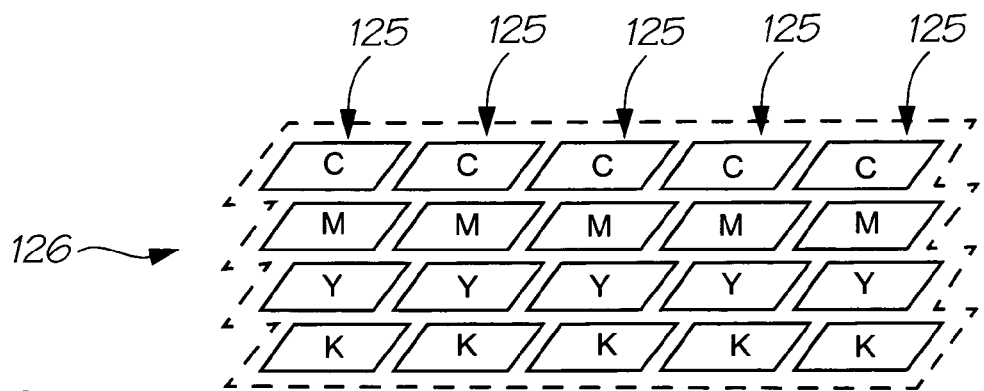
FIG. 13 is a schematic diagram of a podgroup of five chromapods.

6.1.1.3 Five Chromapods Make a Podgroup 5 chromapods 125 are organized into a single podgroup 126. Since each chromapod contains 40 nozzles, each podgroup contains 200 nozzles: 50 cyan, 50 magenta, 50 yellow, and 50 black nozzles. The arrangement is shown in FIG. 13, with chromapods numbered 0-4. Note that the distance between adjacent chromapods is exaggerated for clarity.

6.1.1.4 Two Podgroups Make a Phasegroup 2 podgroups 126 are organized into a single phasegroup 127. The phasegroup is so named because groups of nozzles within a phasegroup are fired simultaneously during a given firing phase (this is explained in more detail below). The formation of a phasegroup from 2 podgroups is entirely for the purposes of low-speed and high-speed printing via 2 PodgroupEnable lines.

During low-speed printing, only one of the two PodgroupEnable lines is set in a given firing pulse, so only one podgroup of the two fires nozzles. During high-speed printing, both PodgroupEnable lines are set, so both podgroups fire nozzles. Consequently a low-speed print takes twice as long as a high-speed print, since the high-speed print fires twice as many nozzles at once.

Figure 14:
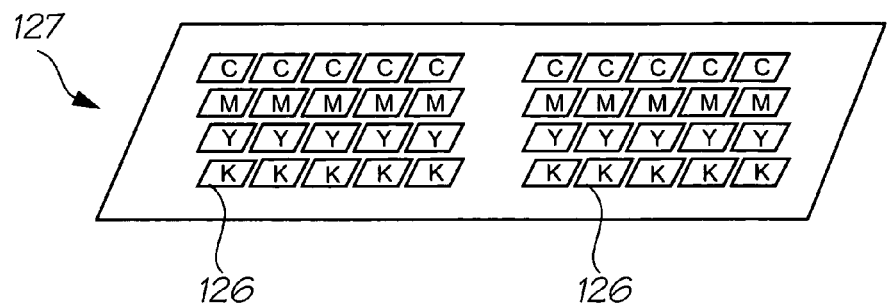
FIG. 14 is a schematic diagram of a phasegroup of two podgroups.

FIG. 14 illustrates the composition of a phasegroup. The distance between adjacent podgroups is exaggerated for clarity.

6.1.1.5 Two Phasegroups Make a Firegroup

Two phasegroups 127 (PhasegroupA and PhasegroupB) are organized into a single firegroup 128, with 4 firegroups in each segment 129. Firegroups are so named because they all fire the same nozzles simultaneously.

Figure 15:
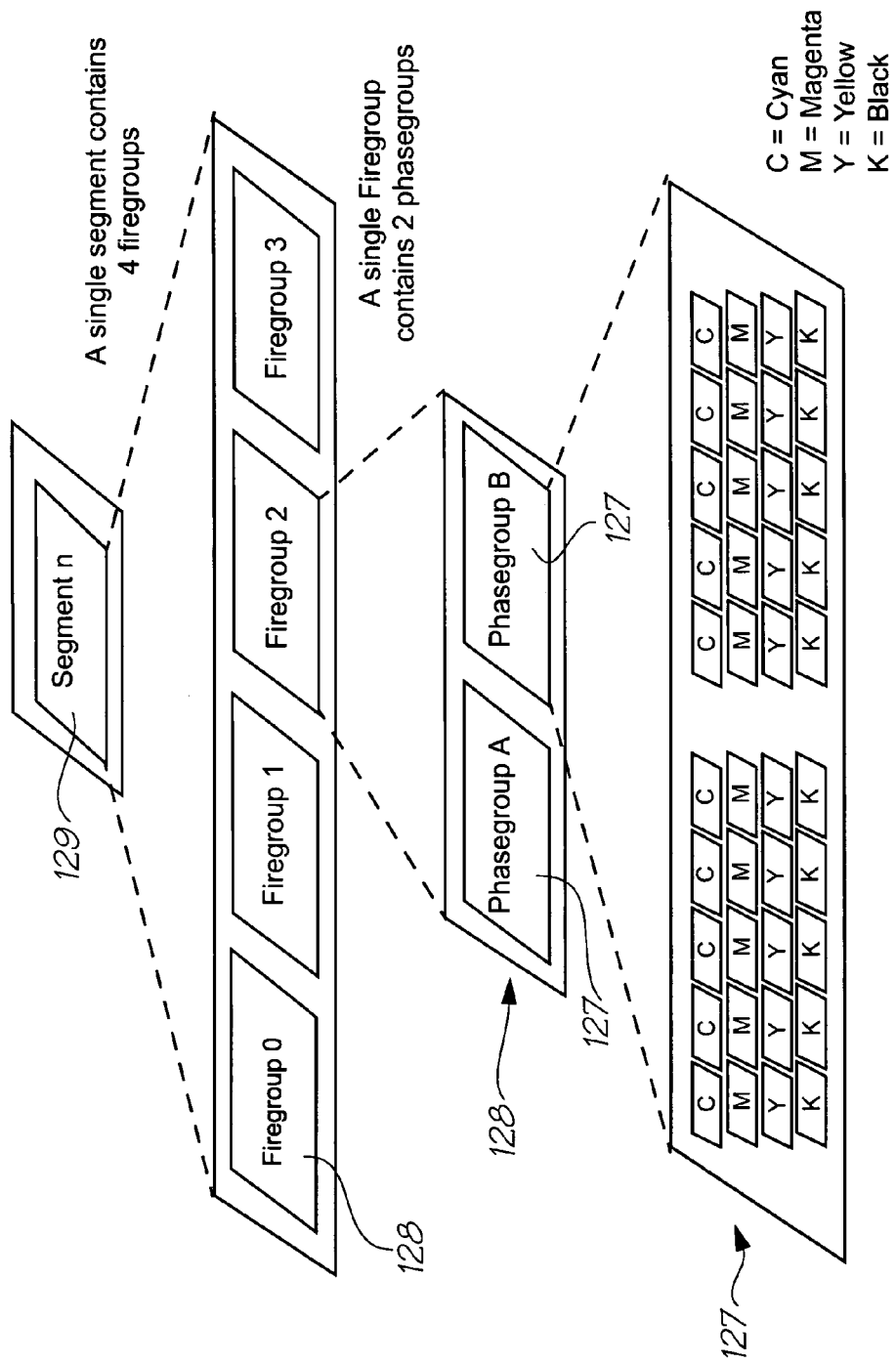
FIG. 15 is a schematic diagram showing the relationship between Segments, Firegroups, Phasegroups, Podgroups and Chromapods.

Two enable lines, AEnable and BEnable, allow the firing of PhasegroupA nozzles and PhasegroupB nozzles independently as different firing phases. The arrangement is shown in FIG. 15. The distance between adjacent groupings is exaggerated for clarity.

6.1.1.6 Nozzle Grouping Summary

Table 9 is a summary of the nozzle groupings in a printhead.

TABLE 9

Nozzle Groupings for a single 4-inch printhead

| Name of Grouping | Composition | Replication Ratio | Nozzle Count |
|---|---|---|---|
| Nozzle | Base unit | 1:1 | 1 |
| Pod | Nozzles per pod | 10:1 | 10 |
| Chromapod | Pods per CMYK chromapod | 4:1 | 40 |
| Podgroup | Chromapods per podgroup | 5:1 | 200 |
| Phasegroup | Podgroups per phasegroup | 2:1 | 400 |

TABLE 9-continued

Nozzle Groupings for a single 4-inch printhead

| Name of Grouping | Composition | Replication Ratio | Nozzle Count |
|---|---|---|---|
| Firegroup | Phasegroups per firegroup | 2:1 | 800 |
| Segment | Firegroups per segment | 4:1 | 3,200 |
| 4-inch printhead | Segments per 4-inch printhead | 8:1 | 25,600 |

An 8-inch printhead consists of two 4-inch printheads for a total of 51,200 nozzles.

6.1.2 Load and Print Cycles

A single 4-inch printhead contains a total of 25,600 nozzles. A Print Cycle involves the firing of up to all of these nozzles, dependent on the information to be printed. A Load Cycle involves the loading up of the printhead with the information to be printed during the subsequent Print Cycle.

Each nozzle has an associated NozzleEnable bit that determines whether or not the nozzle will fire during the Print Cycle. The NozzleEnable bits (one per nozzle) are loaded via a set of shift registers.

Logically there are 4 shift registers per segment (one per color), each 800 deep. As bits are shifted into the shift register for a given color they are directed to the lower and upper nozzles on alternate pulses. Internally, each 800-deep shift register is comprised of two 400-deep shift registers: one for the upper nozzles, and one for the lower nozzles. Alternate bits are shifted into the alternate internal registers. As far as the external interface is concerned however, there is a single 800 deep shift register.

Once all the shift registers have been fully loaded (800 load pulses), all of the bits are transferred in parallel to the appropriate NozzleEnable bits. This equates to a single parallel transfer of 25,600 bits. Once the transfer has taken place, the Print Cycle can begin. The Print Cycle and the Load Cycle can occur simultaneously as long as the parallel load of all NozzleEnable bits occurs at the end of the Print Cycle.

6.1.2.1 Load Cycle

The Load Cycle is concerned with loading the printhead's shift registers with the next Print Cycle's NozzleEnable bits.

Each segment has 4 inputs directly related to the cyan, magenta, yellow and black shift registers. These inputs are called CDataIn, MDataIn, YDataIn and KDataIn. Since there are 8 segments, there are a total of 32 color input lines per 4-inch printhead. A single pulse on the SRClock line (shared between all 8 segments) transfers the 32 bits into the appropriate shift registers. Alternate pulses transfer bits to the lower and upper nozzles respectively. Since there are 25,600 nozzles, a total of 800 pulses are required for the transfer. Once all 25,600 bits have been transferred, a single pulse on the shared PTransfer line causes the parallel transfer of data from the shift registers to the appropriate NozzleEnable bits.

The parallel transfer via a pulse on PTransfer must take place after the Print Cycle has finished. Otherwise the NozzleEnable bits for the line being printed will be incorrect.

Since all 8 segments are loaded with a single SRClock pulse, any printing process must produce the data in the correct sequence for the printhead. As an example, the first SRClock pulse will transfer the CMYK bits for the next Print Cycle's dot 0, 800, 1600, 2400, 3200, 4000, 4800, and 5600. The second SRClock pulse will transfer the CMYK bits for the next Print Cycle's dot 1, 801, 1601, 2401, 3201, 4001, 4801 and 5601. After 800 SRClock pulses, the PTransfer pulse can be given.

It is important to note that the odd and even CMYK outputs, although printed during the same Print Cycle, do not appear on the same physical output line. The physical separation of odd and even nozzles within the printhead, as well as separation between nozzles of different colors ensures that they will produce dots on different lines of the page. This relative difference must be accounted for when loading the data into the printhead. The actual difference in lines depends on the characteristics of the inkjet mechanism used in the printhead. The differences can be defined by variables $D_1$ and $D_2$ where $D_1$ is the distance between nozzles of different colors, and $D_2$ is the distance between nozzles of the same color. Table 10 shows the dots transferred to segment n of a printhead on the first 4 pulses.

TABLE 10

Order of Dots Transferred to a 4-inch Printhead

| Pulse | Dot | Black Line | Yellow Line | Magenta Line | Cyan Line |
|---|---|---|---|---|---|
| 1 | $800S^a$ | N | $N + D_1^b$ | $N + 2D_1$ | $N + 3D_1$ |
| 2 | $800S + 1$ | $N + D_2^c$ | $N + D_1 + D_2$ | $N + 2D_1 + D_2$ | $N + 3D_1 + D_2$ |
| 3 | $800S + 2$ | N | $N + D_1$ | $N + 2D_1$ | $N + 3D_1$ |
| 4 | $800S + 3$ | $N + D_2$ | $N + D_1 + D_2$ | $N + 2D_1 + D_2$ | $N + 3D_1 + D_2$ |

[a] S = segment number (0–7)
[b] $D_1$ = number of lines between the nozzles of one color and the next (likely = 4–8)
[c] $D_2$ = number of lines between two rows of nozzles of the same color (likely = 1)

And so on for all 800 pulses.

Data can be clocked into the printhead at a maximum rate of 20 MHz, which will load the entire data for the next line in 40 Ts.

6.1.2.2 Print Cycle

A 4-inch printhead contains 25,600 nozzles. To fire them all at once would consume too much power and be problematic in terms of ink refill and nozzle interference. Consequently two firing modes are defined: a low-speed printing mode and a high-speed printing mode:

In the low-speed print mode, there are 200 phases, with each phase firing 128 nozzles. This equates to 16 nozzles per segment, or 4 per firegroup.

In the high-speed print mode, there are 100 phases, with each phase firing 256 nozzles. This equates to 32 nozzles per segment, or 8 per firegroup.

The nozzles to be fired in a given firing pulse are determined by 3 bits ChromapodSelect (select 1 of 5 chromapods from a firegroup)

4 bits NozzleSelect (select 1 of 10 nozzles from a pod)

2 bits of PodgroupEnable lines (select 0, 1, or 2 podgroups to fire)

When one of the PodgroupEnable lines is set, only the specified Podgroup's 4 nozzles will fire as determined by ChromapodSelect and NozzleSelect. When both of the PodgroupEnable lines are set, both of the podgroups will fire their nozzles. For the low-speed mode, two fire pulses are required, with PodgroupEnable=10 and 01 respectively. For the high-speed mode, only one fire pulse is required, with PodgroupEnable=11.

The duration of the firing pulse is given by the AEnable and BEnable lines, which fire the PhasegroupA and PhasegroupB nozzles from all firegroups respectively. The typical duration of a firing pulse is 1.3-1.8 Ts. The duration of a pulse depends on the viscosity of the ink (dependent on temperature and ink characteristics) and the amount of power available to the printhead. See Section 6.1.3 for details on feedback from the printhead in order to compensate for temperature change.

The AEnable and BEnable are separate lines in order that the firing pulses can overlap. Thus the 200 phases of a low-speed Print Cycle consist of 100 A phases and 100 B phases, effectively giving 100 sets of Phase A and Phase B. Likewise, the 100 phases of a high-speed print cycle consist of 50 A phases and 50 B phases, effectively giving 50 phases of phase A and phase B.

Figure 16:
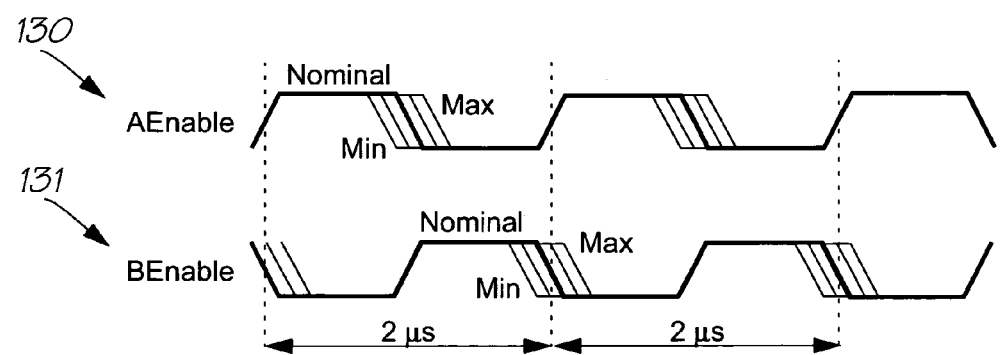
FIG. 16 is a phase diagram of the AEnable and BEnable lines during a typical Print Cycle.

FIG. 16 shows the Aenable 130 and Benable 131 lines during a typical Print Cycle. In a high-speed print there are 50 cycles of 2 Ts each, while in a low-speed print there are 100 cycles of 2 Ts each. As shown in the Figure, slight variations in minimum and maximum half cycle times about the nominal, are acceptable.

For the high-speed printing mode, the firing order is:

ChromapodSelect 0, NozzleSelect 0, PodgroupEnable 11 (Phases A and B)

ChromapodSelect 1, NozzleSelect 0, PodgroupEnable 11 (Phases A and B)

ChromapodSelect 2, NozzleSelect 0, PodgroupEnable 11 (Phases A and B)

ChromapodSelect 3, NozzleSelect 0, PodgroupEnable 11 (Phases A and B)

ChromapodSelect 4, NozzleSelect 0, PodgroupEnable 11 (Phases A and B)

ChromapodSelect 0, NozzleSelect 1, PodgroupEnable 11 (Phases A and B)

. . .

ChromapodSelect 3, NozzleSelect 9, PodgroupEnable 11 (Phases A and B)

ChromapodSelect 4, NozzleSelect 9, PodgroupEnable 11 (Phases A and B)

For the low-speed printing mode, the firing order is similar. For each phase of the high speed mode where PodgroupEnable was 11, two phases of PodgroupEnable=01 and 10 are substituted as follows:

ChromapodSelect 0, NozzleSelect 0, PodgroupEnable 01 (Phases A and B)

ChromapodSelect 0, NozzleSelect 0, PodgroupEnable 10 (Phases A and B)

ChromapodSelect 1, NozzleSelect 0, PodgroupEnable 01 (Phases A and B)

ChromapodSelect 1, NozzleSelect 0, PodgroupEnable 10 (Phases A and B)

. . .

ChromapodSelect 3, NozzleSelect 9, PodgroupEnable 01 (Phases A and B)

ChromapodSelect 3, NozzleSelect 9, PodgroupEnable 10 (Phases A and B)

ChromapodSelect 4, NozzleSelect 9, PodgroupEnable 01 (Phases A and B)

ChromapodSelect 4, NozzleSelect 9, PodgroupEnable 10 (Phases A and B)

When a nozzle fires, it takes approximately 100 Ts to refill. The nozzle cannot be fired before this refill time has elapsed. This limits the fastest printing speed to 100 Ts per line. In the high-speed print mode, the time to print a line is 100 Ts, so the time between firing a nozzle from one line to the next matches the refill time. The low-speed print mode is slower than this, so is also acceptable.

The firing of a nozzle also causes acoustic perturbations for a limited time within the common ink reservoir of that nozzle's pod. The perturbations can interfere with the firing of another nozzle within the same pod. Consequently, the firing of nozzles within a pod should be offset from each other as long as possible. We therefore fire four nozzles from a chromapod (one nozzle per color) and then move onto the next chromapod within the podgroup.

In the low-speed printing mode the podgroups are fired separately. Thus the 5 chromapods within both podgroups must all fire before the first chromapod fires again, totalling 10×2 T cycles. Consequently each pod is fired once per 20 Ts.

In the high-speed printing mode, the podgroups are fired together. Thus the 5 chromapods within a single podgroups must all fire before the first chromapod fires again, totalling 5×2 T cycles. Consequently each pod is fired once per 10 Ts.

As the ink channel is 300 microns long and the velocity of sound in the ink is around 1500 m/s, the resonant frequency of the ink channel is 2.5 MHz. Thus the low-speed mode allows 50 resonant cycles for the acoustic pulse to dampen, and the high-speed mode allows 25 resonant cycles. Consequently any acoustic interference is minimal in both cases.

6.1.3 Feedback from the Printhead

The printhead produces several lines of feedback (accumulated from the 8 segments). The feedback lines are used to adjust the timing of the firing pulses. Although each segment produces the same feedback, the feedback from all segments share the same tri-state bus lines. Consequently only one segment at a time can provide feedback.

A pulse on the SenseSegSelect line ANDed with data on Cyan selects which segment will provide the feedback. The feedback sense lines will come from the selected segment until the next SenseSegSelect pulse. The feedback sense lines are as follows:

Tsense informs the controller how hot the printhead is. This allows the controller to adjust timing of firing pulses, since temperature affects the viscosity of the ink.

Vsense informs the controller how much voltage is available to the actuator. This allows the controller to compensate for a flat battery or high voltage source by adjusting the pulse width.

Rsense informs the controller of the resistivity (Ohms per square) of the actuator heater. This allows the controller to adjust the pulse widths to maintain a constant energy irrespective of the heater resistivity;

Wsense informs the controller of the width of the critical part of the heater, which may vary up to ±5% due to lithographic and etching variations. This allows the controller to adjust the pulse width appropriately.

6.1.4 Preheat Cycle

The printing process has a strong tendency to stay at the equilibrium temperature. To ensure that the first section of the printed photograph has a consistent dot size, the equilibrium temperature must be met before printing any dots. This is accomplished via a preheat cycle.

The Preheat cycle involves a single Load Cycle to all nozzles with 1s (i.e. setting all nozzles to fire), and a number of short firing pulses to each nozzle. The duration of the pulse must be insufficient to fire the drops, but enough to heat up the ink. Altogether about 200 pulses for each nozzle are required, cycling through in the same sequence as a standard Print Cycle.

Feedback during the Preheat mode is provided by Tsense, and continues until equilibrium temperature is reached (about 30° C. above ambient). The duration of the Preheat mode is around 50 milliseconds, and depends on the ink composition.

Preheat is performed before each print job. This does not affect performance as it is done while the data is being transferred to the printer.

6.1.5 Cleaning Cycle

In order to reduce the chances of nozzles becoming clogged, a cleaning cycle can be undertaken before each print job. Each nozzle is fired a number of times into an absorbent sponge.

The cleaning cycle involves a single Load Cycle to all nozzles with 1s (i.e. setting all nozzles to fire), and a number of firing pulses to each nozzle. The nozzles are cleaned via the same nozzle firing sequence as a standard Print Cycle. The number of times that each nozzle is fired depends upon the ink composition and the time that the printer has been idle. As with preheat, the cleaning cycle has no effect on printer performance.

6.1.6 Printhead Interface Summary

A single 4-inch printhead has the connections shown in Table 11:

TABLE 11

Four-inch Printhead Connections

| Name | #Pins | Description |
| --- | --- | --- |
| ChromapodSelect | 3 | Select which chromapod will fire (0-4) |
| NozzleSelect | 4 | Select which nozzle from the pod will fire (0-9) |
| PodgroupEnable | 2 | Enable the podgroups to fire (choice of: 01, 10, 11) |
| AEnable | 1 | Firing pulse for phasegroup A |
| BEnable | 1 | Firing pulse for phasegroup B |
| CDataIn[0-7] | 8 | Cyan input to cyan shift register of segments 0-7 |
| MDataIn[0-7] | 8 | Magenta input to magenta shift register of segments 0-7 |
| YDataIn[0-7] | 8 | Yellow input to yellow shift register of segments 0-7 |
| KDataIn[0-7] | 8 | Black input to black shift register of segments 0-7 |
| SRClock | 1 | A pulse on SRClock (ShiftRegisterClock) loads the current values from CDataIn[0-7], MDataIn[0-7], YDataIn[0-7] and KDataIn[0-7] into the 32 shift registers. |

TABLE 11-continued

Four-inch Printhead Connections

| Name | #Pins | Description |
| --- | --- | --- |
| PTransfer | 1 | Parallel transfer of data from the shift registers to the internal NozzleEnable bits (one per nozzle). |
| SenseSegSelect | 1 | A pulse on SenseSegSelect ANDed with data on CDataIn[n] selects the sense lines for segment n. |
| Tsense | 1 | Temperature sense |
| Vsense | 1 | Voltage sense |
| Rsense | 1 | Resistivity sense |
| Wsense | 1 | Width sense |
| Logic GND | 1 | Logic ground |
| Logic PWR | 1 | Logic power |
| V− | Bus bars | Actuator Ground |
| V+ | | Actuator Power |
| TOTAL | 52 | |

TABLE 12

Four Inch Printhead Internal Segment Connections

| Name | # Pins | Description |
| --- | --- | --- |
| Chromapod Select | 3 | Select which chromapod will fire (0-4) |
| NozzleSelect | 4 | Select which nozzle from the pod will fire (0-9) |
| PodgroupEnable | 2 | Enable the podgroups to fire (choice of: 01, 10, 11) |
| AEnable | 1 | Firing pulse for podgroup A |
| BEnable | 1 | Firing pulse for podgroup B |
| CDataIn | 1 | Cyan input to cyan shift register |
| MDataIn | 1 | Magenta input to magenta shift register |
| YDataIn | 1 | Yellow input to yellow shift register |
| KDataIn | 1 | Black input to black shift register |
| SRClock | 1 | A pulse on SRClock (ShiftRegisterClock) loads the current values from CDataIn, MDataIn, YDataIn and KDataIn into the 4 shift registers. |
| PTransfer | 1 | Parallel transfer of data from the shift registers to the internal NozzleEnable bits (one per nozzle). |
| SenseSegSelect | 1 | A pulse on SenseSegSelect ANDed with data on CDataIn selects the sense lines for this segment. |
| Tsense | 1 | Temperature sense |
| Vsense | 1 | Voltage sense |
| Rsense | 1 | Resistivity sense |
| Wsense | 1 | Width sense |
| Logic GND | 1 | Logic ground |
| Logic PWR | 1 | Logic power |
| V− | 21 | Actuator Ground |
| V+ | 21 | Actuator Power |
| TOTAL | 66 | (66 × 8 segments = 528 for all segments) |

6.2 8-inch Printhead Considerations

An 8-inch MEMJET printhead is simply two 4-inch printheads physically placed together. The printheads are wired together and share many common connections in order that the number of pins from a controlling chip is reduced and that the two printheads can print simultaneously. A number of details must be considered because of this.

6.2.1 Connections

Since firing of nozzles from the two printheads occurs simultaneously, the ChromapodSelect, NozzleSelect, AEnable and BEnable lines are shared. For loading the printheads with data, the 32 lines of CDataIn, MDataIn, YDataIn and KDataIn are shared, and 2 different SRClock lines are used to determine which of the two printheads is to be loaded. A single PTransfer pulse is used to transfer the loaded data into the NozzleEnable bits for both printheads. Similarly, the Tsense, Vsense, Rsense, and Wsense lines are shared, with 2 SenseEnable lines to distinguish between the two printheads.

Therefore the two 4-inch printheads share all connections except SRClock and SenseEnable. These two connections are repeated, once for each printhead. The actual connections are shown here in Table 13:

TABLE 13

8-inch Printhead Connections

| Name | # Pins | Description |
| --- | --- | --- |
| Chrompod Select | 3 | Select which chromapod will fire (0-4) |
| NozzleSelect | 4 | Select which nozzle from the pod will fire (0-9) |
| PodgroupEnable | 2 | Enable the podgroups to fire (choice of: 01, 10, 11) |
| AEnable | 1 | Firing pulse for podgroup A |
| BEnable | 1 | Firing pulse for podgroup B |
| CDataIn[0-7] | 8 | Cyan input to cyan shift register of segments 0-7 |
| MDataIn[0-7] | 8 | Magenta input to magenta shift register of segments 0-7 |
| YDataIn[0-7] | 8 | Yellow input to yellow shift register of segments 0-7 |
| KDataIn[0-7] | 8 | Black input to black shift register of segments 0-7 |
| SRClock1 | 1 | A pulse on SRClock (ShiftRegisterClock) loads the current values from CDataIn[0-7], MDataIn[0-7], YDataIn[0-7] and KDataIn[0-7] into the 32 shift registers for 4-inch printhead 1. |
| SRClock2 | 1 | A pulse on SRClock (ShiftRegisterClock) loads the current values from CDataIn[0-7], MDataIn[0-7] YDataIn[0-7] and KDataIn[0-7] into the 32 shift registers for 4-inch printhead 2. |
| PTransfer | 1 | Parallel transfer of data from the shift registers to the internal NozzleEnable bits (one per nozzle). |
| SenseSegSelect1 | 1 | A pulse on 4-inch printhead 1's SenseSegSelect line ANDed with data on CDataIn[n] selects the sense lines for segment n. |
| SenseSegSelect2 | 1 | A pulse on 4-inch printhead 2's SenseSegSelect line ANDed with data on CDataIn[n] selects the sense lines for segment n. |
| Tsense | 1 | Temperature sense |
| Vsense | 1 | Voltage sense |
| Rsense | 1 | Resistivity sense |
| Wsense | 1 | Width sense |
| Logic GND | 1 | Logic ground |
| Logic PWR | 1 | Logic power |
| V− | Bus bars | Actuator Ground |
| V+ | bars | Actuator Power |
| TOTAL | 54 | |

6.2.2 Timing

The joining of two 4-inch printheads and wiring of appropriate connections enables an 8-inch wide image to be printed as fast as a 4-inch wide image. However, there is twice as much data to transfer to the 2 printheads before the next line can be printed. Depending on the desired speed for the output image to be printed, data must be generated and transferred at appropriate speeds in order to keep up.

6.2.2.1 Example

As an example, consider the timing of printing an 8"×12" page in 2 seconds. In order to print this page in 2 seconds, the 8-inch printhead must print 19,200 lines (12×1600). Rounding up to 20,000 lines in 2 seconds yields a line time of 100 Ts. A single Print Cycle and a single Load Cycle must both finish within this time. In addition, a physical process external to the printhead must move the paper an appropriate amount.

From the printing point of view, the high-speed print mode allows a 4-inch printhead to print an entire line in 100 Ts. Both 4-inch printheads must therefore be run in high-speed print mode to print simultaneously. Therefore 512 nozzles fire per firing pulse, thereby enabling the printing of an 8-inch line within the specified time.

The 800 SRClock pulses to both 4-inch printheads (each clock pulse transferring 32 bits) must also take place within the 100 T line time. If both printheads are loaded simultaneously (64 data lines), the length of an SRClock pulse cannot exceed 100 Ts/800=125 nanoseconds, indicating that the printhead must be clocked at 8 MHz. If the two printheads are loaded one at a time (32 shared data lines), the length of an SRClock pulse cannot exceed 100 Ts/1600=62.5 nanoseconds. The printhead must therefore be clocked at 16 MHz. In both instances, the average time to calculate each bit value (for each of the 51,200 nozzles) must not exceed 100 Ts/51,200=2 nanoseconds. This requires a dot generator running at one of the following speeds:

500 MHz generating 1 bit (dot) per cycle
250 MHz generating 2 bits (dots) per cycle
125 MHz generating 4 bits (dots) per cycle 7 Printer Controller 7.1 Printer Controller Architecture The printer controller consists of the iPrint central processor (ICP) chip 83, a 64 MBit RDRAM 82, and the master QA chip 85, as shown in FIG. 8.

Figure 17:
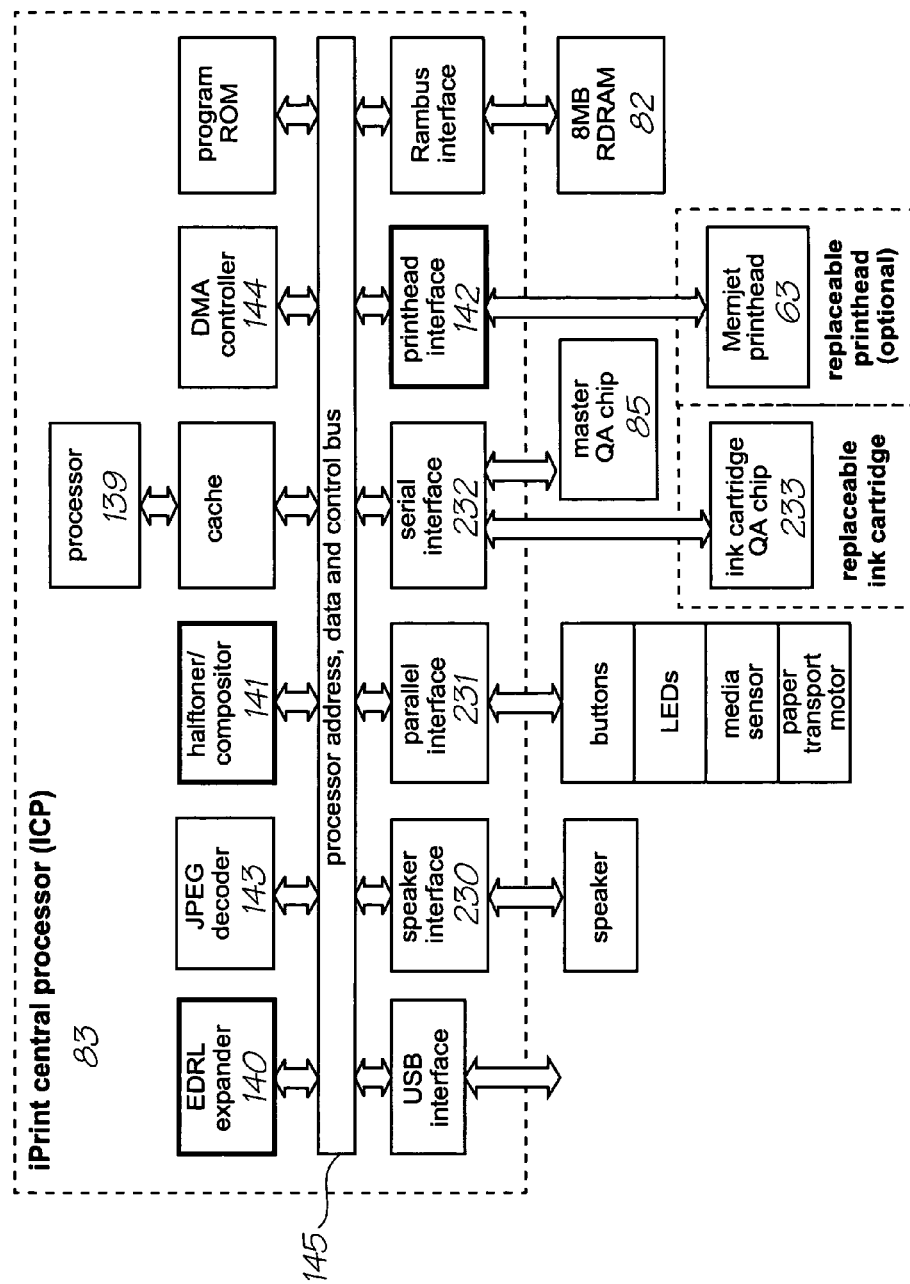
FIG. 17 is a diagram of the Printer controller architecture.
Figure 18:
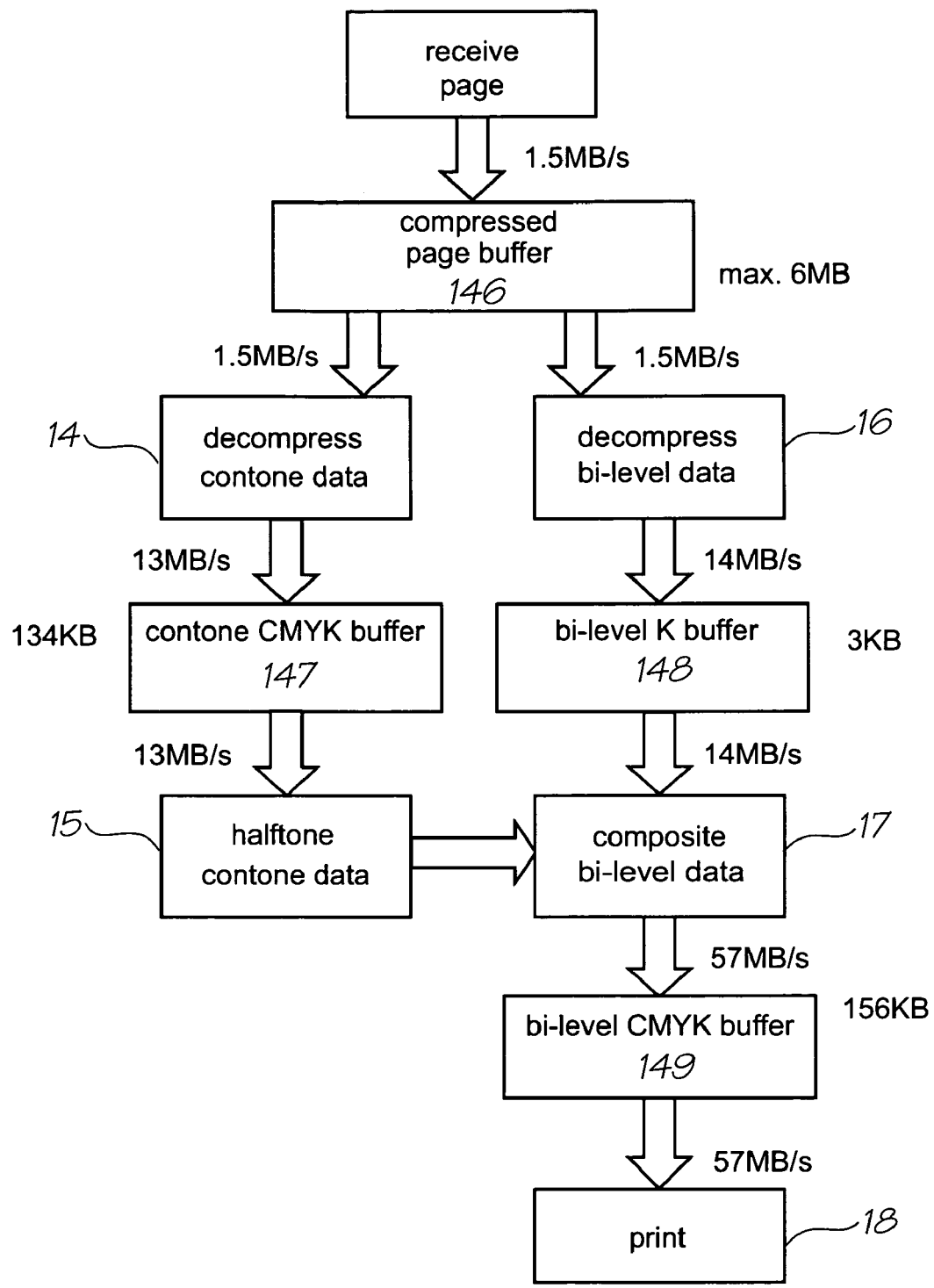
FIG. 18 is a flowchart summarising the page expansion and printing data flow.

The ICP 83 contains a general-purpose processor 139 and a set of purpose-specific functional units controlled by the processor via the processor bus, as shown in FIG. 17. Only three functional units are non-standard—the EDRL expander 140, the halftoner/compositor 141, and the printhead interface 142 which controls the MEMJET printhead.

Software running on the processor coordinates the various functional units to receive, expand and print pages. This is described in the next section.

The various functional units of the ICP are described in subsequent sections.

7.2 Page Expansion and Printing

Page expansion and printing proceeds as follows. A page description is received from the host via the USB interface 146 and is stored in main memory. 6 MB of main memory is dedicated to page storage. This can hold two pages each not exceeding 3 MB, or one page up to 6 MB. If the host generates pages not exceeding 3 MB, then the printer operates in streaming mode—i.e. it prints one page while receiving the next. If the host generates pages exceeding 3

MB, then the printer operates in single-page mode—i.e. it receives each page and prints it before receiving the next. If the host generates pages exceeding 6 MB then they are rejected by the printer. In practice the printer driver prevents this from happening.

A page consists of two parts—the bi-level black layer, and the contone layer. These are compressed in distinct formats—the bi-level black layer in EDRL format, the contone layer in JPEG format. The first stage of page expansion consists of decompressing the two layers in parallel. The bi-level layer is decompressed 16 by the EDRL expander unit 140, the contone layer 14 by the JPEG decoder 143.

The second stage of page expansion consists of halftoning 15 the contone CMYK data to bi-level CMYK, and then compositing 17 the bi-level black layer over the bi-level CMYK layer. The halftoning and compositing is carried out by the halftoner/compositor unit 141.

Finally, the composited bi-level CMYK image is printed 18 via the printhead interface unit 142, which controls the MEMJET printhead.

Because the MEMJET printhead prints at high speed, the paper must move past the printhead at a constant velocity. If the paper is stopped because data can't be fed to the printhead fast enough, then visible printing irregularities will occur. It is therefore important to transfer bi-level CMYK data to the printhead interface at the required rate.

A fully-expanded 1600 dpi bi-level CMYK page has a size of 114.3 MB. Because it is impractical to store an expanded page in printer memory, each page is expanded in real time during printing. Thus the various stages of page expansion and printing are pipelined. The page expansion and printing data flow is described in Table 14. The aggregate traffic to/from main memory of 174 MB/s is well within the capabilities of current technologies such as Rambus.

TABLE 14

Page expansion and printing data flow

| process | input | input window | output | output window | input rate | output rate |
|---|---|---|---|---|---|---|
| receive contone | — | — | JPEG stream | 1 | — | 1.5 MB/s 3.3 Mp/s |
| receive bi-level | — | — | EDRL stream | 1 | — | 1.5 MB/s 30 Mp/s |
| decompress contone | JPEG stream | — | 32-bit CMYK | 8 | 1.5 MB/s 3.3 Mp/s | 13 MB/s 3.3 Mp/s |
| decompress bi-level | EDRL stream | — | 1-bit K | 1 | 1.5 MB/s 30 Mp/s[a] | 14 MB/s 120 Mp/s |
| halftone | 32-bit CMYK | 1 | —[b] | — | 13 MB/s 3.3 Mp/s[c] | — |
| composite | 1-bit K | 1 | 4-bit CMYK | 1 | 14 MB/s 120 Mp/s | 57 MB/s 120 Mp/s |
| print | 4-bit CMYK | 24, 1[d] | — | — | 57 MB/s 120 Mp/s 87 MB/s | — — 87 MB/s 174 MB/s |

[a]800 dpi ⇒ 1600 dpi (2 × 2 expansion)
[b]halftone combines with composite, so there is no external data flow between them
[c]267 ppi ⇒ 1600 dpi (6 × 6 expansion)
[d]Needs a window of 24 lines, but only advances 1 line Each stage communicates with the next via a shared FIFO in main memory. Each FIFO is organised into lines, and the minimum size (in lines) of each FIFO is designed to accommodate the output window (in lines) of the producer and the input window (in lines) of the consumer. The inter-stage main memory buffers are described in Table 15. The aggregate buffer space usage of 6.3 MB leaves 1.7 MB free for program code and scratch memory (out of the 8 MB available).

TABLE 15

Page expansion and printing main memory buffers

| buffer | organisation and line size | number of lines | buffer size |
|---|---|---|---|
| compressed page buffer 146 | byte stream (one or two pages) | — | 6 MB |
| contone CMYK buffer 147 | 32-bit interleaved CMYK (267 ppi × 8" × 32 = 8.3 KB) | 8 × 2 = 16 | 134 KB |
| bi-level K buffer 148 | 1-bit K (800 dpi × 8" × 1 = 1.5 KB) | 1 × 2 = 2 | 3 KB |
| bi-level CMYK buffer 149 | 4-bit planar odd/even CMYK (1600 dpi × 8" × 4 = 6.3 KB) | 24 + 1 = 25 | 156 KB |
| | | | 6.3 MB |

Contone page decompression is carried out by the JPEG decoder 143. Bi-level page decompression is carried out by the EDRL expander 140. Halftoning and compositing is carried out by the halftoner/compositor unit 141. These functional units are described in the following sections.

7.2.1 DMA Approach

Each functional unit contains one or more on-chip input and/or output FIFOs. Each FIFO is allocated a separate channel in the multi-channel DMA controller 144. The DMA controller 144 handles single-address rather than double-address transfers, and so provides a separate request/acknowledge interface for each channel.

Each functional unit stalls gracefully whenever an input FIFO is exhausted or an output FIFO is filled.

The processor 139 programs each DMA transfer. The DMA controller 144 generates the address for each word of the transfer on request from the functional unit connected to the channel. The functional unit latches the word onto or off the data bus 145 when its request is acknowledged by the DMA controller 144. The DMA controller 144 interrupts the processor 139 when the transfer is complete, thus allowing the processor 139 to program another transfer on the same channel in a timely fashion.

In general the processor 139 will program another transfer on a channel as soon as the corresponding main memory FIFO is available (i.e. non-empty for a read, non-full for a write).

The granularity of channel servicing implemented in the DMA controller 144 depends somewhat on the latency of main memory.

7.2.2 EDRL Expander

Figure 19:
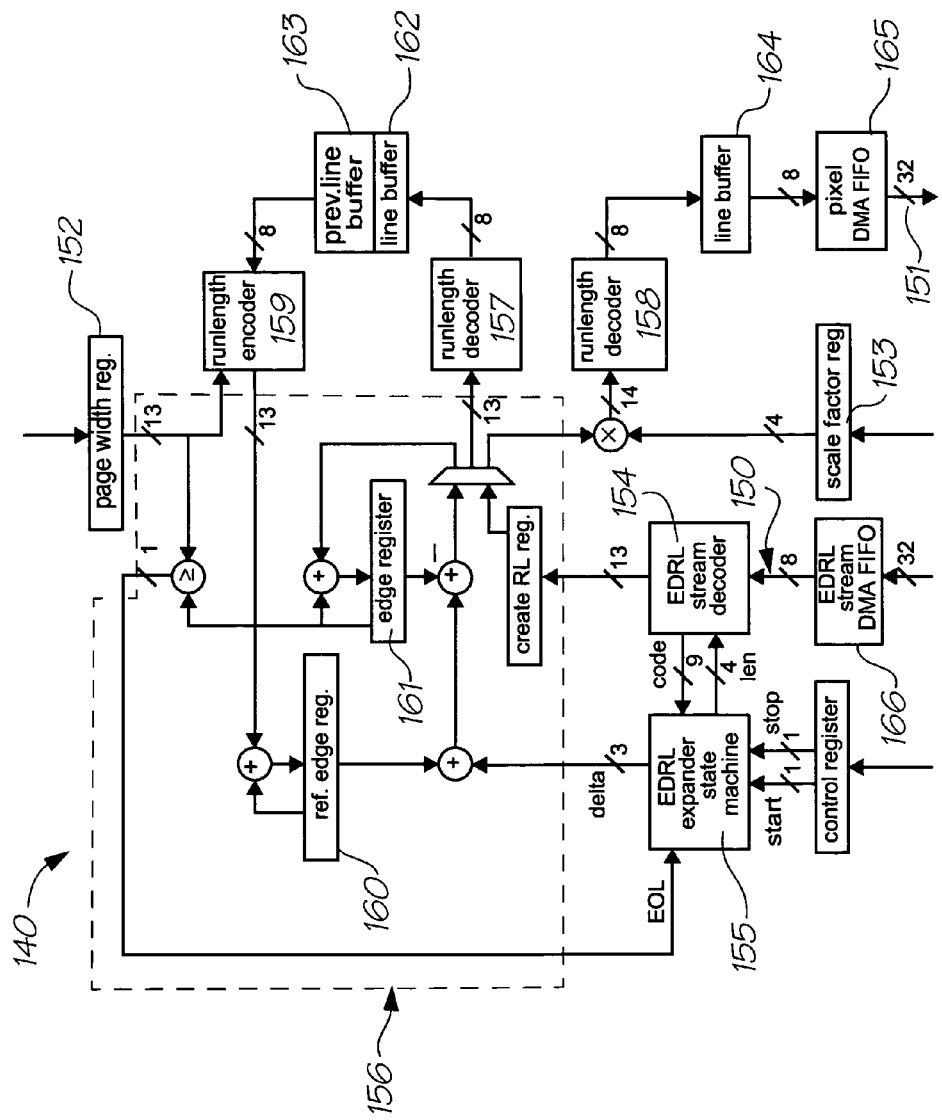
FIG. 19 is a block diagram of the EDRL expander unit.

The EDRL expander unit (EEU) 140, shown in FIG. 19, decompresses an EDRL-compressed bi-level image.

The input to the EEU is an EDRL bitstream 150. The output from the EEU is a set of bi-level image lines 151, scaled horizontally from the resolution of the expanded bi-level image by an integer scale factor to 1600 dpi.

Once started, the EEU proceeds until it detects an end-of-page code in the EDRL bitstream, or until it is explicitly stopped via its control register.

The EEU relies on an explicit page width to decode the bitstream. This must be written to the page width register 152 prior to starting the EEU.

The scaling of the expanded bi-level image relies on an explicit scale factor. This must be written to the scale factor register 153 prior to starting the EEU.

TABLE 16

EDRL expander control and configuration registers

| register | width | description |
| --- | --- | --- |
| start | 1 | Start the EEU. |
| stop | 1 | Stop the EEU. |
| page width | 13 | Page width used during decoding to detect end-of-line. |
| scale factor | 4 | Scale factor used during scaling of expanded image. |

The EDRL compression format is described in Section 5.2.3. It represents a bi-level image in terms of its edges. Each edge in each line is coded relative to an edge in the previous line, or relative to the previous edge in the same line. No matter how it is coded, each edge is ultimately decoded to its distance from the previous edge in the same line. This distance, or runlength, is then decoded to the string of one bits or zero bits which represent the corresponding part of the image. The decompression algorithm is also defined in Section 5.2.3.2.

The EEU consists of a bitstream decoder 154, a state machine 155, edge calculation logic 156, two runlength decoders 157 and 158, and a runlength (re)encoder 159.

The bitstream decoder 154 decodes an entropy-coded codeword from the bitstream and passes it to the state machine 155. The state machine 155 returns the size of the codeword to the bitstream decoder 154, which allows the decoder 154 to advance to the next codeword. In the case of a create edge code, the state machine 155 uses the bitstream decoder to extract the corresponding runlength from the bitstream. The state machine controls the edge calculation logic and runlength decoding/encoding as defined in Table 18.

The edge calculation logic is quite simple. The current edge offset in the previous (reference) and current (coding) lines are maintained in the reference edge register 160 and edge register 161 respectively. The runlength associated with a create edge code is output directly to the runlength decoders, and is added to the current edge. A delta code is translated into a runlength by adding the associated delta to the reference edge and subtracting the current edge. The generated runlength is output to the runlength decoders, and is added to the current edge. The next runlength is extracted from the runlength encoder 159 and added to the reference edge 160. A kill edge code simply causes the current reference edge to be skipped. Again the next runlength is extracted from the runlength encoder and added to the reference edge.

Each time the edge calculation logic 156 generates a runlength representing an edge, it is passed to the runlength decoders. While the runlength decoder decodes the run it generates a stall signal to the state machine. Since the runlength decoder 157 is slower than the edge calculation logic, there's not much point in decoupling it. The expanded line accumulates in a line buffer 162 large enough to hold an 8" 800 dpi line (800 bytes).

The previously expanded line is also buffered 163. It acts as a reference for the decoding of the current line. The previous line is re-encoded as runlengths on demand. This is less expensive than buffering the decoded runlengths of the previous line, since the worst case is one 13-bit runlength for each pixel (20 KB at 1600 dpi). While the runlength encoder 159 encodes the run it generates a stall signal to the state machine. The runlength encoder uses the page width 152 to detect end-of-line. The (current) line buffer 162 and the previous line buffer 163 are concatenated and managed as a single FIFO to simplify the runlength encoder 159.

Runlength decoder 158 decodes the output runlength to a line buffer 164 large enough to hold an 8" 1600 dpi line (1600 bytes). The runlength passed to this output runlength decoder is multiplied by the scale factor 153, so this decoder produces 1600 dpi lines. The line is output scale factor times through the output pixel FIFO 165. This achieves the required vertical scaling by simple line replication. The EEU could be designed with edge smoothing integrated into its image scaling. A simple smoothing scheme based on template-matching can be very effective [10]. This would require a multi-line buffer between the low-resolution runlength decoder and the smooth scaling unit, but would eliminate the high-resolution runlength decoder.

7.2.2.1 EDRL Stream Decoder

Figure 20:
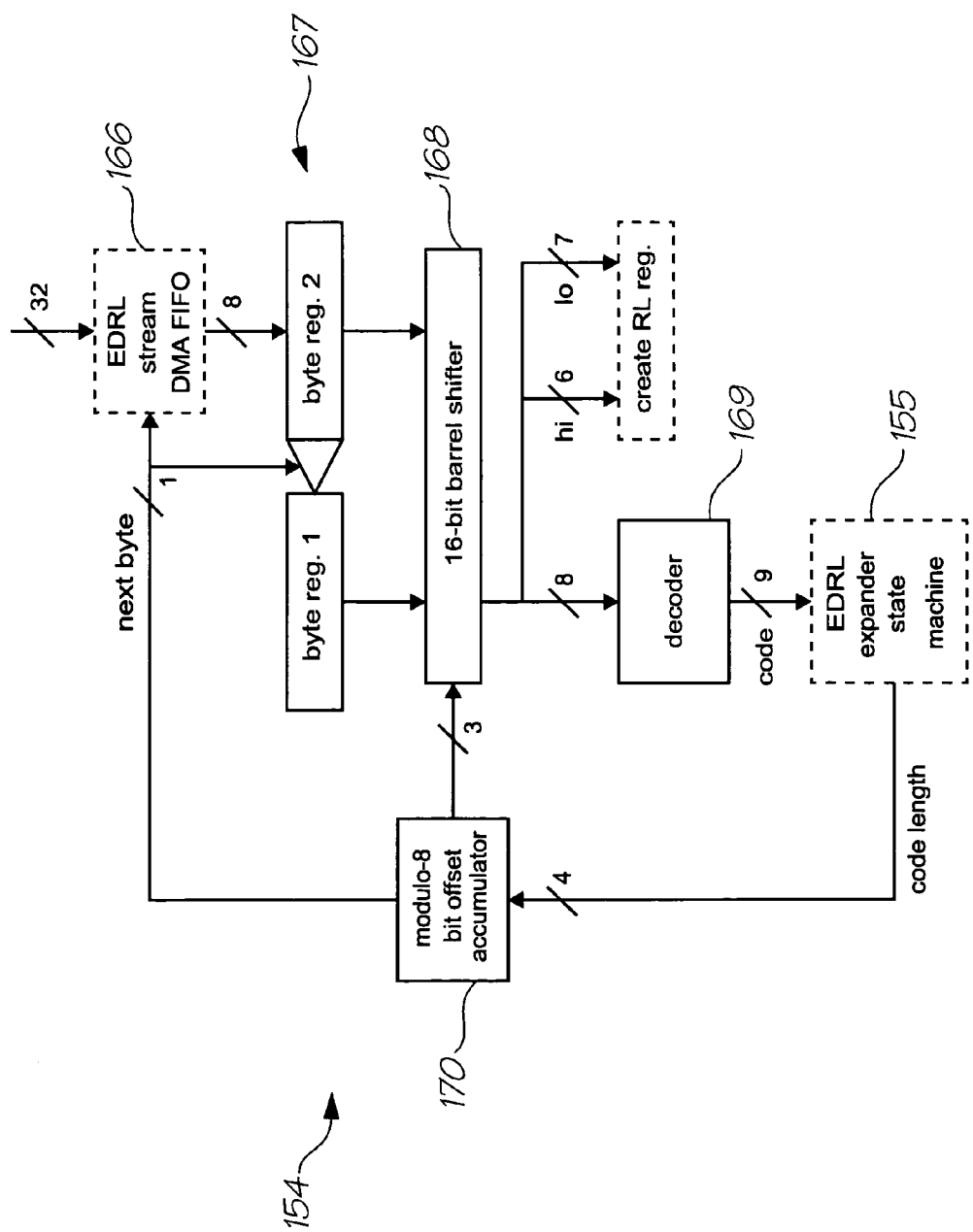
FIG. 20 is a block diagram of the EDRL stream decoder.

The EDRL stream decoder 154, illustrated in FIG. 20, decodes entropy-coded EDRL codewords in the input bitstream. It uses a two-byte input buffer 167 viewed through a 16-bit barrel shifter 168 whose left (most significant) edge is always aligned to a codeword boundary in the bitstream. The decoder 169 connected to the barrel shifter 168 decodes a codeword according to Table 17, and supplies the state machine 155 with the corresponding code.

TABLE 17

EDRL stream codeword decoding table

| input codeword bit pattern[a] | output code | output code bit pattern |
| --- | --- | --- |
| 1xxx xxxx | Δ0 | 1 0000 0000 |
| 010x xxxx | Δ+1 | 0 1000 0000 |
| 011x xxxx | Δ−1 | 0 0100 0000 |
| 0010 xxxx | kill edge | 0 0010 0000 |
| 0011 xxxx | create near edge | 0 0001 0000 |
| 0001 0xxx | Δ+2 | 0 0000 1000 |
| 0001 1xxx | Δ−2 | 0 0000 0100 |
| 0000 1xxx | create far edge | 0 0000 0010 |
| 0000 01xx | end-of-page (EOP) | 0 0000 0001 |

[a] x = don't care

The state machine 155 in turn outputs the length of the code. This is added 170, modulo-8, to the current codeword bit offset to yield the next codeword bit offset. The bit offset in turn controls the barrel shifter 168. If the codeword bit offset wraps, then the carry bit controls the latching of the next byte from the input FIFO 166. At this time byte 2 is latched to byte 1, and the FIFO output is latched to byte 2. It takes two cycles of length 8 to fill the input buffer. This is handled by starting states in the state machine 155.

7.2.2.2 EDRL Expander State Machine

The EDRL expander state machine 155 controls the edge calculation and runlength expansion logic in response to codes supplied by the EDRL stream decoder 154. It supplies the EDRL stream decoder with the length of the current codeword and supplies the edge calculation logic with the delta value associated with the current delta code. The state machine also responds to start and stop control signals from the control register, and the end-of-line (EOL) signal from the edge calculation logic.

The state machine also controls the multi-cycle fetch of the runlength associated with a create edge code.

TABLE 18

EDRL expander state machine

| input signal | input code | current state | next state | code len | delta | actions |
|---|---|---|---|---|---|---|
| start | — | stopped | starting | 8 | — | — |
| — | — | starting | idle | 8 | — | — |
| stop | — | — | stopped | 0 | — | reset RL decoders and FIFOs |
| EOL | — | — | EOL 1 | 0 | — | reset RL encoder; reset RL decoders; reset ref. edge and edge |
| — | — | EOL 1 | idle | | | RL encoder⇒ ref. RL; ref. edge += ref. RL |
| — | D0 | idle | idle | 1 | 0 | RL = edge − ref. edge + delta; edge += RL; RL ⇒RL decoder; RL encoder⇒ ref. RL; ref. edge += ref. RL |
| — | Δ+1 | idle | idle | 2 | +1 | RL = edge − ref. edge + delta; edge += RL; RL ⇒RL decoder; RL encoder⇒ ref. RL; ref. edge += ref. RL |
| — | Δ−1 | idle | idle | 3 | −1 | RL = edge − ref. edge + delta; edge += RL; RL ⇒RL decoder; RL encoder⇒ ref. RL; ref. edge += ref. RL |
| — | Δ+2 | idle | idle | 4 | +2 | RL = edge − ref. edge + delta; edge += RL; RL ⇒RL decoder; RL encoder⇒ ref. RL; ref. edge += ref. RL |
| — | Δ−2 | idle | idle | 5 | −2 | RL = edge − ref. edge + delta; edge += RL; RL ⇒RL decoder; RL encoder⇒ ref. RL; ref. edge += ref. RL |
| — | kill edge | idle | idle | 6 | — | RL encoder⇒ ref. RL; ref. edge += ref. RL |
| — | create near edge | idle | create RL lo 7 | 7 | — | reset create RL |
| — | create far edge | idle | create RL hi 6 | 8 | — | — |
| — | EOP | idle | stopped | 8 | — | — |
| — | — | create RL hi 6 | create RL lo 7 | 6 | — | latch create RL hi 6 |
| — | — | create RL lo 7 | create edge | 7 | — | latch create RL lo 7 |
| — | — | create edge | idle | 0 | — | RL = create RL; edge += RL; RL ⇒RL encoder |

7.2.2.3 Runlength Decoder

Figure 21:
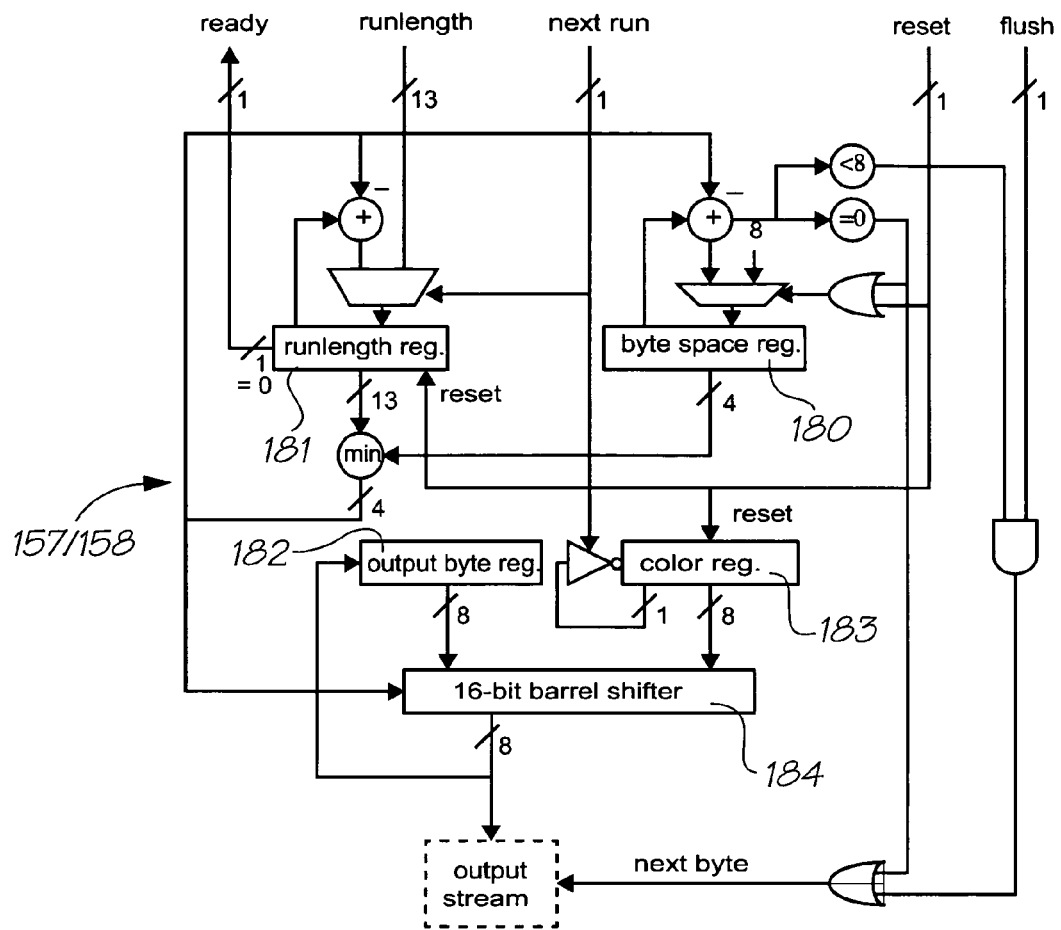
FIG. 21 is a block diagram of the Runlength Decoder.

The runlength decoder 157/158, shown in FIG. 21, expands a runlength into a sequence of zero bits or one bits of the corresponding length in the output stream. The first run in a line is assumed to be white (color 0). Each run is assumed to be of the opposite color to its predecessor. If the first run is actually black (color 1), then it must be preceded by a zero-length white run. The runlength decoder keeps track of the current color internally.

The runlength decoder appends a maximum of 8 bits to the output stream every clock. Runlengths are typically not an integer multiple of 8, and so runs other than the first in an image are typically not byte-aligned. The run decoder maintains, in the byte space register 180, the number of bits available in the byte currently being built. This is initialised to 8 at the beginning of decoding, and on the output of every byte.

The decoder starts outputting a run of bits as soon as the next run line latches a non-zero value into the runlength register 181. The decoder effectively stalls when the runlength register goes to zero.

A number of bits of the current color are shifted into the output byte register 182 each clock. The current color is maintained in the 1-bit color register 183. The number of bits actually output is limited by the number of bits left in the runlength, and by the number of spare bits left in the output byte. The number of bits output is subtracted from the runlength and the byte space. When the runlength goes to zero it has been completely decoded, although the trailing bits of the run may still be in the output byte register, pending output. When the byte space goes to zero the output byte is full and is appended to the output stream.

The 16-bit barrel shifter 184, the output byte register 182 and the color register 183 together implement an 8-bit shift register which can be shifted multiple bit positions every clock, with the color as the serial input.

The external reset line is used to reset the runlength decoder at the start of a line. The external next run line is used to request the decoding of a new runlength. It is accompanied by a runlength on the external runlength lines. The next run line should not be set on the same clock as the reset line. Because next run inverts the current color, the reset of the color sets it to one, not zero. The external flush line is used to flush the last byte of the run, if incomplete. It can be used on a line-by-line basis to yield byte-aligned lines, or on an image basis to yield a byte-aligned image.

The external ready line indicates whether the runlength decoder is ready to decode a runlength. It can be used to install the external logic.

7.2.2.4 Runlength Encoder

Figure 22:
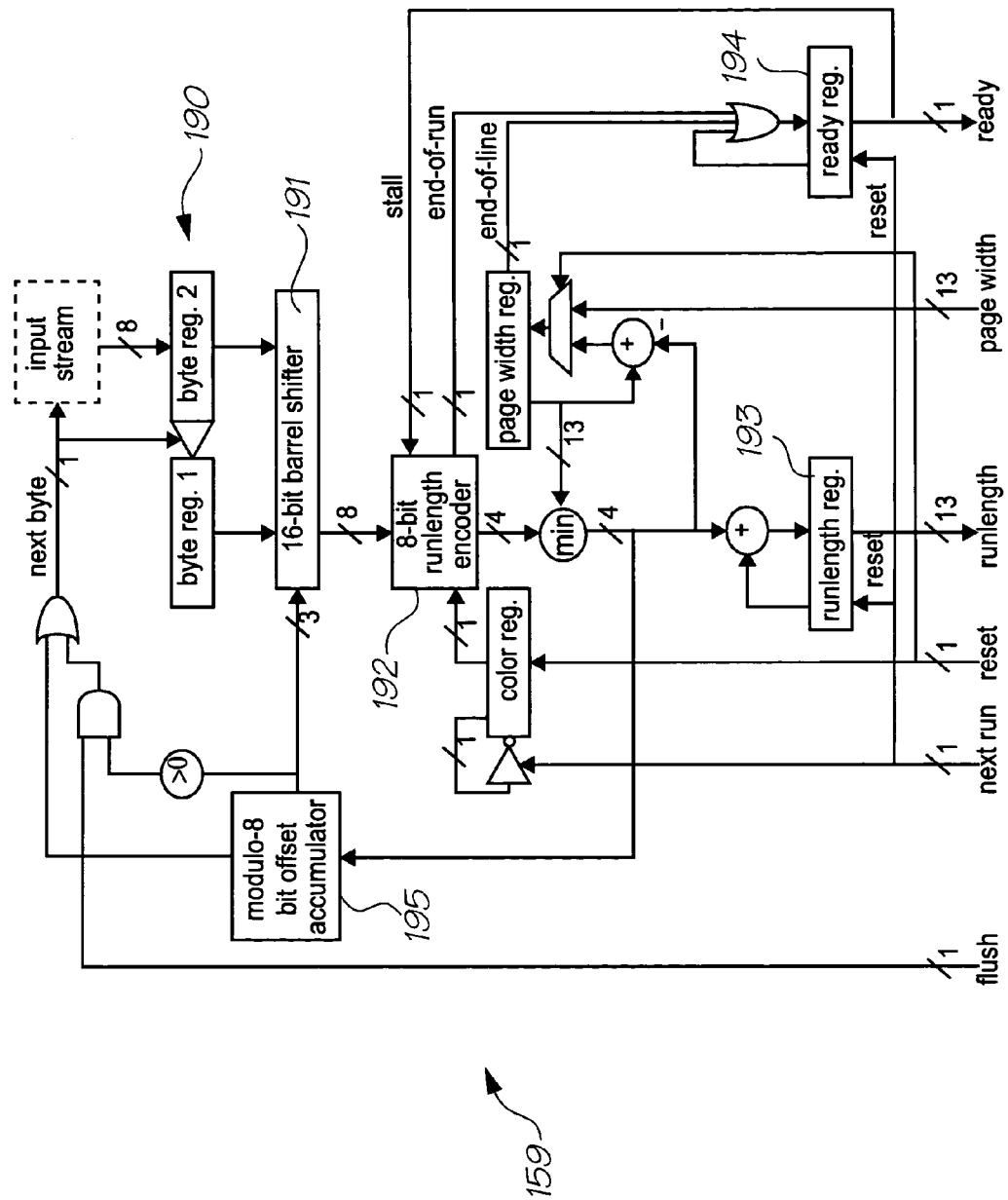
FIG. 22 is a block diagram of the Runlength Encoder.

The runlength encoder 159, shown in FIG. 22, detects a run of zero or one bits in the input stream. The first run in a line is assumed to be white (color 0). Each run is assumed to be of the opposite color to its predecessor. If the first run is actually black (color 1), then the runlength encoder generates a zero-length white run at the start of the line. The runlength decoder keeps track of the current color internally.

The runlength encoder reads a maximum of 8 bits from the input stream every clock. It uses a two-byte input buffer 190 viewed through a 16-bit barrel shifter 191 whose left (most significant) edge is always aligned to the current position in the bitstream. The encoder 192 connected to the barrel shifter encodes an 8-bit (partial) runlength according to Table 19. The encoder 192 uses the current color to recognise runs of the appropriate color.

The 8-bit runlength generated by the 8-bit runlength encoder is added to the value in the runlength register 193. When the 8-bit runlength encoder recognises the end of the current run it generates an end-of-run signal which is latched by the ready register 194. The output of the ready register 194 indicates that the encoder has completed encoding the current runlength, accumulated in the runlength register 193. The output of the ready register 194 is also used to stall the 8-bit runlength encoder 192. When stalled the 8-bit runlength encoder 192 outputs a zero-length run and a zero end-of-run signal, effectively stalling the entire runlength encoder.

TABLE 19

8-bit runlength encoder table

| color | input | length | end-of-run |
|---|---|---|---|
| 0 | 0000 0000 | 8 | 0 |
| 0 | 0000 0001 | 7 | 1 |
| 0 | 0000 001x | 6 | 1 |
| 0 | 0000 01xx | 5 | 1 |
| 0 | 0000 1xxx | 4 | 1 |
| 0 | 0001 xxxx | 3 | 1 |
| 0 | 001x xxxx | 2 | 1 |
| 0 | 01xx xxxx | 1 | 1 |
| 0 | 1xxx xxxx | 0 | 1 |
| 1 | 1111 1111 | 8 | 0 |

TABLE 19-continued 8-bit runlength encoder table

| color | input | length | end-of-run |
|---|---|---|---|
| 1 | 1111 1110 | 7 | 1 |
| 1 | 1111 110x | 6 | 1 |
| 1 | 1111 10xx | 5 | 1 |
| 1 | 1111 0xxx | 4 | 1 |
| 1 | 1110 xxxx | 3 | 1 |
| 1 | 110x xxxx | 2 | 1 |
| 1 | 10xx xxxx | 1 | 1 |
| 1 | 0xxx xxxx | 0 | 1 |

The output of the 8-bit runlength encoder 192 is limited by the remaining page width. The actual 8-bit runlength is subtracted from the remaining page width, and is added 195 to the modulo-8 bit position used to control the barrel shifter 191 and clock the byte stream input.

The external reset line is used to reset the runlength encoder at the start of a line. It resets the current color and latches the page width into the page width register. The external next run line is used to request another runlength from the runlength encoder. It inverts the current color, and resets the runlength register and ready register. The external flush line is used to flush the last byte of the run, if incomplete. It can be used on a line-by-line basis to process byte-aligned lines, or on an image basis to process a byte-aligned image.

The external ready line indicates that the runlength encoder is ready to encode a runlength, and that the current runlength is available on the runlength lines. It can be used to stall the external logic.

7.2.3 JPEG Decoder

Figure 23:
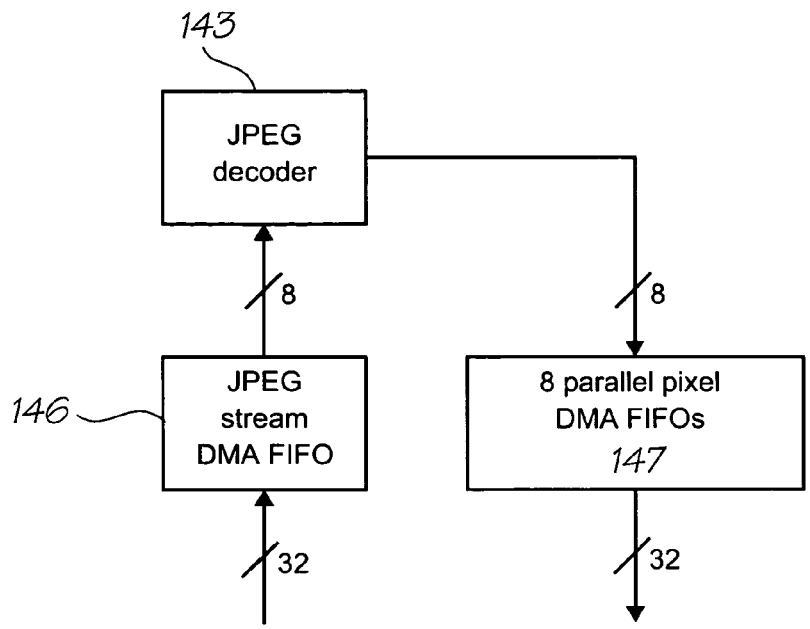
FIG. 23 is a block diagram of the JPEG decoder.

The JPEG decoder 143, shown in FIG. 23, decompresses a JPEG-compressed CMYK contone image.

The input to the JPEG decoder is a JPEG bitstream. The output from the JPEG decoder is a set of contone CMYK image lines.

When decompressing, the JPEG decoder writes its output in the form of 8×8 pixel blocks. These are sometimes converted to full-width lines via an page width×8 strip buffer closely coupled with the codec. This would require a 67 KB buffer. We instead use 8 parallel pixel FIFOs with shared bus access and 8 corresponding DMA channels, as shown in FIG. 23.

7.2.4 Halftoner/Compositor

Figure 24:
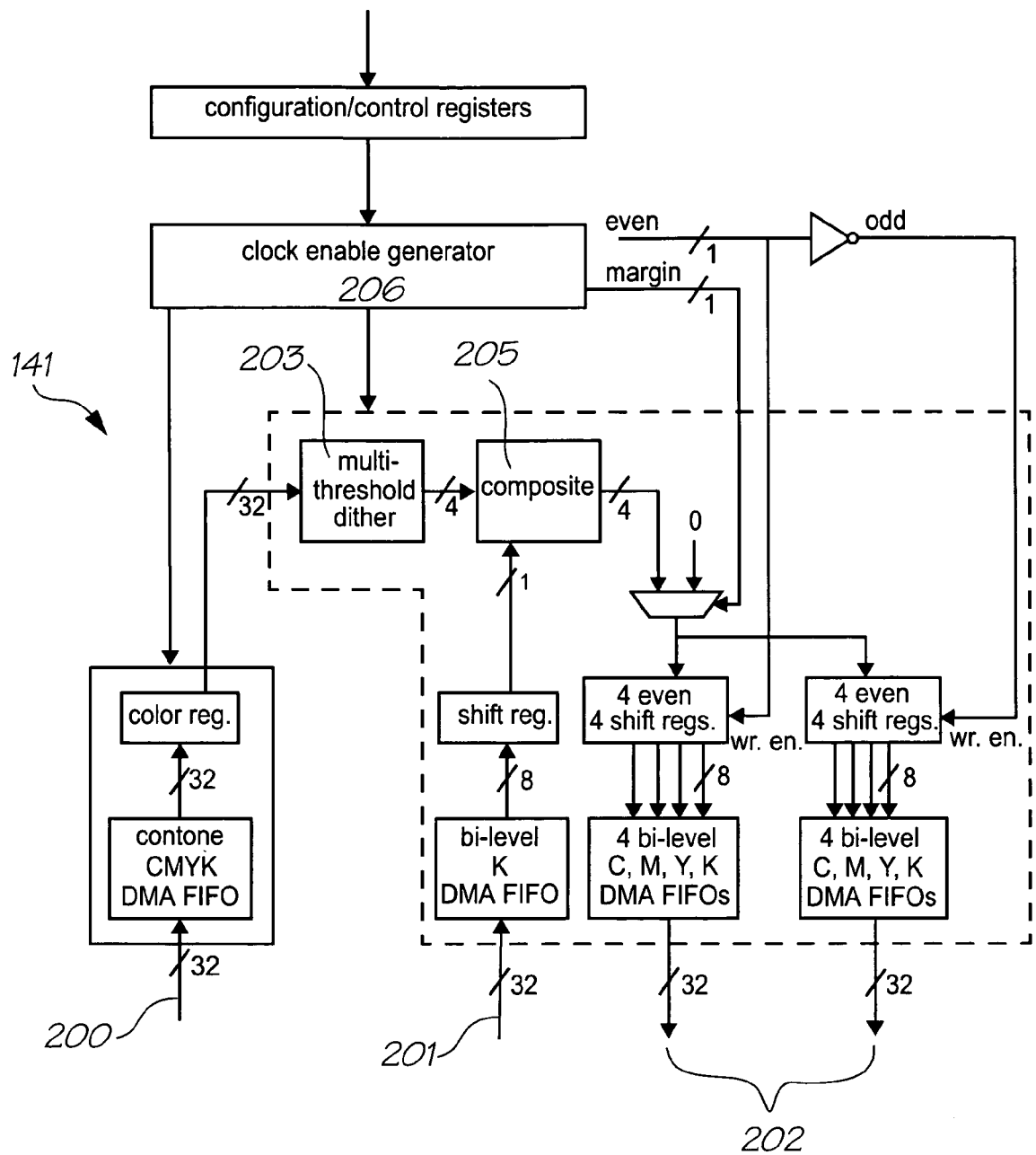
FIG. 24 is a block diagram of the Halftoner/Compositor unit.

The halftoner/compositor unit (HCU) 141, shown in FIG. 24, combines the functions of halftoning the contone CMYK layer to bi-level CMYK, and compositing the black layer over the halftoned contone layer.

The input to the HCU is an expanded 267 ppi CMYK contone layer 200, and an expanded 1600 dpi black layer 201. The output from the HCU is a set of 1600 dpi bi-level CMYK image lines 202.

Once started, the HCU proceeds until it detects an end-of-page condition, or until it is explicitly stopped via its control register.

The HCU generates a page of dots of a specified width and length. The width and length must be written to the page width and page length registers prior to starting the HCU. The page width corresponds to the width of the printhead 171. The page length corresponds to the length of the target page.

The HCU generates target page data between specified left and right margins relative to the page width.

The positions of the left and right margins must be written to the left margin and right margin registers prior to starting the HCU. The distance from the left margin to the right margin corresponds to the target page width.

The HCU consumes black and contone data according to specified black 172 and contone 173 page widths. These page widths must be written to the black page width and contone page width registers prior to starting the HCU. The HCU clips black and contone data to the target page width 174. This allows the black and contone page widths to exceed the target page width without requiring any special end-of-line logic at the input FIFO level.

Figure 25:
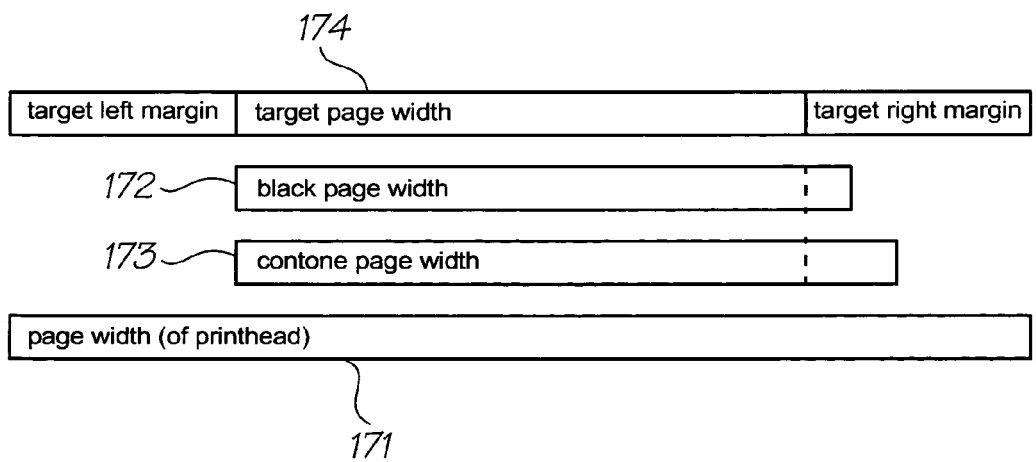
FIG. 25 is a series of page lines that show the relationships between page widths and margins.

The relationships between the page width 171, the black 172 and contone 173 page widths, and the margins are illustrated in FIG. 25.

The HCU scales contone data to printer resolution both horizontally and vertically based on a specified scale factor. This scale factor must be written to the contone scale factor register prior to starting the HCU.

TABLE 20

Halftoner/compositor control and configuration registers

| register | width | description |
|---|---|---|
| start | 1 | Start the HCU. |
| stop | 1 | Stop the HCU. |
| page width | 14 | Page width of printed page, in dots. This is the number of dots which have to be generated for each line. |
| left margin | 14 | Position of left margin, in dots. |
| right margin | 14 | Position of right margin, in dots. |
| page length | 15 | Page length of printed page, in dots. This is the number of lines which have to be generated for each page. |
| black page width | 14 | Page width of black layer, in dots. Used to detect the end of a black line. |
| contone page width | 14 | Page width of contone layer, in dots. Used to detect the end of a contone line. |
| contone scale factor | 4 | Scale factor used to scale contone data to bi-level resolution. |

The consumer of the data produced by the HCU is the printhead interface. The printhead interface requires bi-level CMYK image data in planar format, i.e. with the color planes separated. Further, it also requires that even and odd pixels are separated. The output stage of the HCU therefore uses 8 parallel pixel FIFOs, one each for even cyan, odd cyan, even magenta, odd magenta, even yellow, odd yellow, even black, and odd black.

The input contone CMYK FIFO is a full 8 KB line buffer. The line is used contone scale factor times to effect vertical up-scaling via line replication. FIFO write address wrapping is disabled until the start of the last use of the line. An alternative is to read the line from main memory contone scale factor times, increasing memory traffic by 65 MB/s, but avoiding the need for the on-chip 8 KB line buffer.

7.2.4.1 Multi-Threshold Dither

A general 256-layer dither volume provides great flexibility in dither cell design, by decoupling different intensity levels. General dither volumes can be large—a 64×64×256 dither volume, for example, has a size of 128 KB. They are also inefficient to access since each color component requires the retrieval of a different bit from the volume. In practice, there is no need to fully decouple each layer of the dither volume. Each dot column of the volume can be implemented as a fixed set of thresholds rather than 256 separate bits. Using three 8-bit thresholds, for example, only consumes 24 bits. Now, n thresholds define n+1 intensity intervals, within which the corresponding dither cell location is alternately not set or set. The contone pixel value being dithered uniquely selects one of the n+1 intervals, and this determines the value of the corresponding output dot.

We dither the contone data using a triple-threshold 64×64×3×8-bit (12 KB) dither volume. The three thresholds form a convenient 24-bit value which can be retrieved from the dither cell ROM in one cycle. If dither cell registration is desired between color planes, then the same triple-threshold value can be retrieved once and used to dither each color component. If dither cell registration is not desired, then the dither cell can be split into four sub-cells and stored in four separately addressable ROMs from which four different triple-threshold values can be retrieved in parallel in one cycle. Using the addressing scheme shown in FIG. 26, the four color planes share the same dither cell at vertical and/or horizontal offsets of 32 dots from each other.

Figure 26:
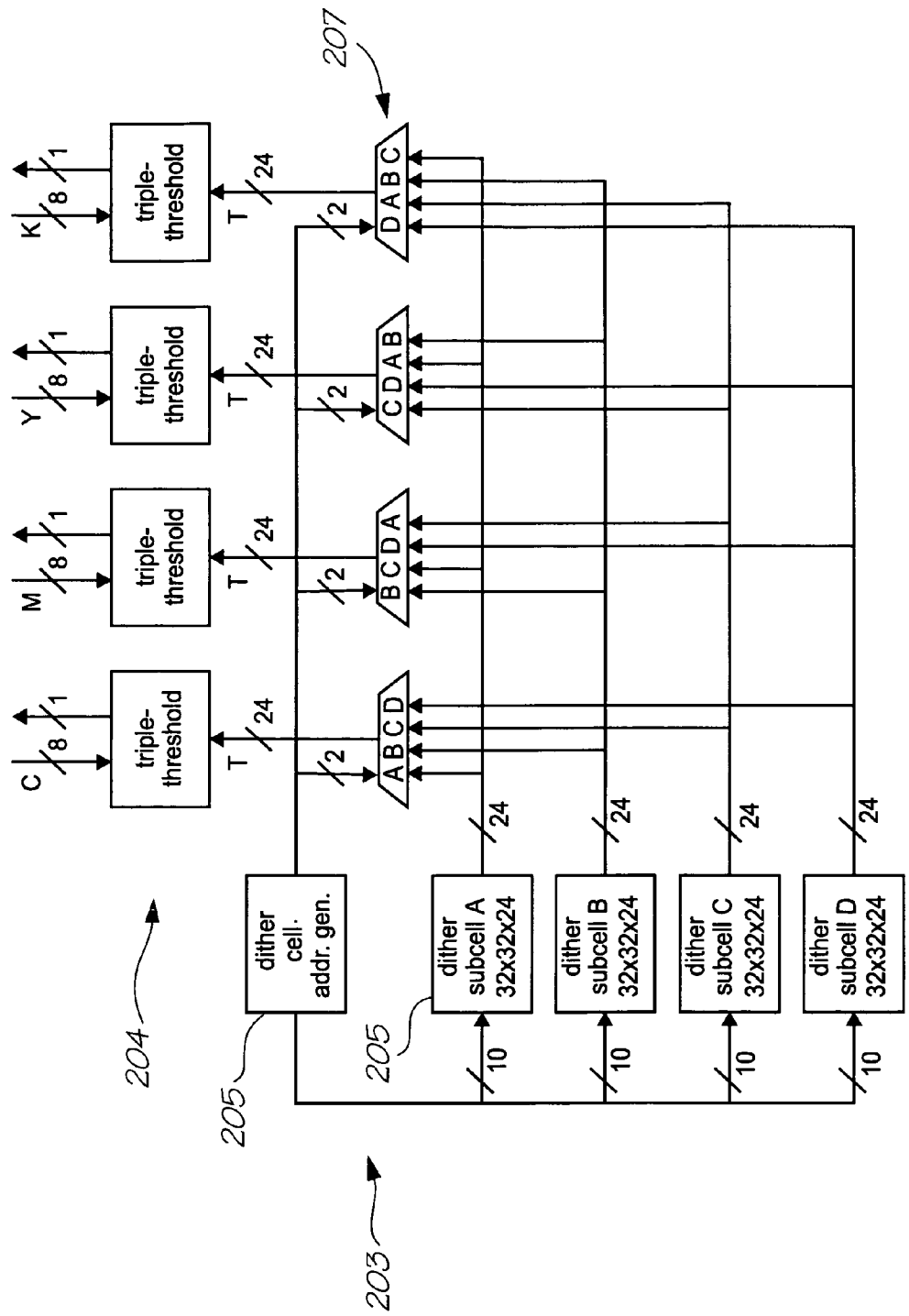
FIG. 26 is a block diagram of a Multi-threshold dither.
Figure 27:
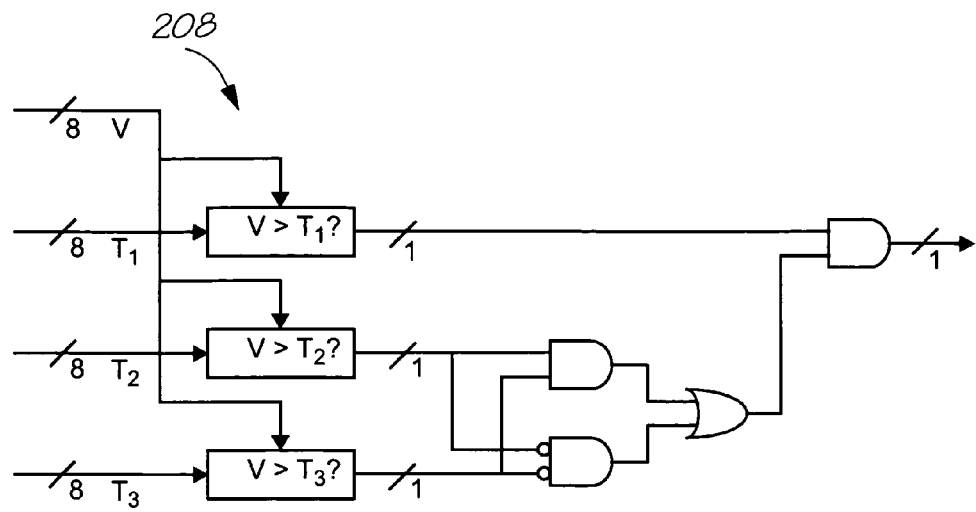
FIG. 27 is a block diagram of the logic of the Triple-threshold unit.

The Multi-threshold dither 203 is shown in FIG. 26. The triple-threshold unit 204 converts a triple-threshold value and an intensity value into an interval and thence a one or zero bit. The triple-thresholding rules are shown in Table 21. The corresponding logic 208 is shown in FIG. 27.

Referring to FIG. 26 in more detail, four separate triple threshold units indicated generally at 204 each receive a series of contone color pixel values for respective color components of the CMYK signal. The dither volume is split into four dither subcells A, B, C and D, indicated generally at 205. A dither cell address generator 206 and four gates indicated generally at 207, control the retrieval of the four different triple threshold values which can be retrieved in parallel in one cycle for the different colors.

TABLE 21

Triple-thresholding rules

| interval | output |
|---|---|
| $V \leq T_1$ | 0 |
| $T_1 < V \leq T_2$ | 1 |
| $T_2 < V \leq T_3$ | 0 |
| $T_3 < V$ | 1 |

7.2.4.2 Composite

The composite unit 205 composites a black layer dot over a halftoned CMYK layer dot. If the black layer opacity is one, then the halftoned CMY is set to zero.

Given a 4-bit halftoned color $C_c M_c Y_c K_c$ and a 1-bit black layer opacity $K_b$, the composite and as defined in Table 22.

TABLE 22

Composite logic

| color channel | condition |
|---|---|
| C | $C_c \wedge \neg K_b$ |
| M | $M_c \wedge \neg K_b$ |
| Y | $Y_c \wedge \neg K_b$ |
| K | $K_c \vee K_b$ |

7.2.4.3 Clock Enable Generator

The clock enable generator 206 generates enable signals for clocking the contone CMYK pixel input, the black dot input, and the CMYK dot output.

As described earlier, the contone pixel input buffer is used as both a line buffer and a FIFO. Each line is read once and then used contone scale factor times. FIFO write address wrapping is disabled until the start of the final replicated use of the line, at which time the clock enable generator generates a contone line advance enable signal which enables wrapping.

The clock enable generator also generates an even signal which is used to select the even or odd set of output dot FIFOs, and a margin signal which is used to generate white dots when the current dot position is in the left or right margin of the page.

The clock enable generator uses a set of counters. The internal logic of the counters is defined in Table 23. The logic of the clock enable signals is defined in Table 24.

Figure 28:
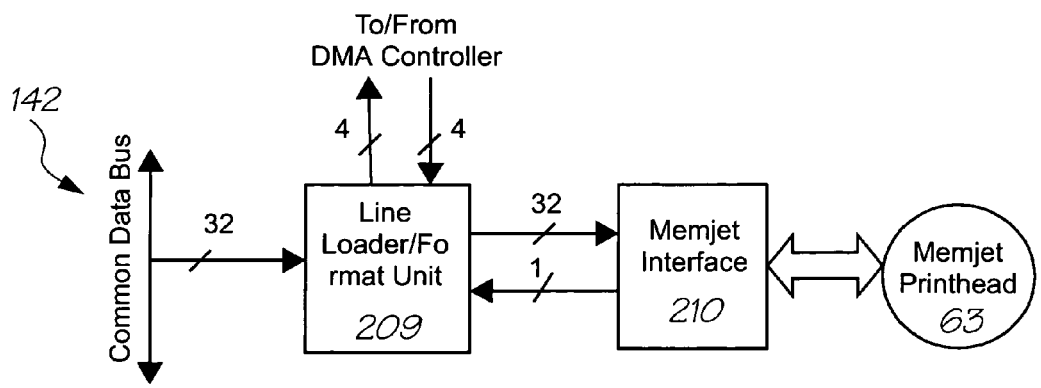
FIG. 28 is a block diagram of the internal structure of the Printhead Interface.

The internal structure of the Printhead Interface 142 is shown in FIG. 28.

7.3.1 Line Loader/Format Unit

The line loader/format unit (LLFU) 209 loads the dots for a given print line into local buffer storage and formats them into the order required for the MEMJET printhead. It is responsible for supplying the pre-calculated nozzleEnable bits to the MEMJET interface for the eventual printing of the page.

A single line in the 8-inch printhead consists of 12,800 4-color dots. At 1 bit per color, a single print line consists of

TABLE 23

Clock enable generator counter logic

| counter | abbr. | w. | data | load condition | decrement condition |
|---|---|---|---|---|---|
| dot | D | 14 | page width | RP$^a$∨ EOL$^b$ | (D > 0) ∧clk |
| line | L | 15 | page length | RP | (L > 0) ∧EOL |
| left margin | LM | 14 | left margin | RP ∨EOL | (LM > 0) ∧clk |
| right margin | RM | 14 | right margin | RP ∨EOL | (RM > 0) ∧clk |
| even/odd dot | E | 1 | 0 | RP ∨EOL | clk |
| black dot | BD | 14 | black width | RP ∨EOL | (LM = 0) ∧(BD > 0) ∧clk |
| contone dot | CD | 14 | contone width | RP ∨EOL | (LM = 0) ∧(CD > 0) ∧clk |
| contone sub-pixel | CSP | 4 | contone scale factor | RP ∨EOL ∨(CSP = 0) | (LM = 0) ∧clk |
| contone sub-line | CSL | 4 | contone scale factor | RP∨ (CSL = 0) | EOL ∧clk |

$^a$RP (reset page) condition: external signal
$^b$EOL (end-of-line) condition: (D = 0) ∧(BD = 0) ∧(CD = 0)

TABLE 24

Clock enable generator output signal logic

| output signal | condition |
|---|---|
| output dot clock enable | (D>0) ∧ ¬EOP$^a$ |
| black dot clock enable | (LM=0) ∧ (BD>0) ∧ ¬EOP |
| contone pixel clock enable | (LM=0) ∧ (CD>0) ∧ (CSP=0) ∧ ¬EOP |
| contone line advance enable | (CSL=0) ∧ ¬EOP |
| even | E=0 |
| margin | (LM=0) ∨ (RM=0) |

$^a$EOP (end-of-page) condition: L = 0

7.3 Printhead Interface

The printhead interface (PHI) 142 is the means by which the processor loads the MEMJET printhead with the dots to be printed, and controls the actual dot printing process. The PHI contains:

- a line loader/format unit (LLFU) 209 which loads the dots for a given print line into local buffer storage and formats them into the order required for the MEMJET printhead.
- a MEMJET interface (MJI) 210, which transfers data to the MEMJET printhead 63, and controls the nozzle firing sequences during a print.

The units within the PHI are controlled by a number of registers that are programmed by the processor 139. In addition, the processor is responsible for setting up the appropriate parameters in the DMA controller 144 for the transfers from memory to the LLFU. This includes loading white (all 0's) into appropriate colors during the start and end of a page so that the page has clean edges.

51,200 bits. These bits must be supplied in the correct order for being sent on to the printhead. See Section 6.1.2.1 for more information concerning the Load Cycle dot loading order, but in summary, 32 bits are transferred at a time to each of the two 4-inch printheads, with the 32 bits representing 4 dots for each of the 8 segments.

Figure 29:
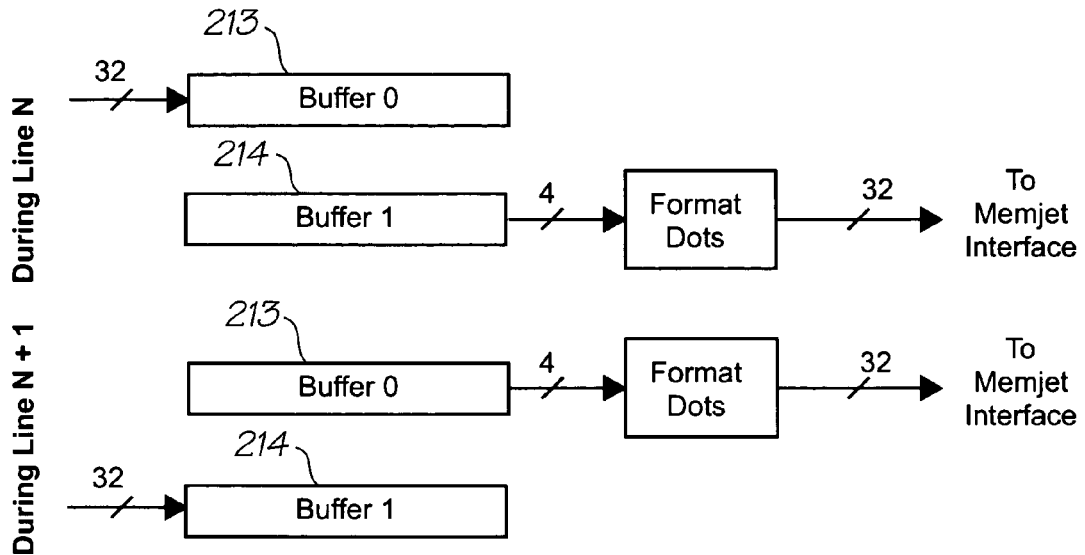
FIG. 29 is a diagram of the conceptual overview of double buffering during print lines N and N+1.

The printing uses a double buffering scheme for preparing and accessing the dot-bit information. While one line is being loaded into the first buffer 213, the pre-loaded line in the second buffer 214 is being read in MEMJET dot order. Once the entire line has been transferred from the second buffer 214 to the printhead via the MEMJET interface, the reading and writing processes swap buffers. The first buffer 213 is now read and the second buffer is loaded up with the new line of data. This is repeated throughout the printing process, as can be seen in the conceptual overview of FIG. 29

Figure 30:
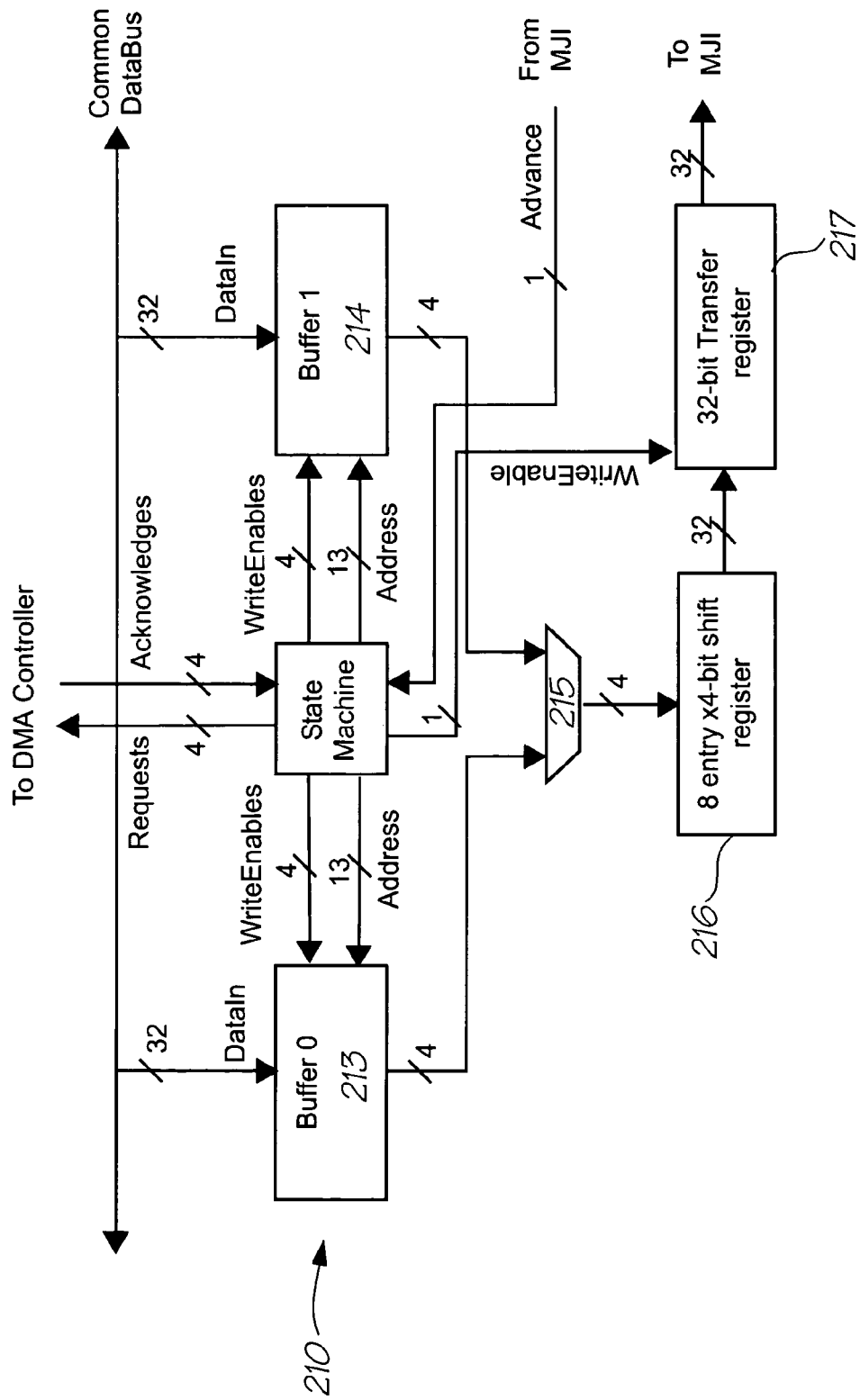
FIG. 30 is a block diagram of the structure of the LLFU.

The actual implementation of the LLFU is shown in FIG. 30. Since one buffer is being read from while the other is being written to, two sets of address lines must be used. The 32-bits DataIn from the common data bus are loaded depending on the WriteEnables, which are generated by the State Machine in response to the DMA Acknowledges.

A multiplexor 215 chooses between the two 4-bit outputs of Buffer 0, 213 and Buffer 1, 214, and sends the result to an 8-entry by 4-bit shift register 216. After the first 8 read cycles, and whenever an Advance pulse comes from the MJI, the current 32-bit value from the shift register is gated into the 32-bit Transfer register 217, where it can be used by the MJI.

7.3.1.1 Buffers

Figure 31:
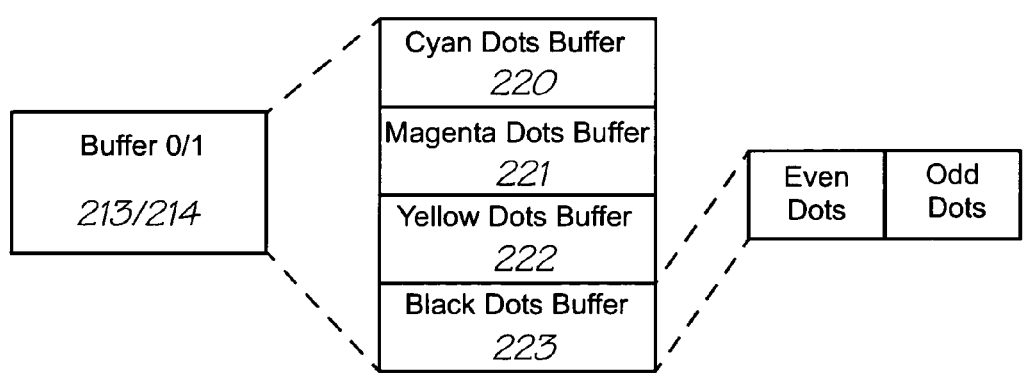
FIG. 31 is a diagram of the conceptual structure of a Buffer.

Each of the two buffers 213 and 214 is broken into 4 sub-buffers 220, 221, 222 and 223, 1 per color. All the even dots are placed before the odd dots in each color's buffer, as shown in FIG. 31.

The 51,200 bits representing the dots in the next line to be printed are stored 12,800 bits per color buffer, stored as 400 32-bit words. The first 200 32-bit words (6400 bits) represent the even dots for the color, while the second 200 32-bit words (6400 bits) represent the odd dots for the color.

Figure 32:
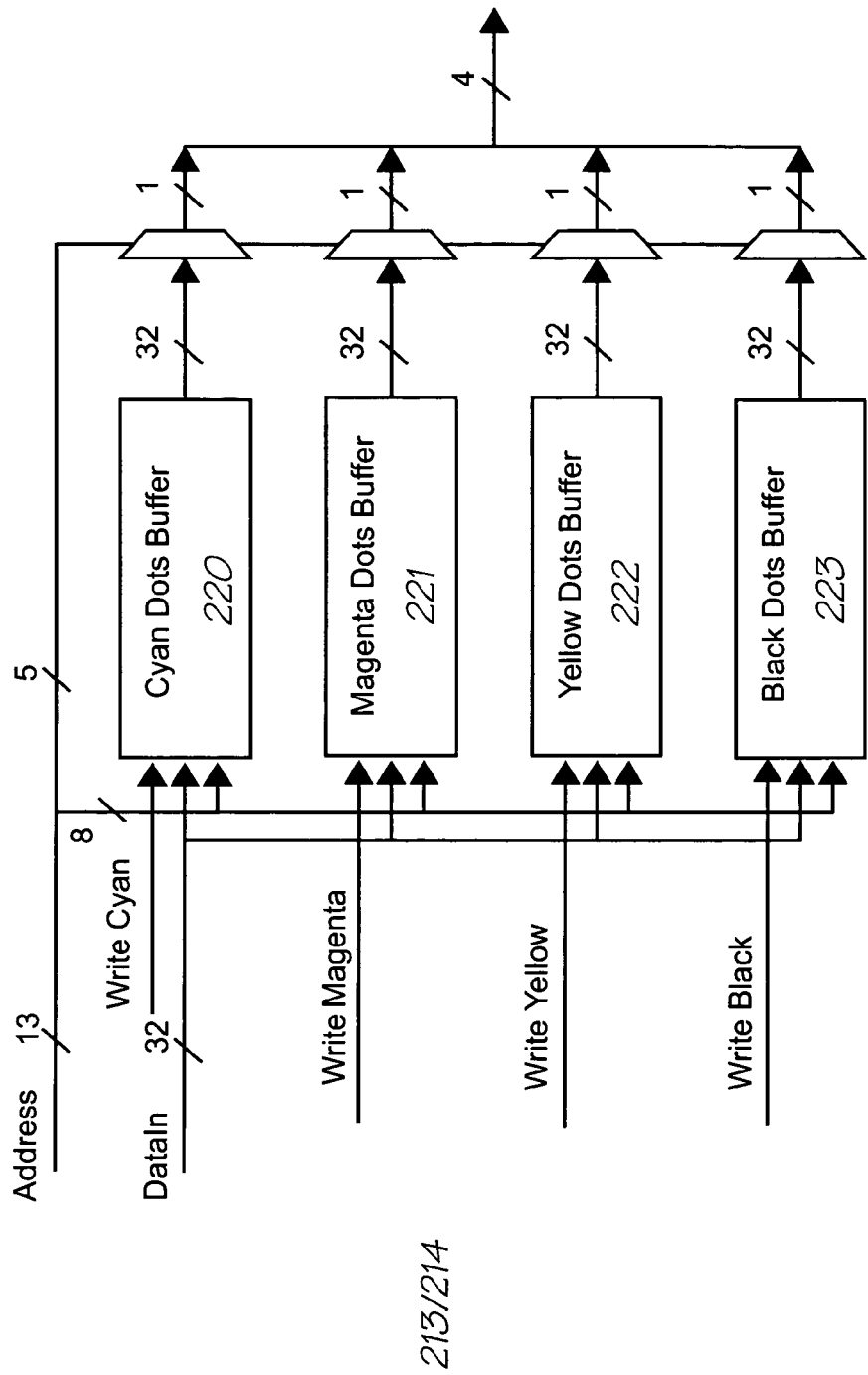
FIG. 32 is a diagram of the logical structure of a Buffer.

The addressing decoding circuitry is such that in a given cycle, a single 32-bit access can be made to all 4 sub-buffers—either a read from all 4 or a write to one of the 4. Only one bit of the 32-bits read from each color buffer is selected, for a total of 4 output bits. The process is shown in FIG. 32. 13 bits of address allow the reading of a particular bit by means of 8-bits of address being used to select 32 bits, and 5-bits of address choose 1-bit from those 32. Since all color buffers share this logic, a single 13-bit address gives a total of 4 bits out, one per color. Each buffer has its own WriteEnable line, to allow a single 32-bit value to be written to a particular color buffer in a given cycle. The 32-bits of DataIn are shared, since only one buffer will actually clock the data in.

7.3.1.2 Address Generation

7.3.1.2.1 Reading

Address Generation for reading is straightforward. Each cycle we generate a bit address which is used to fetch 4 bits representing 1-bit per color for the particular segment. By adding 400 to the current bit address, we advance to the next segment's equivalent dot. We add 400 (not 800) since the odd and even dots are separated in the buffer. We do this 16 times to retrieve the two sets of 32 bits for the two sets of 8 segments representing the even dots (the resultant data is transferred to the MJI 32 bits at a time) and another 16 times to load the odd dots. This 32-cycle process is repeated 400 times, incrementing the start address each time. Thus in 400×32 cycles, a total of 400×32×4 (51,200) dot values are transferred in the order required by the printhead.

In addition, we generate the TransferWriteEnable control signal. Since the LLFU starts before the MJI, we must transfer the first value before the Advance pulse from the MJI. We must also generate the next 32-bit value in readiness for the first Advance pulse. The solution is to transfer the first 32-bit value to the Transfer register after 8 cycles, and then to stall 8-cycles later, waiting for the Advance pulse to start the next 8-cycle group. Once the first Advance pulse arrives, the LLFU is synchronized to the MJI. However, the MJI must be started at least 16 cycles after the LLFU so that the initial Transfer value is valid and the next 32-bit value is ready to be loaded into the Transfer register.

The read process is shown in the following pseudocode:

```
DotCount=0

For DotInSegment0=0 to 400
    CurrAdr=DotInSegment0
    Do
        V1=(CurrAdr=0) OR (CurrAdr=3200)
        V2=Low 3 bits of DotCount=0
        TransferWriteEnable=V1 OR ADVANCE
        Stall=V2 AND (NOT TransferWriteEnable)
        If (NOT Stall)
            Shift Register=Fetch 4-bits from CurrReadBuffer:Cur-
               rAdr
            CurrAdr=CurrAdr+400
            DotCount=(DotCount+1) MOD 32 (odd&even, print-
               heads 1&2, segments 0-7)
        EndIf
    Until (DotCount=0) AND (NOT Stall)
EndFor
```

Once the line has finished, the CurrReadBuffer value must be toggled by the processor.

7.3.1.2.2 Writing

The write process is also straightforward. 4 DMA request lines are output to the DMA controller. As requests are satisfied by the return DMA Acknowledge lines, the appropriate 8-bit destination address is selected (the lower 5 bits of the 13-bit output address are don't care values) and the acknowledge signal is passed to the correct buffer's WriteEnable control line (the Current Write Buffer is CurrentReadBuffer). The 8-bit destination address is selected from the 4 current addresses, one address per color. As DMA requests are satisfied the appropriate destination address is incremented, and the corresponding TransfersRemaining counter is decremented. The DMA request line is only set when the number of transfers remaining for that color is non-zero.

The following pseudocode illustrates the Write process:

```
CurrentAdr[0-3]=0

While (TransfersRemaining[0-3] are all non-zero)
    DMARequest[0-3]=TransfersRemaining[0-3]!=0
    If DMAAcknowledge[N]
        CurrWriteBuffer:CurrentAdr[N]=Fetch 32-bits from data
           bus
        CurrentAdr[N]=CurrentAdr[N]+1
        TransfersRemaining[N]=TransfersRemaining[N]−1
           (floor 0)
    EndIf
EndWhile
```

7.3.1.3 Registers

The following registers are contained in the LLFU:

TABLE 25

Line Load/Format Unit Registers

| Register Name | Description |
| --- | --- |
| CurrentReadBuffer | The current buffer being read from. When Buffer0 is being read from, Buffer1 is written to and vice versa. Should be toggled with each AdvanceLine pulse from the MJI. |
| Go | Bits 0 and 1 control the starting of the read and write processes respectively. A non-zero write to the appropriate bit starts the process. |
| Stop | Bits 0 and 1 control the stopping of the read and write processes respectively. A non-zero write to the appropriate bit stops the process. |

TABLE 25-continued

Line Load/Format Unit Registers

| Register Name | Description |
| --- | --- |
| TransfersRemainingC | The number of 32-bit transfers remaining to be read into the Cyan buffer |
| TransfersRemainingM | The number of 32-bit transfers remaining to be read into the Magenta buffer |
| TransfersRemainingY | The number of 32-bit transfers remaining to be read into the Yellow buffer |
| TransfersRemainingK | The number of 32-bit transfers remaining to be read into the Black buffer |

7.3.2 MEMJET Interface

The MEMJET interface (MJI) 210 transfers data to the MEMJET printhead 63, and controls the nozzle firing sequences during a print.

The MJI is simply a State Machine (see FIG. 28) which follows the Printhead loading and firing order described in Section 6.1.2, and includes the functionality of the Preheat Cycle and Cleaning Cycle as described in Section 6.1.4 and Section 6.1.5. Both high-speed and low-speed printing modes are available. Dot counts for each color are also kept by the MJI.

The MJI must be started after the LLFU has already prepared the first 32-bit transfer value. This is so the 32-bit data input will be valid for the first transfer to the printhead.

The MJI is therefore directly connected to the LLFU and the external MEMJET printhead.

7.3.2.1 Connections to Printhead

The MJI 210 has the following connections to the printhead 63, with the sense of input and output with respect to the MJI. The names match the pin connections on the printhead (see Section 6.2.1 for an explanation of the way the 8-inch printhead is wired up).

TABLE 26

MEMJET Interface Connections

| Name | #Pins | I/O | Description |
| --- | --- | --- | --- |
| Chromapod Select | 3 | O | Select which chromapod will fire (0–4) |
| NozzleSelect | 4 | O | Select which nozzle from the pod will fire (0–9) |
| PodgroupEnable | 2 | O | Enable the podgroups to fire (choice of: 01, 10, 11) |
| AEnable | 1 | O | Firing pulse for podgroup A |
| BEnable | 1 | O | Firing pulse for podgroup B |
| CDataIn[0–7] | 8 | O | Cyan output to cyan shift register of segments 0–7 |
| MDataIn[0–7] | 8 | O | Magenta input to magenta shift register of segments 0–7 |
| YDataIn[0–7] | 8 | O | Yellow input to yellow shift register of segments 0–7 |
| KDataIn[0–7] | 8 | O | Black input to black shift register of segment 0–7 |
| SRClock1 | 1 | O | A pulse on SRClock1 (ShiftRegisterClock1) loads the current values from CDataIn[0–7], MDataIn[0–7], YDataIn[0–7] and KDataIn[0–7] into the 32 shift registers of 4-inch printhead 1 |
| SRClock2 | 1 | O | A pulse on SRClock2 (ShiftRegisterClock2) loads the current values from CDataIn[0–7], MDataIn[0–7], YDataIn[0–7] and KDataIn[0–7] into the 32 shift registers of 4-inch printhead 2 |
| PTransfer | 1 | O | Parallel transfer of data from the shift registers to the printhead's internal NozzleEnable bits (one per nozzle). |
| SenseSegSelect1 | 1 | O | A pulse on SenseSegEnable1 ANDed with data on CDataIn[n] enables the sense lines for segment n in 4-inch printhead 1. |
| SenseSegEnable2 | 1 | O | A pulse on SenseSegEnable2 ANDed with data on CDataIn[n] enables the sense lines for segment n in 4-inch printhead 2. |
| Tsense | 1 | I | Temperature sense |
| Vsense | 1 | I | Voltage sense |
| Rsense | 1 | I | Resistivity sense |
| Wsense | 1 | I | Width sense |
| TOTAL | 52 | | |

The MJI loads data into the printhead from a choice of 2 data sources:

All 1s. This means that all nozzles will fire during a subsequent Print cycle, and is the standard mechanism for loading the printhead for a preheat or cleaning cycle.

From the 32-bit input held in the Transfer register of the LLFU. This is the standard means of printing an image. The 32-bit value from the LLFU is directly sent to the printhead and a 1-bit 'Advance' control pulse is sent to the LLFU. At the end of each line, a 1-bit 'AdvanceLine' pulse is also available.

7.3.2.2 Firing Pulse Duration

The duration of firing pulses on the AEnable and BEnable lines depend on the viscosity of the ink (which is dependant on temperature and ink characteristics) and the amount of power available to the printhead. The typical pulse duration range is 1.3 to 1.8 Ts. The MJI therefore contains a programmable pulse duration table 230, indexed by feedback from the printhead. The table of pulse durations allows the use of a lower cost power supply, and aids in maintaining more accurate drop ejection.

Figure 33:
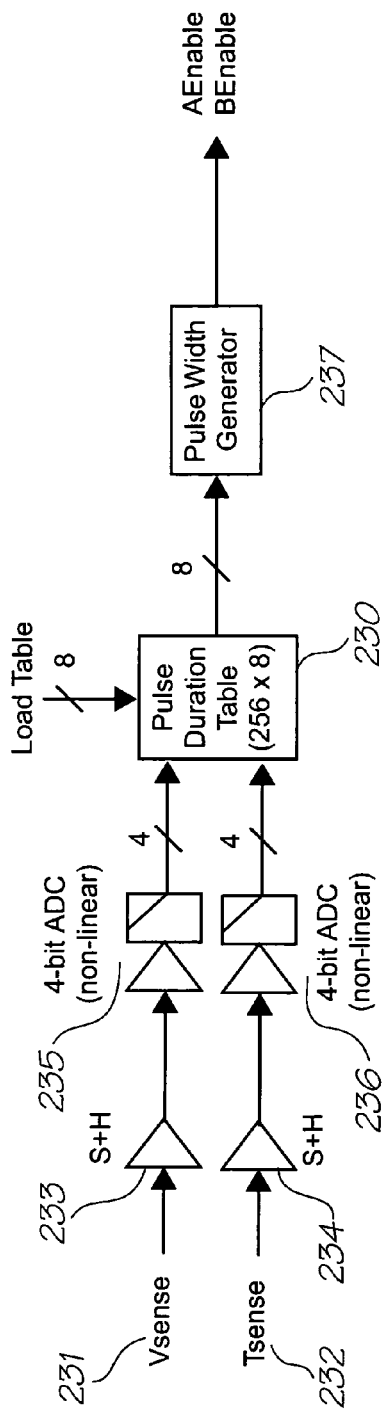
FIG. 33 is a block diagram of the generation of AEnable and BEnable Pulse Widths.

The Pulse Duration table has 256 entries, and is indexed by the current Vsense 231 and Tsense 232 settings. The upper 4-bits of address come from Vsense, and the lower 4-bits of address come from Tsense. Each entry is 8-bits, and represents a fixed point value in the range of 0-4 Ts. The process of generating the AEnable and BEnable lines is shown in FIG. 33. The analog Vsense 231 and Tsense 232 signals are received by respective sample and hold circuits 233 and 234, and then converted to digital words in respective converters 235 and 236, before being applied to the pulse duration table 230. The output of the pulse duration table 230 is applied to a pulse width generator 237 to generate the firing pulses.

The 256-byte table is written by the CPU before printing the first page. The table may be updated in between pages if desired. Each 8-bit pulse duration entry in the table combines:

User brightness settings (from the page description)
Viscosity curve of ink (from the QA Chip)
Rsense
Wsense
Vsense
Tsense 7.3.2.3 Dot Counts The MJI 210 maintains a count of the number of dots of each color fired from the printhead in a dot count register 240. The dot count for each color is a 32-bit value, individually cleared, by a signal 241, under processor control. At 32-bits length, each dot count can hold a maximum coverage dot count of 17 12-inch pages, although in typical usage, the dot count will be read and cleared after each page.

The dot counts are used by the processor to update the QA chip 85 (see Section 7.5.4.1) in order to predict when the ink cartridge runs out of ink. The processor knows the volume of ink in the cartridge for each of C, M, Y, and K from the QA chip. Counting the number of drops eliminates the need for ink sensors, and prevents the ink channels from running dry. An updated drop count is written to the QA chip after each page. A new page will not be printed unless there is enough ink left, and allows the user to change the ink without getting a dud half-printed page which must be reprinted.

Figure 34:
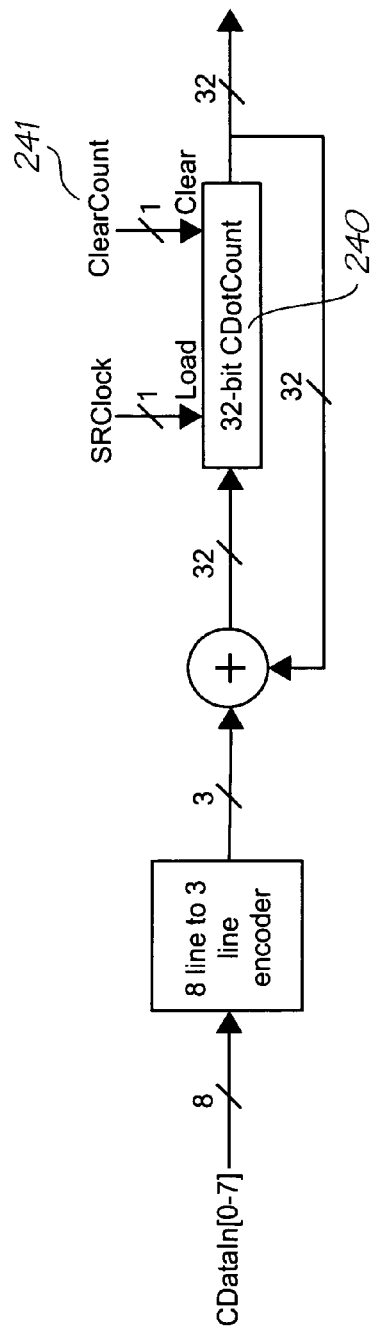
FIG. 34 is a diagram of the Dot Count logic.

The layout of the dot counter for cyan is shown in FIG. 34. The remaining 3 dot counters (MDotCount, YDotCount, and KDotCount for magenta, yellow, and black respectively) are identical in structure.

7.3.2.4 Registers

The processor 139 communicates with the MJI 210 via a register set. The registers allow the processor to parameterize a print as well as receive feedback about print progress.

The following registers are contained in the MJI:

TABLE 27

MEMJET Interface Registers

| Register Name | Description |
|---|---|
| *Print Parameters* | |
| NumTransfers | The number of transfers required to load the Printhead (usually 1600). This is the number of pulses for both SRClock lines and the total number of 32-bit data values to transfer for a given line. |
| PrintSpeed | Whether to print at low or high speed (determines the value on the PodgroupEnable lines during the print). |
| NumLines | The number of Load/Print cycles to perform. |
| *Monitoring the Print* | |
| Status | The MEMJET Interface's Status Register |
| LinesRemaining | The number of lines remaining to be printed. Only valid while Go = 1. Starting value is NumLines. |
| TransfersRemaining | The number of transfers remaining before the Printhead is considered loaded for the current line. Only valid while Go = 1. |
| SenseSegment | The 8-bit value to place on the Cyan data lines during a subsequent feedback SenseSegSelect pulse. Only 1 of the 8 bits should be set, corresponding to one of the 8 segments. See SenseSegSelect for how to determine which of the two 4-inch printheads to sense. |
| SetAllNozzles | If non-zero, the 32-bit value written to the printhead during the LoadDots process is all 1s, so that all nozzles will be fired during the subsequent PrintDots process. This is used during the preheat and cleaning cycles. If 0, the 32-bit value written to the printhead comes from the LLFU. This is the case during the actual printing of regular images. |
| *Actions* | |
| Reset | A write to this register resets the MJI, stops any loading or printing processes, and loads all registers with 0. |
| SenseSegSelect | A write to this register with any value clears the FeedbackValid bit of the Status register, and depending on the low-order bit, sends a pulse on the SenseEnable1 or SenseEnable2 line if the LoadingDots and PrintingDots status bits are all 0. If any of the status bits are set, the Feedback bit is cleared and nothing more is done. Once the various sense lines have been tested, the values are placed in the Tsense, Vsense, Rsense, and Wsense registers, and then the Feedback bit of the Status register is set. |
| Go | A write of 1 to this bit starts the LoadDots/PrintDots cycles. A total of NumLines lines are printed, each containing NumTransfers 32 bit transfers. As each line is printed, LinesRemaining decrements, and TransfersRemaining is reloaded with NumTransfers again. The status register contains print status information. Upon completion of NumLines, the loading/printing process stops and the Go bit is cleared. During the final print cycle, nothing is loaded into the printhead. A write of 0 to this bit stops the print process, but does not clear any other registers. |

TABLE 27-continued

MEMJET Interface Registers

| Register Name | Description |
| --- | --- |
| ClearCounts | A write to this register clears the CDotCount, MDotCount, YDotCount, and KDotCount registers if bits 0, 1, 2, or 3 respectively are set. Consequently a write of 0 has no effect. |
| Feedback | |
| Tsense | Read only feedback of Tsense from the last SenseSegSelect pulse sent to segment SenseSegment. Is only valid if the FeedbackValid bit of the Status register is set. |
| Vsense | Read only feedback of Vsense from the last SenseSegSelect pulse sent to segment SenseSegment. Is only valid if the FeedbackValid bit of the Status register is set. |
| Rsense | Read only feedback of Rsense from the last SenseSegSelect pulse sent to segment SenseSegment. Is only valid if the FeedbackValid bit of the Status register is set. |
| Wsense | Read only feedback of Wsense from the last SenseSegSelect pulse sent to segment SenseSegment. Is only valid if the FeedbackValid bit of the Status register is set. |
| CDotCount | Read only 32-bit count of cyan dots sent to the printhead. |
| MDotCount | Read only 32-bit count of magenta dots sent to the printhead. |
| YDotCount | Read only 32-bit count of yellow dots sent to the printhead |
| KDotCount | Read only 32-bit count of black dots sent to the printhead |

The MJI's Status Register is a 16-bit register with bit interpretations as follows:

TABLE 28

MJI Status Register

| Name | Bits | Description |
| --- | --- | --- |
| LoadingDots | 1 | If set, the MJI is currently loading dots, with the number of dots remaining to be transferred in TransfersRemaining. If clear, the MJI is not currently loading dots |
| PrintingDots | 1 | If set, the MJI is currently printing dots. If clear, the MJI is not currently printing dots. |
| PrintingA | 1 | This bit is set while there is a pulse on the AEnable line |
| PrintingB | 1 | This bit is set while there is a pulse on the BEnable line |
| FeedbackValid | 1 | This bit is set while the feedback values Tsense, Vsense, Rsense, and Wsense are valid. |
| Reserved | 3 | — |
| PrintingChromapod | 4 | This holds the current chromapod being fired while the PrintingDots status bit is set. |
| PrintingNozzles | 4 | This holds the current nozzle being fired while the PrintingDots status bit is set. |

7.3.2.5 Preheat and Cleaning Cycles

The Cleaning and Preheat cycles are simply accomplished by setting appropriate registers:

SetAllNozzles=1

Set the PulseDuration register to either a low duration (in the case of the preheat mode) or to an appropriate drop ejection duration for cleaning mode.

Set NumLines to be the number of times the nozzles should be fired

Set the Go bit and then wait for the Go bit to be cleared when the print cycles have completed.

7.4 Processor and Memory

7.4.1 Processor

The processor 139 runs the control program which synchronises the other functional units during page reception, expansion and printing. It also runs the device drivers for the various external interfaces, and responds to user actions through the user interface.

It must have low interrupt latency, to provide efficient DMA management, but otherwise does not need to be particularly high-performance DMA Controller.

The DMA controller supports single-address transfers on 27 channels (see Table 29). It generates vectored interrupts to the processor on transfer completion.

TABLE 29

| DMA channel usage | | |
| --- | --- | --- |
| functional unit | input channels | output channels |
| USB interface | — | 1 |
| EDRL expander | 1 | 1 |
| JPEG decoder | 1 | 8 |
| halftoner/compositor | 2 | 8 |
| speaker interface | 1 | — |
| printhead interface | 4 | — |
| | 8 | 19 |
| | | 27 |

7.4.3 Program ROM

The program ROM holds the ICP control program which is loaded into main memory during system boot.

7.4.4 Rambus Interface

The Rambus interface provides the high-speed interface to the external 8 MB (64 Mbit) Rambus DRAM (RDRAM).

7.5 External Interfaces

7.5.1 USB Interface

The Universal Serial Bus (USB) interface provides a standard USB device interface.

7.5.2 Speaker Interface

Figure 35:
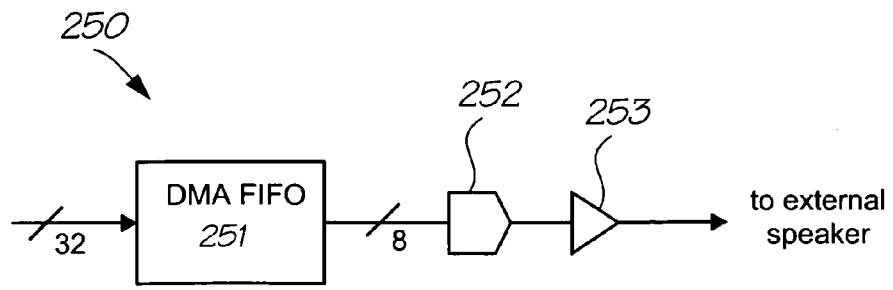
FIG. 35 is a block diagram of the speaker interface.

The speaker interface 250 (FIG. 35) contains a small FIFO 251 used for DMA-mediated transfers of sound clips from main memory, an 8-bit digital-to-analog converter (DAC) 252 which converts each 8-bit sample value to a voltage, and an amplifier 253 which feeds the external speaker. When the FIFO is empty it outputs a zero value.

The speaker interface is clocked at the frequency of the sound clips.

The processor outputs a sound clip to the speaker simply by programming the DMA channel of the speaker interface.

7.5.3 Parallel Interface

The parallel interface 231 provides I/O on a number of parallel external signal lines.

It allows the processor to sense or control the devices listed in Table 30.

TABLE 30

| Parallel Interface devices |
| --- |
| parallel interface devices |
| power button |
| paper feed button |
| power LED |
| out-of-paper LED |
| ink low LED |
| media sensor |
| paper transport stepper motor |

7.5.4 Serial Interface

The serial interface 232 provides two standard low-speed serial ports.

One port is used to connect to the master QA chip 85. The other is used to connect to the QA chip in the ink cartridge 233. The processor-mediated protocol between the two is used to authenticate the ink cartridge. The processor can then retrieve ink characteristics from the QA chip, as well as the remaining volume of each ink. The processor uses the ink characteristics to properly configure the MEMJET printhead. It uses the remaining ink volumes, updated on a page-by-page basis with ink consumption information accumulated by the printhead interface, to ensure that it never allows the printhead to be damaged by running dry.

7.5.4.1 Ink Cartridge QA Chip

The QA chip 233 in the ink cartridge contains information required for maintaining the best possible print quality, and is implemented using an authentication chip. The 256 bits of data in the authentication chip are allocated as follows:

TABLE 31

Ink cartridge's 256 bits (16 entries of 16-bits)

| M[n] | access | width | description |
| --- | --- | --- | --- |
| 0 | RO[a] | 16 | Basic header, flags etc. |
| 1 | RO | 16 | Serial number. |

TABLE 31-continued

Ink cartridge's 256 bits (16 entries of 16-bits)

| M[n] | access | width | description |
| --- | --- | --- | --- |
| 2 | RO | 16 | Batch number. |
| 3 | RO | 16 | Reserved for future expansion. Must be 0. |
| 4 | RO | 16 | Cyan ink properties. |
| 5 | RO | 16 | Magenta ink properties. |
| 6 | RO | 16 | Yellow ink properties. |
| 7 | RO | 16 | Black ink properties. |
| 8–9 | DO[b] | 32 | Cyan ink remaining, in nanolitres. |
| 10–11 | DO | 32 | Magenta ink remaining, in nanolitres. |
| 12–13 | DO | 32 | Yellow ink remaining, in nanolitres. |
| 14–15 | DO | 32 | Black ink remaining, in nanolitres. |

[a]read only (RO)
[b]decrement only (DO)

Before each page is printed, the processor must check the amount of ink remaining to ensure there is enough for an entire worst-case page. Once the page has been printed, the processor multiplies the total number of drops of each color (obtained from the printhead interface) by the drop volume. The amount of printed ink is subtracted from the amount of ink remaining. The unit of measurement for ink remaining is nanoliters, so 32 bits can represent over 4 liters of ink. The amount of ink used for a page must be rounded up to the nearest nanoliter (i.e. approximately 1000 printed dots).

7.5.5 JTAG Interface

A standard JTAG (Joint Test Action Group) interface is included for testing purposes. Due to the complexity of the chip, a variety of testing techniques are required, including BIST (Built In Self Test) and functional block isolation. An overhead of 10% in chip area is assumed for overall chip testing circuitry.

8 Generic Printer Driver

This section describes generic aspects of any host-based printer driver for iPrint.

8.1 Graphics and Imaging Model

We assume that the printer driver is closely coupled with the host graphics system, so that the printer driver can provide device-specific handling for different graphics and imaging operations, in particular compositing operations and text operations.

We assume that the host provides support for color management, so that device-independent color can be converted to iPrint-specific CMYK color in a standard way, based on a user-selected iPrint-specific ICC (International Color Consortium) color profile. The color profile is normally selected implicitly by the user when the user specifies the output medium in the printer (i.e. plain paper, coated paper, transparency, etc.). The page description sent to the printer always contains device-specific CMYK color.

We assume that the host graphics system renders images and graphics to a nominal resolution specified by the printer driver, but that it allows the printer driver to take control of rendering text. In particular, the graphics system provides sufficient information to the printer driver to allow it to render and position text at a higher resolution than the nominal device resolution.

We assume that the host graphics system requires random access to a contone page buffer at the nominal device resolution, into which it composites graphics and imaging objects, but that it allows the printer driver to take control of the actual compositing—i.e. it expects the printer driver to manage the page buffer.

8.2 Two-Layer Page Buffer

The printer's page description contains a 267 ppi contone layer and an 800 dpi black layer. The black layer is conceptually above the contone layer, i.e. the black layer is composited over the contone layer by the printer. The printer driver therefore maintains a page buffer 260 which correspondingly contains a medium-resolution contone layer 261 and a high-resolution black layer 262.

The graphics systems renders and composites objects into the page buffer bottom-up—i.e. later objects obscure earlier objects. This works naturally when there is only a single layer, but not when there are two layers which will be composited later. It is therefore necessary to detect when an object being placed on the contone layer obscures something on the black layer.

When obscuration is detected, the obscured black pixels are composited with the contone layer and removed from the black layer. The obscuring object is then laid down on the contone layer, possibly interacting with the black pixels in some way. If the compositing mode of the obscuring object is such that no interaction with the background is possible, then the black pixels can simply be discarded without being composited with the contone layer. In practice, of course, there is little interaction between the contone layer and the black layer.

The printer driver specifies a nominal page resolution of 267 ppi to the graphics system. Where possible the printer driver relies on the graphics system to render image and graphics objects to the pixel level at 267 ppi, with the exception of black text. The printer driver fields all text rendering requests, detects and renders black text at 800 dpi, but returns non-black text rendering requests to the graphics system for rendering at 267 ppi.

Ideally the graphics system and the printer driver manipulate color in device-independent RGB, deferring conversion to device-specific CMYK until the page is complete and ready to be sent to the printer. This reduces page buffer requirements and makes compositing more rational. Compositing in CMYK color space is not ideal.

Ultimately the graphics system asks the printer driver to composite each rendered object into the printer driver's page buffer. Each such object uses 24-bit contone RGB, and has an explicit (or implicitly opaque) opacity channel.

The printer driver maintains the two-layer page buffer 260 in three parts. The first part is the medium-resolution (267 ppi) contone layer 261. This consists of a 24-bit RGB bitmap. The second part is a medium-resolution black layer 263. This consists of an 8-bit opacity bitmap. The third part is a high-resolution (800 dpi) black layer 262. This consists of a 1-bit opacity bitmap. The medium-resolution black layer is a subsampled version of the high-resolution opacity layer. In practice, assuming the medium resolution is an integer factor n of the high resolution (e.g. n=800/267=3), each medium-resolution opacity value is obtained by averaging the corresponding n×n high-resolution opacity values. This corresponds to box-filtered subsampling. The subsampling of the black pixels effectively antialiases edges in the high-resolution black layer, thereby reducing ringing artefacts when the contone layer is subsequently JPEG-compressed and decompressed.

Figure 36:
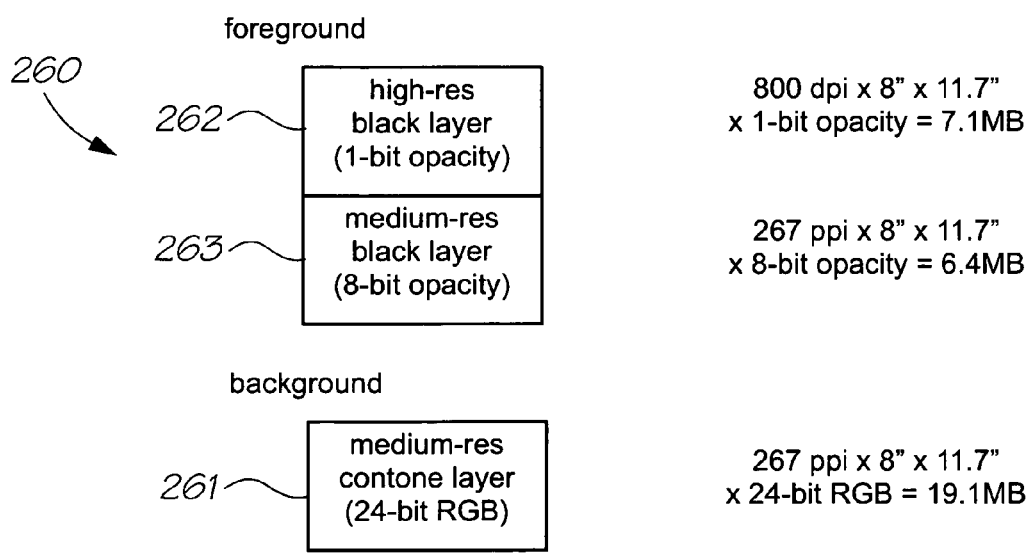
FIG. 36 is a diagram of a two-layer page buffer.

The structure and size of the page buffer is illustrated in FIG. 36.

8.3 Compositing Model

For the purposes of discussing the page buffer compositing model, we define the following variables.

TABLE 32

Compositing variables

| variable | description | resolution | format |
|---|---|---|---|
| n | medium to high resolution scale factor | — | — |
| $C_{BgM}$ | background contone layer color | medium | 8-bit color component |
| $C_{ObM}$ | contone object color | medium | 8-bit color component |
| $\alpha_{ObM}$ | contone object opacity | medium | 8-bit opacity |
| $\alpha_{FgM}$ | medium-resolution foreground black layer opacity | medium | 8-bit opacity |
| $\alpha_{FgH}$ | foreground black layer opacity | high | 1-bit opacity |
| $\alpha_{TxH}$ | black object opacity | high | 1-bit opacity |

When a black object of opacity $\alpha_{TxH}$ is composited with the black layer, the black layer is updated as follows:

$$\Box_{FgH}[x, y] \leftarrow \Box_{FgH}[x, y] \vee \Box_{TxH}[x, y] \quad \text{(Rule 1)}$$

$$\Box_{FgM}[x, y] \leftarrow \frac{1}{n^2} \sum_{i=0}^{n-1} \sum_{j=0}^{n-1} 255 \Box_{FgH}[nx + i, ny + j] \quad \text{(Rule 2)}$$

The object opacity is simply ored with the black layer opacity (Rule 1), and the corresponding part of the medium-resolution black layer is re-computed from the high-resolution black layer (Rule 2).

When a contone object of color $C_{ObM}$ and opacity $\alpha_{ObM}$ is composited with the contone layer, the contone layer and the black layer are updated as follows:

$$C_{BgM}[x, y] \leftarrow C_{BgM}[x, y](1 - \Box_{FgM}[x, y]) \text{ if } \Box_{ObM}[x, y] > 0 \quad \text{(Rule 3)}$$

$$\Box_{FgM}[x, y] \leftarrow 0 \text{ if } \Box_{ObM}[x, y] > 0 \quad \text{(Rule 4)}$$

$$\Box_{FgH}[x, y] \leftarrow 0 \text{ if } \Box_{ObM}[x/n, y/n] > 0 \quad \text{(Rule 5)}$$

$$C_{BgM}[x, y] \leftarrow C_{BgM}[x, y](1 - \Box_{ObM}[x, y]) + C_{ObM}[x, y]\Box_{ObM}[x, y] \quad \text{(Rule 6)}$$

Wherever the contone object obscures the black layer, even if not fully opaquely, the affected black layer pixels are pushed from the black layer to the contone layer, i.e. composited with the contone layer (Rule 3) and removed from the black layer (Rule 4 and Rule 5). The contone object is then composited with the contone layer (Rule 6).

If a contone object pixel is fully opaque (i.e. $\Box_{ObM}[x, y]=255$), then there is no need to push the corresponding black pixels into the background contone layer (Rule 3), since the background contone pixel will subsequently be completely obliterated by the foreground contone pixel (Rule 6).

FIGS. 37 to 41 illustrate the effect on the foreground black layer and the background contone layer of compositing objects of various types onto the image represented by the two layers. In each case the state of the two layers is shown before and after the object is composited. The different resolutions of the foreground and background layers are indicated by the layers' different pixel grid densities.

The output image represented to the two layers is shown without a pixel grid, since the actual rendering of the image is not the focus of discussion here.

The medium-resolution foreground black layer is not illustrated, but is implicitly present. Whenever Rule 1 is applied to the high-resolution foreground black layer, Rule 2 is implicitly applied to the medium-resolution foreground black layer. Whenever Rule 4 is applied, Rule 5 is also implicitly applied.

Figure 37:
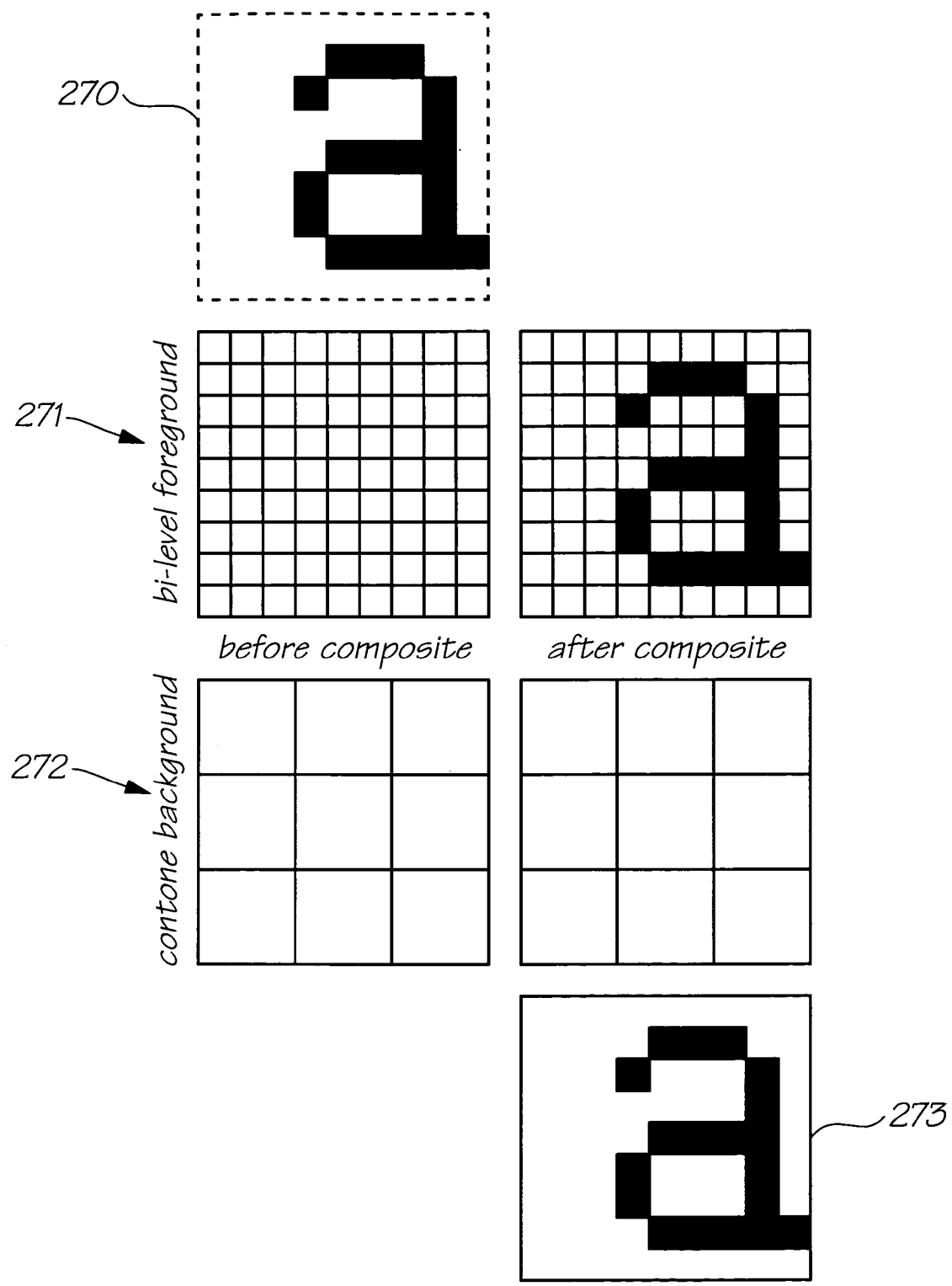
FIG. 37 is a series of diagrams showing the compositing of a black object onto a white image.

FIG. 37 illustrates the effect of compositing a black object 270 onto a white image. The black object is simply composited into the foreground black layer 271 (Rule 1). The background contone layer 272 is unaffected, and the output image 273 is the black object.

Figure 38:
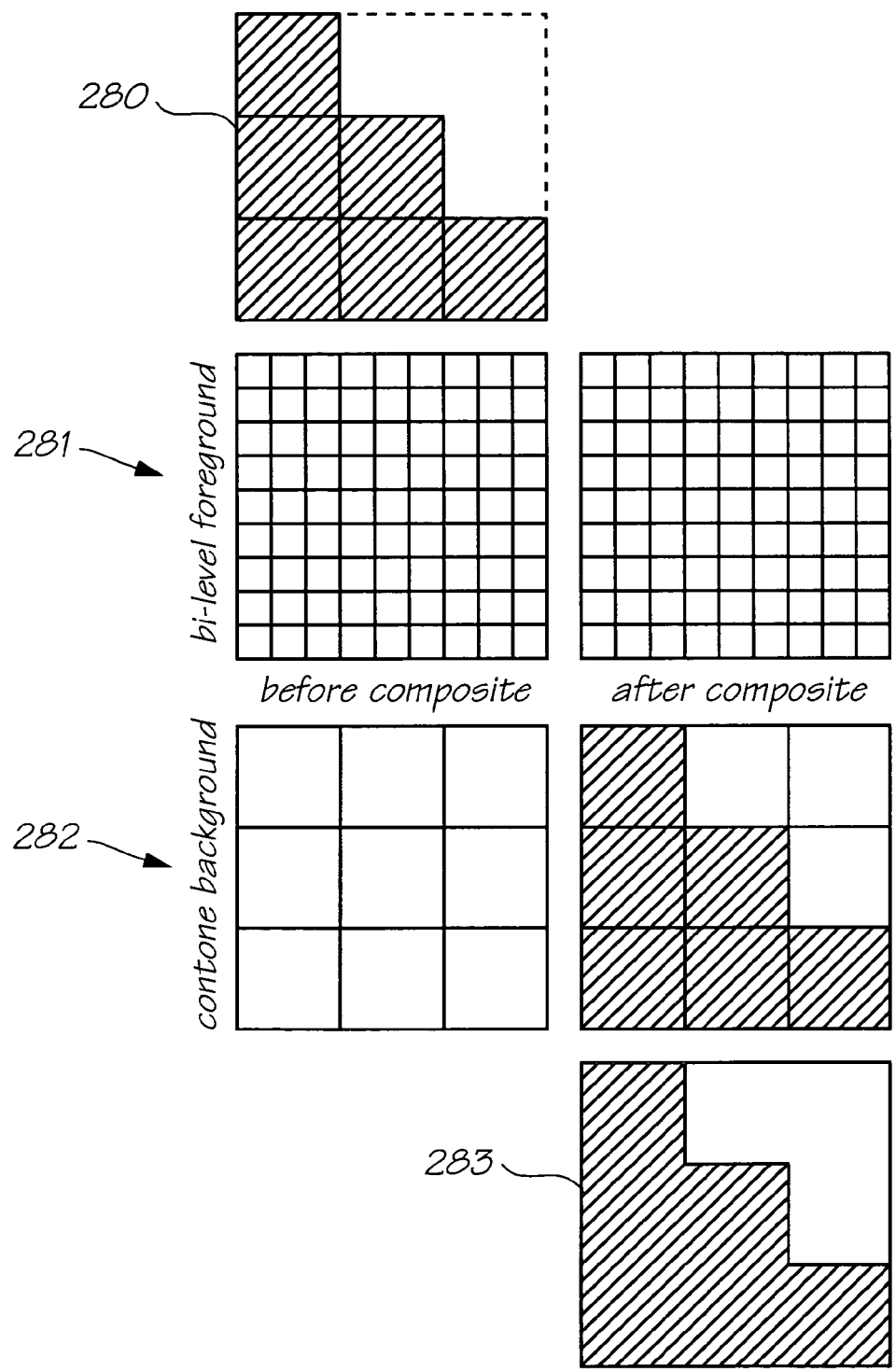
FIG. 38 is a series of diagrams showing the compositing of a contone object onto a white image.

FIG. 38 illustrates the effect of compositing a contone object 280 onto a white image. The contone object 280 is simply composited into the background contone layer 282 (Rule 6). The foreground black layer 281 is unaffected, and the output image 283 is the contone object.

Figure 39:
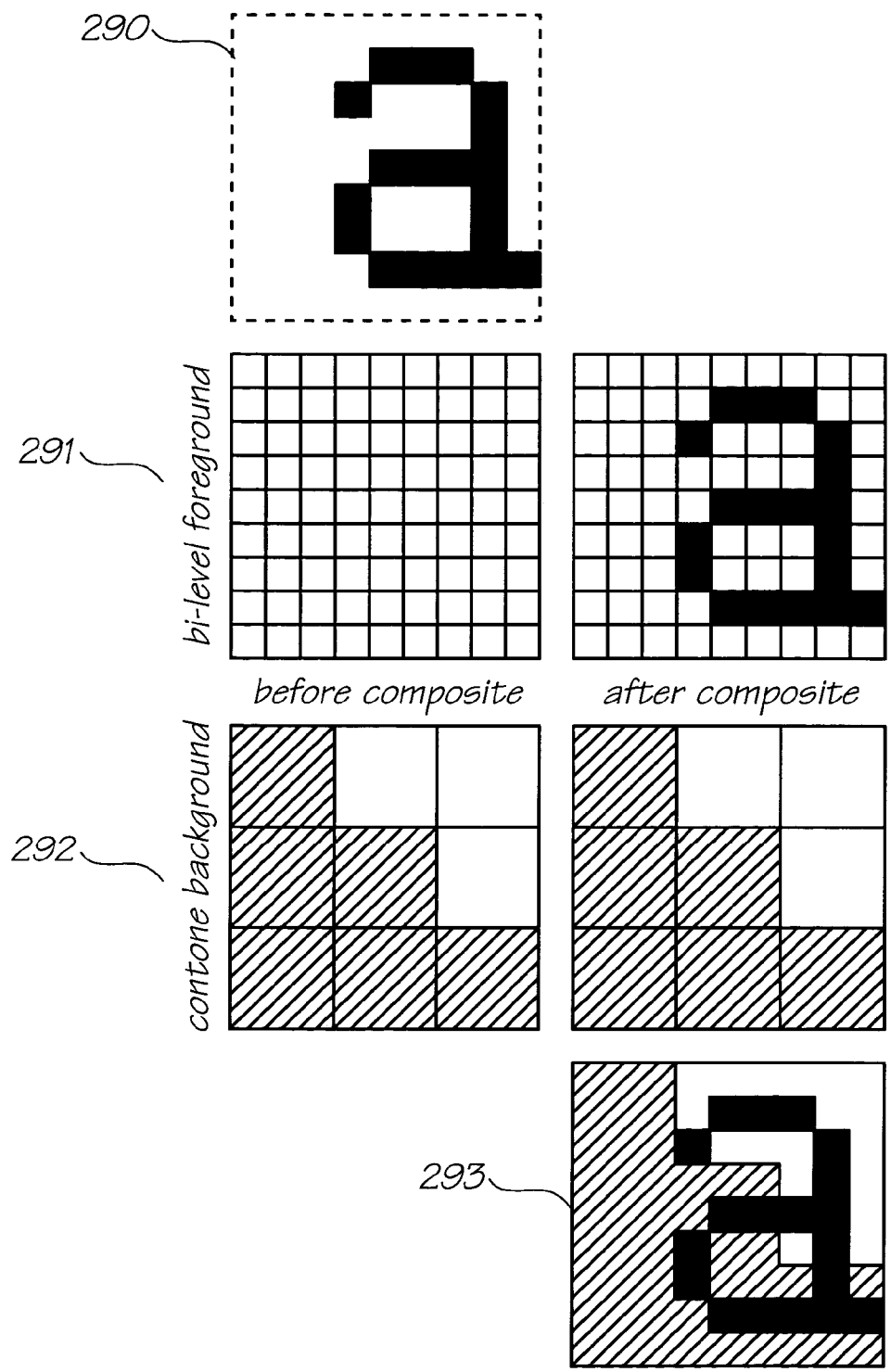
FIG. 39 is a series of diagrams showing the compositing of a black object onto an image containing a contone object.

FIG. 39 illustrates the effect of compositing a black object 290 onto an image already containing a contone object 292. Again the black object is simply composited into the foreground black layer 291 (Rule 1). The background contone layer is unaffected, and the output image 293 has the black object 290 over the contone object 292.

Figure 40:
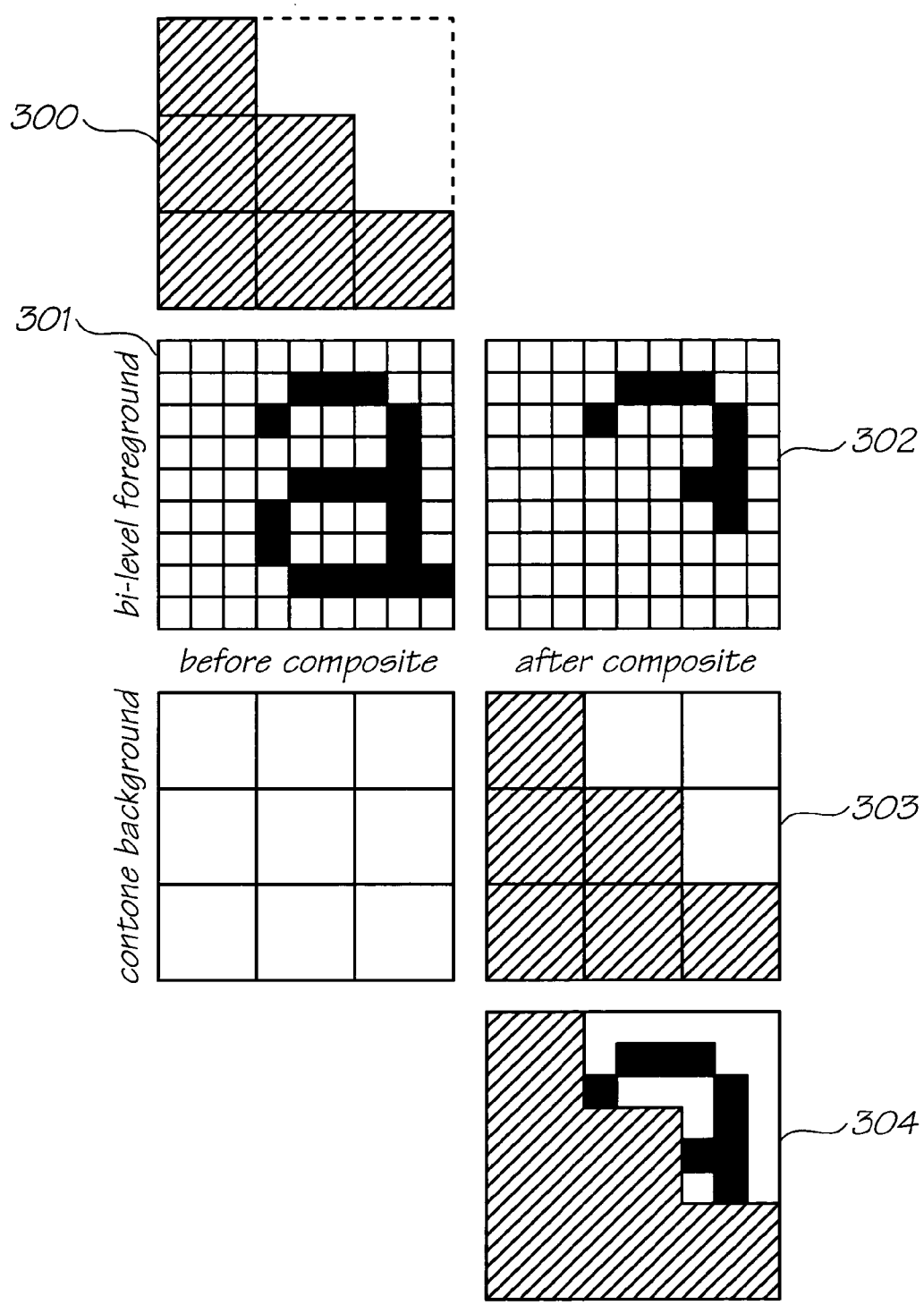
FIG. 40 is a series of diagrams showing the compositing of an opaque contone object onto an image containing a black object.

FIG. 40 illustrates the effect of compositing an opaque contone object 300 onto an image already containing a black object 301. Since the contone object obscures part of the existing black object, the affected parts of the existing bi-level object are removed from the foreground black layer 302 (Rule 4). There is no need to composite the affected parts into the contone layer because the contone object is fully opaque, and Rule 3 is therefore skipped. The contone object is composited into the background contone layer as usual 303 (Rule 6), and the output image 304 shows the contone object 300 over, and obscuring, the black object.

Figure 41:
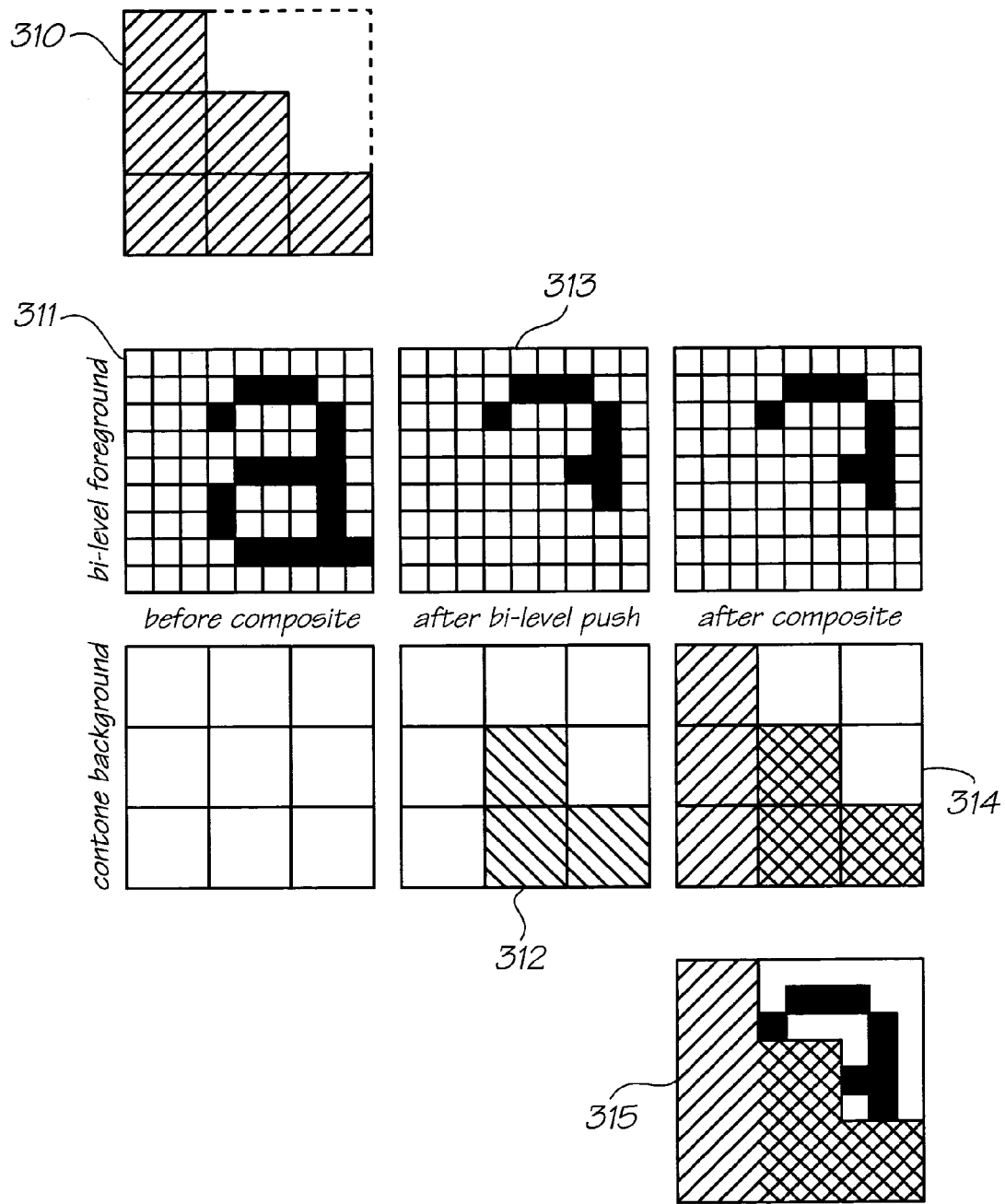
FIG. 41 is a series of diagrams showing the compositing of a transparent contone object onto an image containing a black object.

FIG. 41 illustrates the effect of compositing a partially transparent contone object 310 onto an image already containing a black object 311. Since the contone object obscures part of the existing black object partially transparently, the affected parts of the black object are composited into the contone layer 312 (Rule 3), and are then removed from the foreground black layer 313 (Rule 4). The contone object is then composited into the background contone layer as usual 314 (Rule 6).

The final image 315 shows darkening of those contone pixels which transparently obscure parts of the existing black object.

8.4 Page Compression and Delivery

Once page rendering is complete, the printer driver converts the contone layer to iPrint-specific CMYK with the help of color management functions in the graphics system.

The printer driver then compresses and packages the black layer and the contone layer into an iPrint page description as described in Section 5.2. This page description is delivered to the printer via the standard spooler.

Note that the black layer is manipulated as a set of 1-bit opacity values, but is delivered to the printer as a set of 1-bit black values. Although these two interpretations are different, they share the same representation, and so no data conversion is required.

9 Windows 9X/NT Printer Driver 9.1 Windows 9x/NT Printing System

In the Windows 9x/NT printing system [8][9], a printer 320 is a graphics device, and an application 321 communicates with it via the graphics device interface 322 (GDI). The printer driver graphics DLL 323 (dynamic link library) implements the device-dependent aspects of the various graphics functions provided by GDI.

The spooler 333 handles the delivery of pages to the printer, and may reside on a different machine to the application requesting printing. It delivers pages to the printer via a port monitor 334 which handles the physical connection to the printer. The optional language monitor 335 is the part of the printer driver which imposes additional protocol on communication with the printer, and in particular decodes status responses from the printer on behalf of the spooler.

The printer driver user interface DLL 336 implements the user interface for editing printer-specific properties and reporting printer-specific events.

Figure 42:
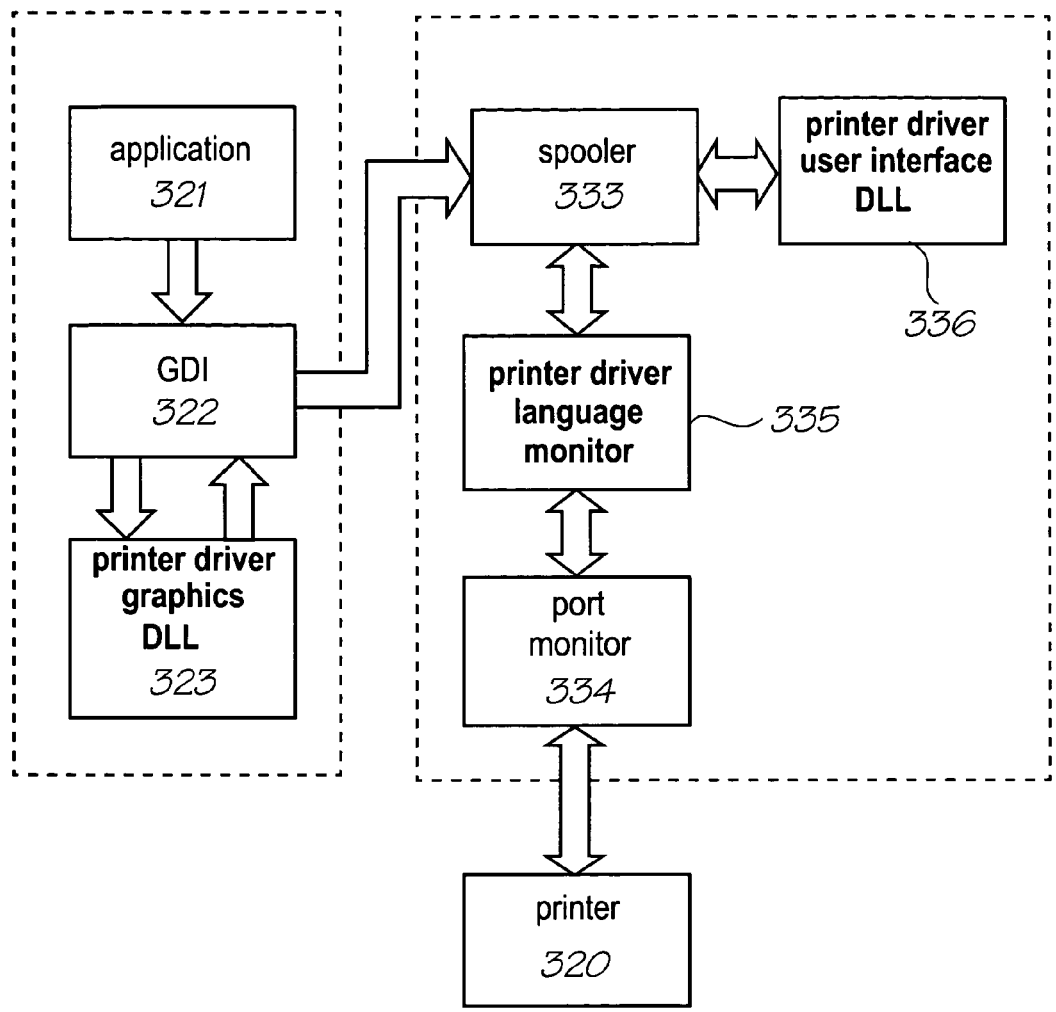
FIG. 42 is a block diagram of the Windows 9x/NT printing system with printer driver components.

The structure of the Windows 9x/NT printing system is illustrated in FIG. 42.

Since iPrint uses USB IEEE-1284 emulation, there is no need to implement a language monitor for iPrint.

The remainder of this section describes the design of the printer driver graphics DLL. It should be read in conjunction with the appropriate Windows 9x/NT DDK documentation [8][9].

9.2 Windows 9x/NT Graphics Device Interface (GDI)

GDI provides functions which allow an application to draw on a device surface, i.e. typically an abstraction of a display screen or a printed page. For a raster device, the device surface is conceptually a color bitmap. The application can draw on the surface in a device-independent way, i.e. independently of the resolution and color characteristics of the device.

The application has random access to the entire device surface. This means that if a memory-limited printer device requires banded output, then GDI must buffer the entire page's GDI commands and replay them windowed into each band in turn. Although this provides the application with great flexibility, it can adversely affect performance.

GDI supports color management, whereby device-independent colors provided by the application are transparently translated into device-dependent colors according to a standard ICC (International Color Consortium) color profile of the device. A printer driver can activate a different color profile depending, for example, on the user's selection of paper type on the driver-managed printer property sheet.

GDI supports line and spline outline graphics (paths), images, and text. Outline graphics, including outline font glyphs, can be stroked and filled with bit-mapped brush patterns. Graphics and images can be geometrically transformed and composited with the contents of the device surface. While Windows 95/NT4 provides only boolean compositing operators, Windows 98/NT5 provides proper alpha-blending [9].

9.3 Printer Driver Graphics DLL

A raster printer can, in theory, utilize standard printer driver components under Windows 9x/NT, and this can make the job of developing a printer driver trivial. This relies on being able to model the device surface as a single bitmap. The problem with this is that text and images must be rendered at the same resolution. This either compromises text resolution, or generates too much output data, compromising performance.

As described earlier, iPrint's approach is to render black text and images at different resolutions, to optimize the reproduction of each. The printer driver is therefore implemented according to the generic design described in Section 8.

The driver therefore maintains a two-layer three-part page buffer as described in Section 8.2, and this means that the printer driver must take over managing the device surface, which in turn means that it must mediate all GDI access to the device surface.

9.3.1 Managing the Device Surface

The printer driver must support a number of standard functions, including the following:

TABLE 33

Standard graphics driver interface functions

| function | description |
|---|---|
| DrvEnableDriver | Initial entry point into the driver graphics DLL. Returns addresses of functions supported by the driver. |
| DrvEnablePDEV | Creates a logical representation of a physical device with which the driver can associate a drawing surface. |
| DrvEnableSurface | Creates a surface to be drawn on, associated with a given PDEV. |

DrvEnablePDEV indicates to GDI, via the flGraphicsCaps member of the returned DEVINFO structure, the graphics rendering capabilities of the driver. This is discussed further below.

DrvEnableSurface creates a device surface consisting of two conceptual layers and three parts: the 267 ppi contone layer 24-bit RGB color, the 267 ppi black layer 8-bit opacity, and the 800 dpi black layer 1-bit opacity. The virtual device surface which encapsulates these two layers has a nominal resolution of 267 ppi, so this is the resolution at which GDI operations take place.

Although the aggregate page buffer requires about 33 MB of memory, the PC 99 office standard [5] specifies a minimum of 64 MB.

In practice, managing the device surface and mediating GDI access to it means that the printer driver must support the following additional functions:

TABLE 34

Required graphics driver functions for a device-managed surface

| function | description |
|---|---|
| DrvCopyBits | Translates between device-managed raster surfaces and GDI-managed standard-format bitmaps. |
| DrvStrokePath | Strokes a path. |
| DrvPaint | Paints a specified region. |
| DrvTextOut | Renders a set of glyphs at specified positions. |

Copying images, stroking paths and filling regions all occur on the contone layer, while rendering solid black text occurs on the bi-level black layer. Furthermore, rendering non-black text also occurs on the contone layer, since it isn't supported on the black layer. Conversely, stroking or filling with solid black can occur on the black layer (if we so choose).

Although the printer driver is obliged to hook the aforementioned functions, it can punt function calls which apply to the contone layer back to the corresponding GDI implementations of the functions, since the contone layer is a standard-format bitmap. For every DrvXxx function there is a corresponding EngXxx function provided by GDI.

As described in Section 8.2, when an object destined for the contone layer obscures pixels on the black layer, the obscured black pixels must be transferred from the black layer to the contone layer before the contone object is composited with the contone layer. The key to this process working is that obscuration is detected and handled in the hooked call, before it is punted back to GDI. This involves determining the pixel-by-pixel opacity of the contone object from its geometry, and using this opacity to selectively transfer black pixels from the black layer to the contone layer as described in Section 8.2.

9.3.2 Determining Contone Object Geometry

It is possible to determine the geometry of each contone object before it is rendered and thus determine efficiently which black pixels it obscures. In the case of DrvCopyBits and DrvPaint, the geometry is determined by a clip object (CLIPOBJ), which can be enumerated as a set of rectangles.

In the case of DrvStrokePath, things are more complicated. DrvStrokePath supports both straight-line and Bézier-spline curve segments, and single-pixel-wide lines and geometric-wide lines. The first step is to avoid the complexity of Bézier-spline curve segments and geometric-wide lines altogether by clearing the corresponding capability flags (GCAPS_BEZIERS and GCAPS_GEOMETRICWIDE) in the flGraphicsCaps member of the driver's DEVINFO structure. This causes GDI to reformulate such calls as sets of simpler calls to DrvPaint. In general, GDI gives a driver the opportunity to accelerate high-level capabilities, but simulates any capabilities not provided by the driver.

What remains is simply to determine the geometry of a single-pixel-wide straight line. Such a line can be solid or cosmetic. In the latter case, the line style is determined by a styling array in the specified line attributes (LINEATTRS). The styling array specifies how the line alternates between being opaque and transparent along its length, and so supports various dashed line effects etc.

When the brush is solid black, straight lines can also usefully be rendered to the black layer, though with the increased width implied by the 800 dpi resolution.

9.3.3 Rendering Text

In the case of a DrvTextOut, things are also more complicated. Firstly, the opaque background, if any, is handled like any other fill on the contone layer (see DrvPaint). If the foreground brush is not black, or the mix mode is not effectively opaque, or the font is not scalable, or the font indicates outline stroking, then the call is punted to EngTextOut, to be applied to the contone layer. Before the call is punted, however, the driver determines the geometry of each glyph by obtaining its bitmap (via FONTOBJ_cGetGlyphs), and makes the usual obscuration check against the black layer.

If punting a DrvTextOut call is not allowed (the documentation is ambiguous), then the driver should disallow complex text operations. This includes disallowing outline stroking (by clearing the GCAPS_VECTOR_FONT capability flag), and disallowing complex mix modes (by clearing the GCAPS_ARBMIXTXT capability flag).

If the foreground brush is black and opaque, and the font is scalable and not stroked, then the glyphs are rendered on the black layer. In this case the driver determines the geometry of each glyph by obtaining its outline (again via FONTOBJ_cGetGlyphs, but as a PATHOBJ). The driver then renders each glyph from its outline at 800 dpi and writes it to the black layer. Although the outline geometry uses device coordinates (i.e. at 267 ppi), the coordinates are in fixed point format with plenty of fractional precision for higher-resolution rendering.

Note that strikethrough and underline rectangles are added to the glyph geometry, if specified.

The driver must set the GCAPS_HIGHRESTEXT flag in the DEVINFO to request that glyph positions (again in 267 ppi device coordinates) be supplied by GDI in high-precision fixed-point format, to allow accurate positioning at 800 dpi. The driver must also provide an implementation of the DrvGetGlyphMode function, so that it can indicate to GDI that glyphs should be cached as outlines rather than bitmaps. Ideally the driver should cache rendered glyph bitmaps for efficiency, memory allowing. Only glyphs below a certain point size should be cached.

9.3.4 Compressing the Contone Layer

As described earlier, the contone layer is compressed using JPEG. The forward discrete cosine transform (DCT) is the costliest part of JPEG compression. In current high-quality software implementations, the forward DCT of each 8×8 block requires 12 integer multiplications and 32 integer additions [7]. On a Pentium processor, an integer multiplication requires 10 cycles, and an integer addition requires 2 cycles [11]. This equates to a total cost per block of 184 cycles.

The 25.5 MB contone layer consists of 417,588 JPEG blocks, giving an overall forward DCT cost of about 77Mcycles. At 300 MHz, the PC 99 desktop standard [5], this equates to 0.26 seconds, which is well within the 2 second limit per page.

10 References

[1] ANSI/EIA 538-1988, *Facsimile Coding Schemes and Coding Control Functions for Group 4 Facsimile Equipment*, August 1988
[2] Humphreys, G. W., and V. Bruce, *Visual Cognition*, Lawrence Erlbaum Associates, 1989, p. 15
[3] IEEE Std 1284-1994, *IEEE Standard Signaling Method for a Bidirectional Parallel Peripheral Interface for Personal Computers*, 2 Dec. 1994
[4] Intel Corp. and Microsoft Corp., *PC 98 System Design Guide*, 1997
[5] Intel Corp. and Microsoft Corp., *PC 99 System Design Guide*, 1998
[6] ISO/IEC 19018-1:1994, *Information technology—Digital compression and coding of continuous-tone still images: Requirements and guidelines*, 1994
[7] Loeffler, C., A. Ligtenberg and G. Moschytz, "Practical Fast 1-D DCT Algorithms with 11 Multiplications", Proceedings of the International Conference on Acoustics, Speech, and Signal Processing 1989 (ICASSP '89), pp. 988-991
[8] Microsoft Corp., *Microsoft Windows NT 4.0 Device Driver Kit*, 1997
[9] Microsoft Corp., *Microsoft Windows NT 5.0 Device Driver Kit*, 1998
[10] Olsen, J. "Smoothing Enlarged Monochrome Images", in Glassner, A. S. (ed.), *Graphics Gems*, AP Professional, 1990
[11] Schmit, M. L., *Pentium Processor Optimization Tools*, AP Professional, 1995
[12] Sullivan, J. R., and R. L. Miller, "Digital halftoning with minimum visual modulation patterns", U.S. Pat. No. 4,920,501, 24 Apr. 1990
[13] Thompson, H. S., *Multilingual Corpus 1 CD-ROM*, European Corpus Initiative
[14] Urban, S. J., "Review of standards for electronic imaging for facsimile systems", Journal of Electronic Imaging, Vol. 1(1), January 1992, pp. 5-21
[15] USB Implementers Forum, *Universal Serial Bus Specification*, Rev 1.0, 1996
[16] USB Implementers Forum, *Universal Serial Bus Device Class Definition for Printer Devices*, Version 1.07 Draft, 1998
[17] Wallace, G. K., "The JPEG Still Picture Compression Standard", *Communications of the ACM*, 34(4), April 1991, pp. 30-44
[18] Yasuda, Y., "Overview of Digital Facsimile Coding Techniques in Japan", Proceedings of the IEEE, Vol. 68(7), July 1980, pp. 830-845

The invention claimed is:

1. A printer controller for controlling operation of a pagewidth printhead, the printer controller comprising:
   a bus;
   a data input interface connected to the bus so that the bus can receive compressed and encoded page data from a computer-based machine connected to the data input interface;
   page data expansion and decoding circuitry connected to the bus and configured to expand and decode the compressed and encoded page data;
   a printhead interface for communicating print page data to the printhead; and
   processing circuitry for controlling operation of components of the printer controller.

2. A printer controller as claimed in claim 1, in which the pagewidth printhead comprises a plurality of micro-electromechanical systems based printhead integrated circuits.

3. A printer controller as claimed in claim 1, in which the bus is a processor address, control and data bus.

4. A printer controller as claimed in claim 1, in which the data input interface is a universal serial bus (USB) interface.

5. A printer controller as claimed in claim 1, in which the page data expansion and decoding circuitry comprises a half toner and compositor circuit module to process continuous tone CMYK data and black layer data to produce half tone composite image data.

6. A printer controller as claimed in claim 5, in which the half toner and compositor circuit module comprises:
   one or more memory devices arranged to store parameters indicating page width and page length, left and right margins, continuous tone scale factor, black page width and continuous tone page width;
   a multi-threshold dither circuit module responsive to the one or more memory devices and arranged to process the continuous tone CMYK data to produce corresponding bi-level CMYK data; and
   a composite circuit module responsive to the bi-level CMYK data and to the black layer data and to the one or memory devices to produce bi-level composite CMYK data conforming to said parameters.

7. A printer controller as claimed in claim 1, in which the page data expansion and decoding circuitry comprises an EDRL decoder module.

8. A printer controller as claimed in claim 1, in which the page data expansion and decoding circuitry comprises a JPEG decoder module.

* * * * *